(12) United States Patent
Yin et al.

(10) Patent No.: US 9,427,732 B2
(45) Date of Patent: Aug. 30, 2016

(54) CATALYST DESIGN FOR HEAVY-DUTY DIESEL COMBUSTION ENGINES

(71) Applicant: SDCmaterials, Inc., Tempe, AZ (US)

(72) Inventors: Qinghua Yin, Tempe, AZ (US);
Xiwang Qi, Scottsdale, AZ (US);
Maximilian A. Biberger, Scottsdale, AZ (US)

(73) Assignee: SDCmaterials, Inc., Tempe, AZ (US)

( * ) Notice: Subject to any disclaimer, the term of this patent is extended or adjusted under 35 U.S.C. 154(b) by 0 days.

(21) Appl. No.: 14/521,295

(22) Filed: Oct. 22, 2014

(65) Prior Publication Data

US 2015/0165434 A1    Jun. 18, 2015

Related U.S. Application Data

(60) Provisional application No. 61/894,341, filed on Oct. 22, 2013, provisional application No. 62/030,555, filed on Jul. 29, 2014.

(51) Int. Cl.
| | |
|---|---|
| *B01J 23/42* | (2006.01) |
| *B01J 23/44* | (2006.01) |
| *B01J 21/04* | (2006.01) |
| *B01J 35/02* | (2006.01) |
| *B01J 37/34* | (2006.01) |

(Continued)

(52) U.S. Cl.
CPC ............ *B01J 37/349* (2013.01); *B01D 53/945* (2013.01); *B01J 21/04* (2013.01); *B01J 23/42* (2013.01); *B01J 23/44* (2013.01); *B01J 35/0006* (2013.01); *B01J 35/0013* (2013.01); *B01J 35/02* (2013.01); *B01D 2255/1021* (2013.01); *B01D 2255/1023* (2013.01); *B01D 2255/40* (2013.01); *B01D 2255/9022* (2013.01); *B01D 2255/9202* (2013.01); *Y02T 10/22* (2013.01)

(58) Field of Classification Search
CPC .......... B01J 21/04; B01J 23/42; B01J 23/44; B01J 35/02; B01J 37/0221; B01J 37/34
USPC ................ 502/327, 332–334, 339, 355, 439, 502/527.12, 527.13; 977/773, 775
See application file for complete search history.

(56) References Cited

U.S. PATENT DOCUMENTS

| | | |
|---|---|---|
| 1,477,664 A | 12/1923 | Rankin |
| 2,021,936 A | 11/1935 | Johnstone |

(Continued)

FOREIGN PATENT DOCUMENTS

| | | |
|---|---|---|
| CN | 1647858 A | 8/2005 |
| CN | 101011664 A | 8/2007 |

(Continued)

OTHER PUBLICATIONS

Büchel, R. et al. (2009). "Influence of Pt Location on BaCO$_3$ or Al$_2$O$_3$ During NO$_x$ Storage Reduction," *Journal of Catalysis* 261: 201-207.

(Continued)

*Primary Examiner* — Cam N. Nguyen
(74) *Attorney, Agent, or Firm* — Morrison & Foerster LLP

(57) ABSTRACT

Disclosed are washcoats, coated substrates formed from such washcoats, and catalytic converters for use in diesel applications, such as heavy duty diesel applications. Methods of preparing the coated substrates are also disclosed.

24 Claims, 10 Drawing Sheets

(51) Int. Cl.
*B01J 35/00* (2006.01)
*B01D 53/94* (2006.01)

(56) References Cited

U.S. PATENT DOCUMENTS

| | | | |
|---|---|---|---|
| 2,284,554 A | 5/1942 | Beyerstedt | |
| 2,419,042 A | 4/1947 | Todd | |
| 2,519,531 A | 8/1950 | Worn | |
| 2,562,753 A | 7/1951 | Trost | |
| 2,689,780 A | 9/1954 | Rice | |
| 3,001,402 A | 9/1961 | Koblin | |
| 3,042,511 A | 7/1962 | Reding, Jr. | |
| 3,067,025 A | 12/1962 | Chisholm | |
| 3,108,006 A | 10/1963 | Kenedi et al. | |
| 3,145,287 A | 8/1964 | Siebein et al. | |
| 3,178,121 A | 4/1965 | Wallace, Jr. | |
| 3,179,782 A | 4/1965 | Matvay | |
| 3,181,947 A | 5/1965 | Vordahl | |
| 3,235,700 A | 2/1966 | Mondain-Monval et al. | |
| 3,290,723 A | 12/1966 | Jaques et al. | |
| 3,309,873 A | 3/1967 | Cann | |
| 3,313,908 A | 4/1967 | Unger et al. | |
| 3,387,110 A | 6/1968 | Wendler et al. | |
| 3,401,465 A | 9/1968 | Larwill | |
| 3,450,926 A | 6/1969 | Kiernan | |
| 3,457,788 A | 7/1969 | Miyajima | |
| 3,520,656 A | 7/1970 | Yates et al. | |
| 3,537,513 A | 11/1970 | Austin | |
| 3,552,653 A | 1/1971 | Inoue | |
| 3,554,929 A * | 1/1971 | Aarons | B01J 21/16 423/213.5 |
| 3,589,351 A | 6/1971 | Shoupp et al. | |
| 3,617,358 A | 11/1971 | Dittrich | |
| 3,667,111 A | 6/1972 | Chartet | |
| 3,676,638 A | 7/1972 | Stand | |
| 3,730,827 A | 5/1973 | Matchen et al. | |
| 3,741,001 A | 6/1973 | Fletcher et al. | |
| 3,743,708 A | 7/1973 | Chase et al. | |
| 3,752,172 A | 8/1973 | Cohen et al. | |
| 3,761,360 A | 9/1973 | Auvil et al. | |
| 3,774,442 A | 11/1973 | Gustaysson | |
| 3,804,034 A | 4/1974 | Stiglich, Jr. | |
| 3,830,756 A | 8/1974 | Sanchez et al. | |
| 3,857,744 A | 12/1974 | Moss | |
| 3,871,448 A | 3/1975 | Vann et al. | |
| 3,892,882 A | 7/1975 | Guest et al. | |
| 3,914,573 A | 10/1975 | Muehlberger | |
| 3,959,094 A | 5/1976 | Steinberg | |
| 3,959,420 A | 5/1976 | Geddes et al. | |
| 3,969,482 A | 7/1976 | Teller | |
| 4,006,340 A | 2/1977 | Gorinas | |
| 4,008,620 A | 2/1977 | Narato et al. | |
| 4,018,388 A | 4/1977 | Andrews | |
| 4,021,021 A | 5/1977 | Hall et al. | |
| 4,127,760 A | 11/1978 | Meyer et al. | |
| 4,139,497 A | 2/1979 | Castor et al. | |
| 4,146,654 A | 3/1979 | Guyonnet | |
| 4,157,316 A | 6/1979 | Thompson et al. | |
| 4,171,288 A | 10/1979 | Keith et al. | |
| 4,174,298 A | 11/1979 | Antos | |
| 4,189,925 A | 2/1980 | Long | |
| 4,227,928 A | 10/1980 | Wang | |
| 4,248,387 A | 2/1981 | Andrews | |
| 4,252,843 A | 2/1981 | Dorer et al. | |
| 4,253,917 A | 3/1981 | Wang | |
| 4,260,649 A | 4/1981 | Dension et al. | |
| 4,284,609 A | 8/1981 | deVries | |
| 4,315,874 A | 2/1982 | Ushida et al. | |
| 4,326,492 A | 4/1982 | Leibrand, Sr. et al. | |
| 4,335,080 A | 6/1982 | Davis et al. | |
| 4,344,779 A | 8/1982 | Isserlis | |
| 4,369,167 A | 1/1983 | Weir | |
| 4,388,274 A | 6/1983 | Rourke et al. | |
| 4,419,331 A | 12/1983 | Montalvo | |
| 4,431,750 A | 2/1984 | McGinnis et al. | |
| 4,436,075 A | 3/1984 | Campbell et al. | |
| 4,440,733 A | 4/1984 | Lawson et al. | |
| 4,458,138 A | 7/1984 | Adrian et al. | |
| 4,459,327 A | 7/1984 | Wang | |
| 4,505,945 A | 3/1985 | Dubust et al. | |
| 4,506,136 A | 3/1985 | Smyth et al. | |
| 4,513,149 A | 4/1985 | Gray et al. | |
| 4,523,981 A | 6/1985 | Ang et al. | |
| 4,545,872 A | 10/1985 | Sammells et al. | |
| RE32,244 E | 9/1986 | Andersen | |
| 4,609,441 A | 9/1986 | Frese, Jr. et al. | |
| 4,610,857 A | 9/1986 | Ogawa et al. | |
| 4,616,779 A | 10/1986 | Serrano et al. | |
| 4,642,207 A | 2/1987 | Uda et al. | |
| 4,665,296 A | 5/1987 | Iwata et al. | |
| 4,723,589 A | 2/1988 | Iyer et al. | |
| 4,731,517 A | 3/1988 | Cheney | |
| 4,751,021 A | 6/1988 | Mollon et al. | |
| 4,764,283 A | 8/1988 | Ashbrook et al. | |
| 4,765,805 A | 8/1988 | Wahl et al. | |
| 4,780,591 A | 10/1988 | Bernecki et al. | |
| 4,824,624 A | 4/1989 | Palicka et al. | |
| 4,836,084 A | 6/1989 | Vogelesang et al. | |
| 4,855,505 A | 8/1989 | Koll | |
| 4,866,240 A | 9/1989 | Webber | |
| 4,869,936 A | 9/1989 | Moskowitz et al. | |
| 4,877,937 A | 10/1989 | Müller | |
| 4,885,038 A | 12/1989 | Anderson et al. | |
| 4,902,870 A | 2/1990 | Frind et al. | |
| 4,916,107 A | 4/1990 | Brand et al. | |
| 4,921,586 A | 5/1990 | Molter | |
| 4,970,364 A | 11/1990 | Müller | |
| 4,982,050 A | 1/1991 | Gammie et al. | |
| 4,983,555 A | 1/1991 | Roy et al. | |
| 4,987,033 A | 1/1991 | Abkowitz et al. | |
| 5,006,163 A | 4/1991 | Benn et al. | |
| 5,015,863 A | 5/1991 | Takeshima et al. | |
| 5,041,713 A | 8/1991 | Weidman | |
| 5,043,548 A | 8/1991 | Whitney et al. | |
| 5,070,064 A | 12/1991 | Hsu et al. | |
| 5,073,193 A | 12/1991 | Chaklader et al. | |
| 5,133,190 A | 7/1992 | Abdelmalek | |
| 5,151,296 A | 9/1992 | Tokunaga | |
| 5,157,007 A | 10/1992 | Domesle et al. | |
| 5,187,140 A | 2/1993 | Thorsteinson et al. | |
| 5,192,130 A | 3/1993 | Endo et al. | |
| 5,217,746 A | 6/1993 | Lenling et al. | |
| 5,225,656 A | 7/1993 | Frind | |
| 5,230,844 A | 7/1993 | MacAire et al. | |
| 5,233,153 A | 8/1993 | Coats | |
| 5,260,241 A | 11/1993 | Addiego et al. | |
| 5,269,848 A | 12/1993 | Nakagawa | |
| 5,276,693 A | 1/1994 | Long et al. | |
| 5,280,757 A | 1/1994 | Carter et al. | |
| 5,294,242 A | 3/1994 | Zurecki et al. | |
| 5,330,945 A | 7/1994 | Beckmeyer et al. | |
| 5,334,570 A * | 8/1994 | Beauseigneur | B01J 23/40 502/240 |
| 5,338,716 A | 8/1994 | Triplett et al. | |
| 5,357,075 A | 10/1994 | Muehlberger | |
| 5,369,241 A | 11/1994 | Taylor et al. | |
| 5,371,049 A | 12/1994 | Moffett et al. | |
| 5,372,629 A | 12/1994 | Anderson et al. | |
| 5,392,797 A | 2/1995 | Welch | |
| 5,436,080 A | 7/1995 | Inoue et al. | |
| 5,439,865 A | 8/1995 | Abe et al. | |
| 5,442,153 A | 8/1995 | Marantz et al. | |
| 5,452,854 A | 9/1995 | Keller | |
| 5,460,701 A | 10/1995 | Parker et al. | |
| 5,464,458 A | 11/1995 | Yamamoto | |
| 5,485,941 A | 1/1996 | Guyomard et al. | |
| 5,486,675 A | 1/1996 | Taylor et al. | |
| 5,487,916 A | 1/1996 | Christensen | |
| 5,489,449 A | 2/1996 | Umeya et al. | |
| 5,510,086 A | 4/1996 | Hemingway et al. | |
| 5,534,149 A | 7/1996 | Birkenbeil et al. | |
| 5,534,270 A | 7/1996 | De Castro | |
| 5,543,173 A | 8/1996 | Horn, Jr. et al. | |
| 5,553,507 A | 9/1996 | Basch et al. | |

(56) References Cited

U.S. PATENT DOCUMENTS

| | | |
|---|---|---|
| 5,558,771 A | 9/1996 | Hagen et al. |
| 5,562,966 A | 10/1996 | Clarke et al. |
| 5,582,807 A | 12/1996 | Liao et al. |
| 5,596,973 A | 1/1997 | Grice |
| 5,611,896 A | 3/1997 | Swanepoel et al. |
| 5,630,322 A | 5/1997 | Heilmann et al. |
| 5,652,304 A | 7/1997 | Calderon et al. |
| 5,714,644 A | 2/1998 | Irgang et al. |
| 5,723,027 A | 3/1998 | Serole |
| 5,723,187 A | 3/1998 | Popoola et al. |
| 5,726,414 A | 3/1998 | Kitahashi et al. |
| 5,726,415 A | 3/1998 | Luo et al. |
| 5,733,662 A | 3/1998 | Bogachek |
| 5,749,938 A | 5/1998 | Coombs |
| 5,776,359 A | 7/1998 | Schultz et al. |
| 5,788,738 A | 8/1998 | Pirzada et al. |
| 5,804,155 A | 9/1998 | Farrauto et al. |
| 5,811,187 A | 9/1998 | Anderson et al. |
| 5,837,959 A | 11/1998 | Muehlberger et al. |
| 5,851,507 A | 12/1998 | Pirzada et al. |
| 5,853,815 A | 12/1998 | Muehlberger |
| 5,858,470 A | 1/1999 | Bernecki et al. |
| 5,884,473 A | 3/1999 | Noda et al. |
| 5,905,000 A | 5/1999 | Yadav et al. |
| 5,928,806 A | 7/1999 | Olah et al. |
| 5,935,293 A | 8/1999 | Detering et al. |
| 5,973,289 A | 10/1999 | Read et al. |
| 5,989,648 A | 11/1999 | Phillips |
| 5,993,967 A | 11/1999 | Brotzman, Jr. et al. |
| 5,993,988 A | 11/1999 | Ohara et al. |
| 6,001,426 A | 12/1999 | Witherspoon et al. |
| 6,004,620 A | 12/1999 | Camm |
| 6,012,647 A | 1/2000 | Ruta et al. |
| 6,033,781 A | 3/2000 | Brotzman, Jr. et al. |
| 6,045,765 A | 4/2000 | Nakatsuji et al. |
| 6,059,853 A | 5/2000 | Coombs |
| 6,066,587 A | 5/2000 | Kurokawa et al. |
| 6,084,197 A | 7/2000 | Fusaro, Jr. |
| 6,093,306 A | 7/2000 | Hanrahan et al. |
| 6,093,378 A | 7/2000 | Deeba et al. |
| 6,102,106 A | 8/2000 | Manning et al. |
| 6,117,376 A | 9/2000 | Merkel |
| 6,139,813 A | 10/2000 | Narula et al. |
| 6,140,539 A | 10/2000 | Sander et al. |
| 6,168,694 B1 | 1/2001 | Huang et al. |
| 6,190,627 B1 | 2/2001 | Hoke et al. |
| 6,213,049 B1 | 4/2001 | Yang |
| 6,214,195 B1 | 4/2001 | Yadav et al. |
| 6,228,904 B1 | 5/2001 | Yadav et al. |
| 6,231,792 B1 | 5/2001 | Overbeek et al. |
| 6,254,940 B1 | 7/2001 | Pratsinis et al. |
| 6,261,484 B1 | 7/2001 | Phillips et al. |
| 6,267,864 B1 | 7/2001 | Yadav et al. |
| 6,322,756 B1 | 11/2001 | Arno et al. |
| 6,342,465 B1 | 1/2002 | Klein et al. |
| 6,344,271 B1 | 2/2002 | Yadav et al. |
| 6,362,449 B1 | 3/2002 | Hadidi et al. |
| 6,365,016 B1 | 4/2002 | Iacovangelo et al. |
| 6,379,419 B1 | 4/2002 | Celik et al. |
| 6,387,560 B1 | 5/2002 | Yadav et al. |
| 6,395,214 B1 | 5/2002 | Kear et al. |
| 6,398,843 B1 | 6/2002 | Tarrant |
| 6,399,030 B1 | 6/2002 | Nolan |
| 6,409,851 B1 | 6/2002 | Sethuram et al. |
| 6,413,781 B1 | 7/2002 | Geis et al. |
| 6,413,898 B1 | 7/2002 | Faber et al. |
| 6,416,818 B1 | 7/2002 | Aikens et al. |
| RE37,853 E | 9/2002 | Detering et al. |
| 6,444,009 B1 | 9/2002 | Liu et al. |
| 6,444,298 B1 | 9/2002 | Tadokoro et al. |
| 6,475,951 B1 | 11/2002 | Domesle et al. |
| 6,488,904 B1 | 12/2002 | Cox et al. |
| 6,491,423 B1 | 12/2002 | Skibo et al. |
| 6,491,985 B2 | 12/2002 | He |
| 6,506,995 B1 | 1/2003 | Fusaro, Jr. et al. |
| 6,517,800 B1 | 2/2003 | Cheng et al. |
| 6,524,662 B2 | 2/2003 | Jang et al. |
| 6,531,704 B2 | 3/2003 | Yadav et al. |
| 6,548,445 B1 | 4/2003 | Buysch et al. |
| 6,554,609 B2 | 4/2003 | Yadav et al. |
| 6,562,304 B1 | 5/2003 | Mizrahi |
| 6,562,495 B2 | 5/2003 | Yadav et al. |
| 6,569,393 B1 | 5/2003 | Hoke et al. |
| 6,569,397 B1 | 5/2003 | Yadav et al. |
| 6,569,518 B2 | 5/2003 | Yadav et al. |
| 6,572,672 B2 | 6/2003 | Yadav et al. |
| 6,579,446 B1 | 6/2003 | Teran et al. |
| 6,596,187 B2 | 7/2003 | Coll et al. |
| 6,603,038 B1 | 8/2003 | Hagemeyer et al. |
| 6,607,821 B2 | 8/2003 | Yadav et al. |
| 6,610,355 B2 | 8/2003 | Yadav et al. |
| 6,623,559 B2 | 9/2003 | Huang |
| 6,635,357 B2 | 10/2003 | Moxson et al. |
| 6,641,775 B2 | 11/2003 | Vigliotti et al. |
| 6,652,822 B2 | 11/2003 | Phillips et al. |
| 6,652,967 B2 | 11/2003 | Yadav et al. |
| 6,669,823 B1 | 12/2003 | Sarkas et al. |
| 6,682,002 B2 | 1/2004 | Kyotani |
| 6,689,192 B1 | 2/2004 | Phillips et al. |
| 6,699,398 B1 | 3/2004 | Kim |
| 6,706,097 B2 | 3/2004 | Zomes |
| 6,706,660 B2 | 3/2004 | Park |
| 6,710,207 B2 | 3/2004 | Bogan, Jr. et al. |
| 6,713,176 B2 | 3/2004 | Yadav et al. |
| 6,716,525 B1 | 4/2004 | Yadav et al. |
| 6,744,006 B2 | 6/2004 | Johnson et al. |
| 6,746,791 B2 | 6/2004 | Yadav et al. |
| 6,772,584 B2 | 8/2004 | Chun et al. |
| 6,780,350 B1 | 8/2004 | Kodas et al. |
| 6,786,950 B2 | 9/2004 | Yadav et al. |
| 6,813,931 B2 | 11/2004 | Yadav et al. |
| 6,817,388 B2 | 11/2004 | Tsangaris et al. |
| 6,832,735 B2 | 12/2004 | Yadav et al. |
| 6,838,072 B1 | 1/2005 | Kong et al. |
| 6,841,509 B1 | 1/2005 | Hwang et al. |
| 6,855,410 B2 | 2/2005 | Buckley |
| 6,855,426 B2 | 2/2005 | Yadav |
| 6,855,749 B1 | 2/2005 | Yadav et al. |
| 6,858,170 B2 | 2/2005 | Van Thillo et al. |
| 6,886,545 B1 | 5/2005 | Holm |
| 6,891,319 B2 | 5/2005 | Dean et al. |
| 6,896,958 B1 | 5/2005 | Cayton et al. |
| 6,902,699 B2 | 6/2005 | Fritzemeier et al. |
| 6,916,872 B2 | 7/2005 | Yadav et al. |
| 6,919,065 B2 | 7/2005 | Zhou et al. |
| 6,919,527 B2 | 7/2005 | Boulos et al. |
| 6,933,331 B2 | 8/2005 | Yadav et al. |
| 6,972,115 B1 | 12/2005 | Ballard |
| 6,986,877 B2 | 1/2006 | Takikawa et al. |
| 6,994,837 B2 | 2/2006 | Boulos et al. |
| 7,007,872 B2 | 3/2006 | Yadav et al. |
| 7,022,305 B2 | 4/2006 | Drumm et al. |
| 7,052,777 B2 | 5/2006 | Brotzman, Jr. et al. |
| 7,066,976 B2 | 6/2006 | Hampden-Smith et al. |
| 7,073,559 B2 | 7/2006 | O'Larey et al. |
| 7,074,364 B2 | 7/2006 | Jähn et al. |
| 7,081,267 B2 | 7/2006 | Yadav |
| 7,094,370 B2 | 8/2006 | Kodas et al. |
| 7,101,819 B2 | 9/2006 | Rosenflanz et al. |
| 7,147,544 B2 | 12/2006 | Rosenflanz |
| 7,147,894 B2 | 12/2006 | Zhou et al. |
| 7,166,198 B2 | 1/2007 | Van Der Walt et al. |
| 7,166,663 B2 | 1/2007 | Cayton et al. |
| 7,172,649 B2 | 2/2007 | Conrad et al. |
| 7,172,790 B2 | 2/2007 | Koulik et al. |
| 7,178,747 B2 | 2/2007 | Yadav et al. |
| 7,208,126 B2 | 4/2007 | Musick et al. |
| 7,211,236 B2 | 5/2007 | Stark et al. |
| 7,217,407 B2 | 5/2007 | Zhang |
| 7,220,398 B2 | 5/2007 | Sutorik et al. |
| 7,255,498 B2 | 8/2007 | Bush et al. |
| 7,265,076 B2 | 9/2007 | Taguchi et al. |
| 7,282,167 B2 | 10/2007 | Carpenter |
| 7,307,195 B2 | 12/2007 | Polverejan et al. |

(56) References Cited

U.S. PATENT DOCUMENTS

| | | | |
|---|---|---|---|
| 7,323,655 B2 | 1/2008 | Kim |
| 7,384,447 B2 | 6/2008 | Kodas et al. |
| 7,402,899 B1 | 7/2008 | Whiting et al. |
| 7,417,008 B2 | 8/2008 | Richards et al. |
| 7,494,527 B2 | 2/2009 | Jurewicz et al. |
| 7,507,495 B2 | 3/2009 | Wang et al. |
| 7,517,826 B2 | 4/2009 | Fujdala et al. |
| 7,534,738 B2 | 5/2009 | Fujdala et al. |
| 7,541,012 B2 | 6/2009 | Yeung et al. |
| 7,541,310 B2 | 6/2009 | Espinoza et al. |
| 7,557,324 B2 | 7/2009 | Nylen et al. |
| 7,572,315 B2 | 8/2009 | Boulos et al. |
| 7,576,029 B2 | 8/2009 | Saito et al. |
| 7,576,031 B2 | 8/2009 | Beutel et al. |
| 7,601,294 B2 | 10/2009 | Ripley et al. |
| 7,604,843 B1 | 10/2009 | Robinson et al. |
| 7,611,686 B2 | 11/2009 | Alekseeva et al. |
| 7,615,097 B2 | 11/2009 | McKeclutie et al. |
| 7,618,919 B2 | 11/2009 | Shimazu et al. |
| 7,622,693 B2 | 11/2009 | Foret |
| 7,632,775 B2 | 12/2009 | Zhou et al. |
| 7,635,218 B1 | 12/2009 | Lott |
| 7,674,744 B2 | 3/2010 | Shiratori et al. |
| 7,678,419 B2 | 3/2010 | Kevwitch et al. |
| 7,704,369 B2 | 4/2010 | Olah et al. |
| 7,709,411 B2 | 5/2010 | Zhou et al. |
| 7,709,414 B2 | 5/2010 | Fujdala et al. |
| 7,745,367 B2 | 6/2010 | Fujdala et al. |
| 7,750,265 B2 | 7/2010 | Belashchenko et al. |
| 7,759,279 B2 | 7/2010 | Shiratori et al. |
| 7,759,281 B2 | 7/2010 | Kezuka et al. |
| 7,803,210 B2 | 9/2010 | Sekine et al. |
| 7,842,515 B2 | 11/2010 | Zou et al. |
| 7,851,405 B2 | 12/2010 | Wakamatsu et al. |
| 7,874,239 B2 | 1/2011 | Howland |
| 7,875,250 B2 * | 1/2011 | Nunan | B01D 53/945 422/168 |
| 7,875,573 B2 | 1/2011 | Beutel et al. |
| 7,897,127 B2 | 3/2011 | Layman et al. |
| 7,897,536 B2 | 3/2011 | Saio et al. |
| 7,902,104 B2 | 3/2011 | Kalck |
| 7,905,942 B1 | 3/2011 | Layman |
| 7,935,655 B2 | 5/2011 | Tolmachev |
| 7,951,428 B2 | 5/2011 | Hoerr et al. |
| 8,003,020 B2 | 8/2011 | Jankowiak et al. |
| 8,051,724 B1 | 11/2011 | Layman et al. |
| 8,076,258 B1 | 12/2011 | Biberger |
| 8,080,494 B2 | 12/2011 | Yasuda et al. |
| 8,089,495 B2 | 1/2012 | Keller |
| 8,129,654 B2 | 3/2012 | Lee et al. |
| 8,142,619 B2 | 3/2012 | Layman et al. |
| 8,168,561 B2 | 5/2012 | Virkar |
| 8,173,572 B2 | 5/2012 | Feaviour |
| 8,176,830 B2 | 5/2012 | Tan |
| 8,211,392 B2 | 7/2012 | Grubert et al. |
| 8,258,070 B2 | 9/2012 | Fujdala et al. |
| 8,278,240 B2 | 10/2012 | Tange et al. |
| 8,294,060 B2 | 10/2012 | Mohanty et al. |
| 8,309,489 B2 | 11/2012 | Roldan Cuenya et al. |
| 8,349,761 B2 | 1/2013 | Xia et al. |
| 8,404,611 B2 | 3/2013 | Nakamura et al. |
| 8,470,112 B1 | 6/2013 | Biberger |
| 8,481,449 B1 | 7/2013 | Biberger et al. |
| 8,507,401 B1 | 8/2013 | Biberger et al. |
| 8,507,402 B1 | 8/2013 | Biberger et al. |
| 8,518,846 B2 | 8/2013 | Uchikawa et al. |
| 8,524,631 B2 | 9/2013 | Biberger |
| 8,545,652 B1 | 10/2013 | Biberger |
| 8,557,727 B2 | 10/2013 | Yin et al. |
| 8,574,408 B2 | 11/2013 | Layman |
| 8,574,520 B2 | 11/2013 | Koplin et al. |
| 8,575,059 B1 | 11/2013 | Biberger et al. |
| 8,604,398 B1 | 12/2013 | Layman |
| 8,652,992 B2 | 2/2014 | Yin et al. |
| 8,668,803 B1 | 3/2014 | Biberger |
| 8,669,202 B2 | 3/2014 | van den Hoek et al. |
| 8,679,433 B2 * | 3/2014 | Yin | B01D 53/944 423/213.2 |
| 8,821,786 B1 | 9/2014 | Biberger |
| 8,828,328 B1 | 9/2014 | Leamon et al. |
| 8,859,035 B1 | 10/2014 | Leamon |
| 8,877,357 B1 | 11/2014 | Biberger |
| 8,893,651 B1 | 11/2014 | Biberger et al. |
| 8,906,498 B1 | 12/2014 | Biberger |
| 8,927,403 B2 | 1/2015 | Huotari et al. |
| 8,932,514 B1 | 1/2015 | Yin et al. |
| 8,969,237 B2 * | 3/2015 | Yin | B01D 53/944 427/446 |
| 8,992,820 B1 | 3/2015 | Yin et al. |
| 9,023,754 B2 | 5/2015 | Biberger |
| 9,034,269 B2 * | 5/2015 | Hilgendorff | B01J 37/0244 422/170 |
| 9,039,916 B1 | 5/2015 | Lehman, Jr. |
| 9,089,840 B2 | 7/2015 | Biberger et al. |
| 9,090,475 B1 | 7/2015 | Lehman, Jr. |
| 9,119,309 B1 | 8/2015 | Lehman, Jr. |
| 9,126,191 B2 | 9/2015 | Yin et al. |
| 9,132,404 B2 | 9/2015 | Layman |
| 9,149,797 B2 | 10/2015 | Leamon |
| 9,156,025 B2 | 10/2015 | Qi et al. |
| 9,180,423 B2 | 11/2015 | Biberger et al. |
| 9,186,663 B2 | 11/2015 | Biberger et al. |
| 9,216,398 B2 | 12/2015 | Biberger et al. |
| 9,216,406 B2 | 12/2015 | Van Den Hoek et al. |
| 2001/0004009 A1 | 6/2001 | MacKelvie |
| 2001/0042802 A1 | 11/2001 | Youds |
| 2001/0055554 A1 | 12/2001 | Hoke et al. |
| 2002/0018815 A1 | 2/2002 | Sievers et al. |
| 2002/0068026 A1 | 6/2002 | Murrell et al. |
| 2002/0071800 A1 | 6/2002 | Hoke et al. |
| 2002/0079620 A1 | 6/2002 | DuBuis et al. |
| 2002/0100751 A1 | 8/2002 | Carr |
| 2002/0102674 A1 | 8/2002 | Anderson |
| 2002/0131914 A1 | 9/2002 | Sung |
| 2002/0143417 A1 | 10/2002 | Ito et al. |
| 2002/0168466 A1 | 11/2002 | Tapphorn et al. |
| 2002/0182735 A1 | 12/2002 | Kibby et al. |
| 2002/0183191 A1 | 12/2002 | Faber et al. |
| 2002/0192129 A1 | 12/2002 | Shamouilian et al. |
| 2003/0036786 A1 | 2/2003 | Duren et al. |
| 2003/0042232 A1 | 3/2003 | Shimazu |
| 2003/0047617 A1 | 3/2003 | Shanmugham et al. |
| 2003/0066800 A1 | 4/2003 | Saim et al. |
| 2003/0085663 A1 | 5/2003 | Horsky |
| 2003/0102099 A1 | 6/2003 | Yadav et al. |
| 2003/0108459 A1 | 6/2003 | Wu et al. |
| 2003/0110931 A1 | 6/2003 | Aghajanian et al. |
| 2003/0129098 A1 | 7/2003 | Endo et al. |
| 2003/0139288 A1 | 7/2003 | Cai et al. |
| 2003/0143153 A1 | 7/2003 | Boulos et al. |
| 2003/0172772 A1 | 9/2003 | Sethuram et al. |
| 2003/0223546 A1 | 12/2003 | McGregor et al. |
| 2004/0007092 A1 | 1/2004 | Yoshimura |
| 2004/0009118 A1 | 1/2004 | Phillips et al. |
| 2004/0023302 A1 | 2/2004 | Archibald et al. |
| 2004/0023453 A1 | 2/2004 | Xu et al. |
| 2004/0065170 A1 | 4/2004 | Wu et al. |
| 2004/0077494 A1 | 4/2004 | LaBarge et al. |
| 2004/0103751 A1 | 6/2004 | Joseph et al. |
| 2004/0109523 A1 | 6/2004 | Singh et al. |
| 2004/0119064 A1 | 6/2004 | Narayan et al. |
| 2004/0127586 A1 | 7/2004 | Jin et al. |
| 2004/0129222 A1 | 7/2004 | Nylen et al. |
| 2004/0166036 A1 | 8/2004 | Chen et al. |
| 2004/0167009 A1 | 8/2004 | Kuntz et al. |
| 2004/0176246 A1 | 9/2004 | Shirk et al. |
| 2004/0178530 A1 | 9/2004 | Yadav |
| 2004/0208805 A1 | 10/2004 | Fincke et al. |
| 2004/0213998 A1 | 10/2004 | Hearley et al. |
| 2004/0235657 A1 | 11/2004 | Xiao et al. |
| 2004/0238345 A1 | 12/2004 | Koulik et al. |
| 2004/0251017 A1 | 12/2004 | Pillion et al. |
| 2004/0251241 A1 | 12/2004 | Blutke et al. |
| 2005/0000321 A1 | 1/2005 | O'Larey et al. |

(56) References Cited

U.S. PATENT DOCUMENTS

| | | |
|---|---|---|
| 2005/0000950 A1 | 1/2005 | Schroder et al. |
| 2005/0058797 A1 | 3/2005 | Sen et al. |
| 2005/0066805 A1 | 3/2005 | Park et al. |
| 2005/0070431 A1 | 3/2005 | Alvin et al. |
| 2005/0077034 A1 | 4/2005 | King |
| 2005/0097988 A1 | 5/2005 | Kodas et al. |
| 2005/0106865 A1 | 5/2005 | Chung et al. |
| 2005/0119398 A1 | 6/2005 | Zhang |
| 2005/0133121 A1 | 6/2005 | Subramanian et al. |
| 2005/0153069 A1 | 7/2005 | Tapphorn et al. |
| 2005/0163673 A1 | 7/2005 | Johnson et al. |
| 2005/0199739 A1 | 9/2005 | Kuroda et al. |
| 2005/0211018 A1 | 9/2005 | Jurewicz et al. |
| 2005/0220695 A1 | 10/2005 | Abatzoglou et al. |
| 2005/0227864 A1 | 10/2005 | Sutorik et al. |
| 2005/0233380 A1 | 10/2005 | Pesiri et al. |
| 2005/0240069 A1 | 10/2005 | Polverejan et al. |
| 2005/0258766 A1 | 11/2005 | Kim |
| 2005/0274646 A1 | 12/2005 | Lawson et al. |
| 2005/0275143 A1 | 12/2005 | Toth |
| 2006/0043651 A1 | 3/2006 | Yamamoto et al. |
| 2006/0051505 A1 | 3/2006 | Kortshagen et al. |
| 2006/0068989 A1 | 3/2006 | Ninomiya et al. |
| 2006/0094595 A1 | 5/2006 | Labarge |
| 2006/0096393 A1 | 5/2006 | Pesiri |
| 2006/0105910 A1 | 5/2006 | Zhou et al. |
| 2006/0108332 A1 | 5/2006 | Belashchenko |
| 2006/0153728 A1 | 7/2006 | Schoenung et al. |
| 2006/0153765 A1 | 7/2006 | Pham-Huu et al. |
| 2006/0159596 A1 | 7/2006 | De La Veaux et al. |
| 2006/0166809 A1 | 7/2006 | Malek et al. |
| 2006/0211569 A1 | 9/2006 | Dang et al. |
| 2006/0213326 A1 | 9/2006 | Gollob et al. |
| 2006/0222780 A1 | 10/2006 | Gurevich et al. |
| 2006/0231525 A1 | 10/2006 | Asakawa et al. |
| 2007/0009752 A1 | 1/2007 | Lefebvre et al. |
| 2007/0014919 A1 | 1/2007 | Hamalainen et al. |
| 2007/0020167 A1 | 1/2007 | Han et al. |
| 2007/0044513 A1 | 3/2007 | Kear et al. |
| 2007/0048206 A1 | 3/2007 | Hung et al. |
| 2007/0049484 A1 | 3/2007 | Kear et al. |
| 2007/0063364 A1 | 3/2007 | Hsiao et al. |
| 2007/0084308 A1 | 4/2007 | Nakamura et al. |
| 2007/0084834 A1 | 4/2007 | Hanus et al. |
| 2007/0087934 A1 | 4/2007 | Martens et al. |
| 2007/0092768 A1 | 4/2007 | Lee et al. |
| 2007/0153390 A1 | 7/2007 | Nakamura et al. |
| 2007/0161506 A1 | 7/2007 | Saito et al. |
| 2007/0163385 A1 | 7/2007 | Takahashi et al. |
| 2007/0172721 A1 | 7/2007 | Pak et al. |
| 2007/0173403 A1 | 7/2007 | Koike et al. |
| 2007/0178673 A1 | 8/2007 | Gole et al. |
| 2007/0221404 A1 | 9/2007 | Das et al. |
| 2007/0253874 A1 | 11/2007 | Foret |
| 2007/0259768 A1 | 11/2007 | Kear et al. |
| 2007/0266825 A1 | 11/2007 | Ripley et al. |
| 2007/0292321 A1 | 12/2007 | Plischke et al. |
| 2008/0006954 A1 | 1/2008 | Yubuta et al. |
| 2008/0026041 A1 | 1/2008 | Tepper et al. |
| 2008/0026932 A1 | 1/2008 | Satoh et al. |
| 2008/0031806 A1 | 2/2008 | Gavenonis et al. |
| 2008/0038578 A1 | 2/2008 | Li |
| 2008/0045405 A1 | 2/2008 | Beutel et al. |
| 2008/0047261 A1 | 2/2008 | Han et al. |
| 2008/0056977 A1 | 3/2008 | Hung et al. |
| 2008/0057212 A1 | 3/2008 | Dorier et al. |
| 2008/0064769 A1 | 3/2008 | Sato et al. |
| 2008/0104735 A1 | 5/2008 | Howland |
| 2008/0105083 A1 | 5/2008 | Nakamura et al. |
| 2008/0107586 A1 | 5/2008 | Smalley et al. |
| 2008/0108005 A1 | 5/2008 | Carpenter |
| 2008/0116118 A1 | 5/2008 | Zhu et al. |
| 2008/0116178 A1 | 5/2008 | Weidman |
| 2008/0125308 A1 | 5/2008 | Fujdala et al. |
| 2008/0125313 A1 | 5/2008 | Fujdala et al. |
| 2008/0138651 A1 | 6/2008 | Doi et al. |
| 2008/0175936 A1 | 7/2008 | Tokita et al. |
| 2008/0187714 A1 | 8/2008 | Wakamatsu et al. |
| 2008/0202288 A1 | 8/2008 | McKechnie et al. |
| 2008/0206562 A1 | 8/2008 | Stucky et al. |
| 2008/0207858 A1 | 8/2008 | Kowaleski et al. |
| 2008/0248704 A1 | 10/2008 | Mathis et al. |
| 2008/0268270 A1 | 10/2008 | Chen et al. |
| 2008/0274344 A1 | 11/2008 | Veith et al. |
| 2008/0277092 A1 | 11/2008 | Layman et al. |
| 2008/0277264 A1 | 11/2008 | Sprague |
| 2008/0277266 A1 | 11/2008 | Layman |
| 2008/0277267 A1 | 11/2008 | Biberger et al. |
| 2008/0277268 A1 | 11/2008 | Layman |
| 2008/0277269 A1 | 11/2008 | Layman et al. |
| 2008/0277270 A1 | 11/2008 | Biberger et al. |
| 2008/0277271 A1 | 11/2008 | Layman |
| 2008/0280049 A1 | 11/2008 | Kevwitch et al. |
| 2008/0280751 A1 | 11/2008 | Harutyunyan et al. |
| 2008/0280756 A1 | 11/2008 | Biberger |
| 2008/0283411 A1 | 11/2008 | Eastman et al. |
| 2008/0283498 A1 | 11/2008 | Yamazaki |
| 2008/0307960 A1 | 12/2008 | Hendrickson et al. |
| 2009/0010801 A1 | 1/2009 | Murphy et al. |
| 2009/0018008 A1 | 1/2009 | Jankowiak et al. |
| 2009/0054230 A1 | 2/2009 | Veeraraghavan et al. |
| 2009/0080592 A1 | 3/2009 | Arsenlis et al. |
| 2009/0081092 A1 | 3/2009 | Yang et al. |
| 2009/0088585 A1 | 4/2009 | Schammel et al. |
| 2009/0092887 A1 | 4/2009 | McGrath et al. |
| 2009/0098402 A1 | 4/2009 | Kang et al. |
| 2009/0114568 A1 | 5/2009 | Trevino et al. |
| 2009/0162991 A1 | 6/2009 | Beneyton et al. |
| 2009/0168506 A1 | 7/2009 | Han et al. |
| 2009/0170242 A1 | 7/2009 | Lin et al. |
| 2009/0181474 A1 | 7/2009 | Nagai |
| 2009/0200180 A1 | 8/2009 | Capote et al. |
| 2009/0208367 A1 | 8/2009 | Calio et al. |
| 2009/0209408 A1 | 8/2009 | Kitamura et al. |
| 2009/0223410 A1 | 9/2009 | Jun et al. |
| 2009/0238736 A1 | 9/2009 | Takahashi |
| 2009/0253037 A1 | 10/2009 | Park et al. |
| 2009/0274897 A1 | 11/2009 | Kaner et al. |
| 2009/0274903 A1 | 11/2009 | Addiego |
| 2009/0286899 A1 | 11/2009 | Hofmann et al. |
| 2009/0320449 A1 | 12/2009 | Beutel et al. |
| 2009/0324468 A1 | 12/2009 | Golden et al. |
| 2010/0050868 A1 | 3/2010 | Kuznicki et al. |
| 2010/0089002 A1 | 4/2010 | Merkel |
| 2010/0089742 A1 | 4/2010 | Suslov |
| 2010/0092358 A1 | 4/2010 | Koegel et al. |
| 2010/0124514 A1 | 5/2010 | Chelluri et al. |
| 2010/0166629 A1 | 7/2010 | Deeba |
| 2010/0180581 A1 | 7/2010 | Grubert et al. |
| 2010/0180582 A1 | 7/2010 | Mueller-Stach et al. |
| 2010/0180820 A1 | 7/2010 | Ishimaru et al. |
| 2010/0186375 A1 | 7/2010 | Kazi et al. |
| 2010/0240525 A1 | 9/2010 | Golden et al. |
| 2010/0260652 A1 | 10/2010 | Nakane et al. |
| 2010/0275781 A1 | 11/2010 | Tsangaris |
| 2010/0283013 A1 | 11/2010 | Sato et al. |
| 2010/0323118 A1 | 12/2010 | Mohanty et al. |
| 2011/0006463 A1 | 1/2011 | Layman |
| 2011/0030346 A1 | 2/2011 | Neubauer et al. |
| 2011/0049045 A1 | 3/2011 | Hurt et al. |
| 2011/0052467 A1 | 3/2011 | Chase et al. |
| 2011/0052698 A1 | 3/2011 | Benoit et al. |
| 2011/0143041 A1 | 6/2011 | Layman et al. |
| 2011/0143915 A1 | 6/2011 | Yin et al. |
| 2011/0143916 A1 | 6/2011 | Leamon |
| 2011/0143926 A1 | 6/2011 | Yin et al. |
| 2011/0143930 A1 | 6/2011 | Yin et al. |
| 2011/0143933 A1 | 6/2011 | Yin et al. |
| 2011/0144382 A1 | 6/2011 | Yin et al. |
| 2011/0152550 A1 | 6/2011 | Grey et al. |
| 2011/0154807 A1 | 6/2011 | Chandler et al. |
| 2011/0158871 A1 | 6/2011 | Arnold et al. |
| 2011/0174604 A1 | 7/2011 | Duesel et al. |
| 2011/0180750 A1 | 7/2011 | Kleine Jaeger et al. |

(56) References Cited

U.S. PATENT DOCUMENTS

| | | |
|---|---|---|
| 2011/0243808 A1 | 10/2011 | Fossey et al. |
| 2011/0245073 A1 | 10/2011 | Oljaca et al. |
| 2011/0247336 A9 | 10/2011 | Farsad et al. |
| 2011/0271658 A1 | 11/2011 | Hoyer et al. |
| 2011/0305612 A1 | 12/2011 | Müller-Stach et al. |
| 2012/0023909 A1 | 2/2012 | Lambert et al. |
| 2012/0045373 A1 | 2/2012 | Biberger |
| 2012/0063963 A1 | 3/2012 | Watanabe et al. |
| 2012/0097033 A1 | 4/2012 | Arnold et al. |
| 2012/0122660 A1 | 5/2012 | Andersen et al. |
| 2012/0124974 A1 | 5/2012 | Li et al. |
| 2012/0171098 A1 | 7/2012 | Hung et al. |
| 2012/0214666 A1 | 8/2012 | van den Hoek et al. |
| 2012/0263633 A1 | 10/2012 | Koplin et al. |
| 2012/0285548 A1 | 11/2012 | Layman et al. |
| 2012/0308467 A1 | 12/2012 | Carpenter et al. |
| 2012/0313269 A1 | 12/2012 | Kear et al. |
| 2013/0034472 A1 | 2/2013 | Cantrell et al. |
| 2013/0064750 A1 | 3/2013 | Zettl |
| 2013/0079216 A1 | 3/2013 | Biberger et al. |
| 2013/0125970 A1 | 5/2013 | Ko et al. |
| 2013/0213018 A1 | 8/2013 | Yin et al. |
| 2013/0270355 A1 | 10/2013 | Cotler et al. |
| 2013/0280528 A1 | 10/2013 | Biberger |
| 2013/0281288 A1 | 10/2013 | Biberger et al. |
| 2013/0294989 A1 | 11/2013 | Koch et al. |
| 2013/0316896 A1 | 11/2013 | Biberger |
| 2013/0331257 A1 | 12/2013 | Barcikowski et al. |
| 2013/0345047 A1 | 12/2013 | Biberger et al. |
| 2014/0018230 A1 | 1/2014 | Yin et al. |
| 2014/0120355 A1 | 5/2014 | Biberger |
| 2014/0128245 A1 | 5/2014 | Yin et al. |
| 2014/0140909 A1 | 5/2014 | Qi et al. |
| 2014/0148331 A1 | 5/2014 | Biberger et al. |
| 2014/0161693 A1 | 6/2014 | Brown et al. |
| 2014/0209451 A1 | 7/2014 | Biberger et al. |
| 2014/0228201 A1 | 8/2014 | Mendoza Gómez et al. |
| 2014/0243187 A1 | 8/2014 | Yin et al. |
| 2014/0249021 A1 | 9/2014 | van den Hoek et al. |
| 2014/0252270 A1 | 9/2014 | Lehman, Jr. |
| 2014/0263190 A1 | 9/2014 | Biberger et al. |
| 2014/0318318 A1 | 10/2014 | Layman et al. |
| 2014/0338519 A1 | 11/2014 | Biberger |
| 2015/0093312 A1 | 4/2015 | Yin et al. |
| 2015/0140317 A1 | 5/2015 | Biberger et al. |
| 2015/0141236 A1 | 5/2015 | Yin et al. |
| 2015/0165418 A1 | 6/2015 | Kearl et al. |
| 2015/0174564 A1* | 6/2015 | Muller-Stach ........ B01J 37/0244 423/213.5 |
| 2015/0196884 A1 | 7/2015 | Layman |
| 2015/0217229 A1* | 8/2015 | Yin ...................... B01D 53/944 423/213.5 |
| 2015/0266002 A1 | 9/2015 | Biberger et al. |
| 2015/0314260 A1 | 11/2015 | Biberger |
| 2015/0314581 A1 | 11/2015 | Biberger |
| 2015/0367331 A1 | 12/2015 | Biberger |
| 2016/0038874 A1* | 2/2016 | Yin ...................... B01D 53/945 423/213.2 |
| 2016/0045867 A1 | 2/2016 | Kearl et al. |
| 2016/0059216 A1* | 3/2016 | Qi ......................... B01D 53/00 423/213.2 |
| 2016/0067679 A1 | 3/2016 | Yin et al. |
| 2016/0074855 A1* | 3/2016 | Qi ........................ B01J 37/0228 502/304 |

FOREIGN PATENT DOCUMENTS

| | | |
|---|---|---|
| CN | 101301610 A | 11/2008 |
| DE | 34 45 273 A1 | 6/1986 |
| EP | 0 223 104 A1 | 5/1987 |
| EP | 0 347 386 A1 | 12/1989 |
| EP | 0 385 742 A1 | 9/1990 |
| EP | 1 134 302 A1 | 9/2001 |
| EP | 1 256 378 A2 | 11/2002 |
| EP | 1 619 168 A1 | 1/2006 |
| EP | 1 721 690 A1 | 11/2006 |
| EP | 1 790 612 A1 | 5/2007 |
| EP | 1 955 765 A1 | 8/2008 |
| GB | 1 307 941 A | 2/1973 |
| JP | 30-13577 U | 9/1955 |
| JP | 47-21256 U | 2/1971 |
| JP | 49-31571 A | 3/1974 |
| JP | 51-7582 U | 7/1974 |
| JP | 52-165360 U | 6/1976 |
| JP | 56-146804 A | 11/1981 |
| JP | 58-160794 A | 9/1983 |
| JP | 59-59410 A | 4/1984 |
| JP | 61-086815 A | 5/1986 |
| JP | 61-242644 A | 10/1986 |
| JP | 62-102827 A | 5/1987 |
| JP | 63-214342 A | 9/1988 |
| JP | 1-164795 A | 6/1989 |
| JP | 1-275708 A | 11/1989 |
| JP | 2-6339 A | 1/1990 |
| JP | 2-160040 A | 6/1990 |
| JP | 2-203932 A | 8/1990 |
| JP | 3-226509 A | 10/1991 |
| JP | 5-193909 A | 8/1993 |
| JP | 05-228361 A | 9/1993 |
| JP | 05-324094 A | 12/1993 |
| JP | 6-91162 A | 4/1994 |
| JP | 6-93309 A | 4/1994 |
| JP | 6-135797 A | 5/1994 |
| JP | 6-172820 A | 6/1994 |
| JP | 6-272012 A | 9/1994 |
| JP | H6-065772 U | 9/1994 |
| JP | 07-031873 A | 2/1995 |
| JP | 7-20553 B2 | 3/1995 |
| JP | 7-120176 A | 5/1995 |
| JP | 7-138020 A | 5/1995 |
| JP | 7-207381 A | 8/1995 |
| JP | 07-256116 A | 10/1995 |
| JP | 8-158033 A | 6/1996 |
| JP | 8-215576 A | 8/1996 |
| JP | 8-217420 A | 8/1996 |
| JP | 9-141087 A | 6/1997 |
| JP | 10-130810 A | 5/1998 |
| JP | 10-249198 A | 9/1998 |
| JP | 11-502760 A | 3/1999 |
| JP | 11-300198 A | 11/1999 |
| JP | 2000-220978 A | 8/2000 |
| JP | 2002-88486 A | 3/2002 |
| JP | 2002-241812 A | 8/2002 |
| JP | 2002-263496 A | 9/2002 |
| JP | 2002-336688 A | 11/2002 |
| JP | 2003-126694 A | 5/2003 |
| JP | 2003-170043 A | 6/2003 |
| JP | 2003-261323 A | 9/2003 |
| JP | 2004-233007 A | 8/2004 |
| JP | 2004-249206 A | 9/2004 |
| JP | 2004-290730 A | 10/2004 |
| JP | 2005-503250 A | 2/2005 |
| JP | 2005-122621 A | 5/2005 |
| JP | 2005-218937 A | 8/2005 |
| JP | 2005-342615 A | 12/2005 |
| JP | 2006-001779 A | 1/2006 |
| JP | 2006-508885 A | 3/2006 |
| JP | 2006-87965 A | 4/2006 |
| JP | 2006-181484 A | 7/2006 |
| JP | 2006-247446 A | 9/2006 |
| JP | 2006-260385 A | 9/2006 |
| JP | 2006-272265 A | 10/2006 |
| JP | 2006-326554 A | 12/2006 |
| JP | 2007-29859 A | 2/2007 |
| JP | 2007-44585 A | 2/2007 |
| JP | 2007-46162 A | 2/2007 |
| JP | 2007-138287 A | 6/2007 |
| JP | 2007-203129 A | 8/2007 |
| JP | 2007-222732 A | 9/2007 |
| JP | 2007-253037 A | 10/2007 |
| JP | 2009-254929 A | 11/2009 |
| JP | 2009-279544 A | 12/2009 |
| SU | 493241 A | 3/1976 |
| TW | 200611449 | 4/2006 |

(56) References Cited

FOREIGN PATENT DOCUMENTS

| TW | 201023207 | 6/2010 |
|---|---|---|
| WO | WO-96/28577 A1 | 9/1996 |
| WO | WO-00/16882 | 3/2000 |
| WO | WO-00/72965 A1 | 12/2000 |
| WO | WO-02/092503 A1 | 11/2002 |
| WO | WO-03/094195 A1 | 11/2003 |
| WO | WO-2004/052778 A2 | 6/2004 |
| WO | WO-2005/063390 A1 | 7/2005 |
| WO | WO-2006/079213 A1 | 8/2006 |
| WO | WO-2006/096205 A2 | 9/2006 |
| WO | WO-2007/144447 A1 | 12/2007 |
| WO | WO-2008/088649 A1 | 7/2008 |
| WO | WO-2008/092478 A1 | 8/2008 |
| WO | WO-2008/130451 A2 | 10/2008 |
| WO | WO-2008/130451 A3 | 10/2008 |
| WO | WO-2009/017479 A1 | 2/2009 |
| WO | WO-2011/081833 A1 | 7/2011 |
| WO | WO-2011/081834 A1 | 7/2011 |
| WO | WO-2012/028695 A2 | 3/2012 |
| WO | WO-2013/028575 A1 | 2/2013 |
| WO | WO-2013/093597 A2 | 6/2013 |
| WO | WO-2013/151557 A1 | 10/2013 |

OTHER PUBLICATIONS

Date, A. R. et al. (1987). "The Potential of Fire Assay and Inductively Coupled Plasama Source Mass Spectrometry for the Determination of Platinum Group Elements in Geological Materials," *Analyst* 112: 1217-1222.

Lamouroux, E. et al. (2007). "Identification of Key Parameters for the Selective Growth of Single or Double Wall Carbon Nanotubes on FeMo/Al$_2$O$_3$ CVD Catalysts," *Applied Catalysts A: General* 323: 162-173.

Martinez-Hansen, V. et al. (2009). "Development of Aligned Carbon Nanotubes Layers Over Stainless Steel Mesh Monoliths," *Catalysis Today* 147S: S71-S75.

Panchula, M. L. et al. (2003). "Nanocrystalline Aluminum Nitride: I, Vapor-Phase Synthesis in a Forced-Flow Reactor," *Journal of the American Ceramic Society* 86(7): 1114-1120.

Strobel, R. et al. (2003). "Flame-made Platinum/Alumina: Structural Properties and Catalytic Behaviour in Enantioselective Hydrogenation," *Journal of Catalysis* 213: 296-304.

Ahmad, K. et al. (2008). "Hybrid Nanocomposites: A New Route Towards Tougher Alumina Ceramics," *Composites Science and Technology* 68: 1321-1327.

Babin, A. et al. (1985). "Solvents Used in the Arts," *Center for Safety in the Arts*: 16 pages.

Bateman, J. E. et al. (Dec. 17, 1998). "Alkylation of Porous Silicon by Direct Reaction with Alkenes and Alkynes," *Angew. Chem Int. Ed.* 37(19):2683-2685.

Carrot, G. et al. (Sep. 17, 2002). "Surface-Initiated Ring-Opening Polymerization: A Versatile Method for Nanoparticle Ordering," *Macromolecules* 35(22):8400-8404.

Chaim, R. et al. (2009). "Densification of Nanocrystalline Y$_2$O$_3$ Ceramic Powder by Spark Plasma Sintering," *Journal of European Ceramic Society* 29: 91-98.

Chau, J. K. H. et al. (2005). "Microwave Plasma Synthesis of Silver Nanopowders," *Materials Letters* 59: 905-908.

Chen, H.-S. et al. (Jul. 3, 2001). "On the Photoluminescence of Si Nanoparticles," *Mater. Phys. Mech.* 4:62-66.

Chen, W.-J. et al. (Mar. 18, 2008). "Functional Fe$_3$O$_4$/TiO$_2$ Core/Shell Magnetic Nanoparticles as Photokilling Agents for Pathogenic Bacteria," *Small* 4(4): 485-491.

Das, N. et al. (2001). "Influence of the Metal Function in the "One-Pot" Synthesis of 4-Methyl-2-Pentanone (Methyl Isobutyl Ketone) from Acetone Over Palladium Supported on Mg(Al)O Mixed Oxides Catalysts," *Catalysis Letters* 71(3-4): 181-185.

Faber, K. T. et al. (Sep. 1988). "Toughening by Stress-Induced Microcracking in Two-Phase Ceramics," *Journal of the American Ceramic Society* 71: C-399-C401.

Fauchais, P. et al. (Jun. 1989). "La Projection Par Plasma: Une Revue," *Ann. Phys. Fr.* 14(3):261-310.

Fauchais, P. et al. (Jan. 1993). "Les Dépôts Par Plasma Thermique," *Revue Générale De L'Electricité*, RGE, Paris, France, No. 2, pp. 7-12 (in French).

Fauchais, P. et al. (Jan. 1996). "Plasma Spray: Study of the Coating Generation," *Ceramics International* 22(4):295-303.

Fojtik, A. et al. (Apr. 29, 1994). "Luminescent Colloidal Silicon Particles," *Chemical Physics Letters* 221:363-367.

Fojtik, A. (Jan. 13, 2006). "Surface Chemistry of Luminescent Colloidal Silicon Nanoparticles," *J. Phys. Chem. B.* 110(5):1994-1998.

Gangeri, M. et al. (2009). "Fe and Pt Carbon Nanotubes for the Electrocatalytic Conversion of Carbon Dioxide to Oxygenates," *Catalysis Today* 143: 57-63.

Gutsch, A. et al. (2002). "Gas-Phase Production of Nanoparticles," *Kona* No. 20, pp. 24-37.

Han, B. Q. et al. (Jan. 2004). "Deformation Mechanisms and Ductility of Nanostructured Al Alloys", *Mat. Res. Soc. Symp. Proc.* 821:p. 9.1.1-p. 9.1.6.

Heberlein, J. (2002). "New Approaches in Thermal Plasma Technology", *Pure Appl. Chem.* 74(3):327-335.

Hua, F. et al. (Mar. 2006). "Organically Capped Silicon Nanoparticles With Blue Photoluminescence Prepared by Hydrosilylation Followed by Oxidation," *Langmuir* 22(9):4363-4370.

Ihlein, G. et al.(1998). "Ordered Porous Materials as Media for the Organization of Matter on the Nanoscale," *Applied Organometallic Chemistry* 12: 305-314.

Ji, Y. et al. (Nov. 2002) "Processing and Mechanical Properties of Al$_2$O$_3$-5 vol.% Cr Nanocomposites," *Journal of the European Ceramic Society* 22(12):1927-1936.

Jouet, R. J. et al. (Jan. 25, 2005). "Surface Passivation of Bare Aluminum Nanoparticles Using Perfluoroalkyl Carboxylic Acids," *Chem. Mater.*17(11):2987-2996.

Kenvin, J. C. et al. (1992). "Supported Catalysts Prepared from Mononuclear Copper Complexes: Catalytic Properties", *J. Catalysis* 135:81-91.

Konrad, H. et al. (1996). "Nanostructured Cu—Bi Alloys Prepared by Co-Evaporation in a Continuous Gas Flow," *NanoStructured Materials* 7(6):605-610.

Kim, N. Y. et al. (Mar. 5, 1997). "Thermal Derivatization of Porous Silicon with Alcohols," *J. Am. Chem. Soc.* 119(9):2297-2298.

Kwon, Y.-S. et al. (Apr. 30, 2003). "Passivation Process for Superfine Aluminum Powders Obtained by Electrical Explosion of Wires," *Applied Surface Science* 211:57-67.

Lakis, R. E. et al. (1995). "Alumina-Supported Pt—Rh Catalysts: I. Microstructural Characterization," *Journal of Catalysis* 154: 261-275.

Langner, A. et al. (Aug. 25, 2005). "Controlled Silicon Surface Functionalization by Alkene Hydrosilylation," *J. Am. Chem. Soc.* 127(37):12798-12799.

Li, D. et al. (Apr. 9, 2005). "Environmentally Responsive "Hairy" Nanoparticles: Mixed Homopolymer Brushes on Silica Nanoparticles Synthesized by Living Radical Polymerization Techniques," *J. Am. Chem. Soc.* 127(7):6248-6256.

Li, X. et al. (May 25, 2004). "Surface Functionalization of Silicon Nanoparticles Produced by Laser-Driven Pyrolysis of Silane Followed by HF—HNO$_3$ Etching," *Langmuir* 20(11):4720-4727.

Liao, Y.-C. et al. (Jun. 27, 2006). "Self-Assembly of Organic Monolayers on Aerosolized Silicon Nanoparticles," *J.Am. Chem. Soc.* 128(28):9061-9065.

Liu, S.-M. et al. (Jan. 13, 2006). "Enhanced Photoluminescence from Si Nano-Organosols by Functionalization With Alkenes and Their Size Evolution," *Chem. Mater.* 18(3):637-642.

Luo, J. et al. (2008). "Core/Shell Nanoparticles as Electrocatalysts for Fuel Cell Reactions," *Advanced Materials* 20: 4342-4347.

Mignard, D. et al. (2003). "Methanol Synthesis from Flue-Gas CO$_2$ and Renewable Electricity: A Feasibility Study," *International Journal of Hydrogen Energy* 28: 455-464.

Mühlenweg, H. et al. (2004). "Gas-Phase Reactions—Open Up New Roads to Nanoproducts," *Degussa ScienceNewsletter* No. 08, pp. 12-16.

(56) References Cited

OTHER PUBLICATIONS

Nagai, Y. et al. (Jul. 3, 2006). "Sintering Inhibition Mechanism of Platinum Supported on Ceria-Based Oxide and Pt—Oxide-Support Interaction," *J. Catalysis* 242:103-109.
NASA (2009). "Enthalpy," Article located at http://www.grc.nasa.gov/WWW/K-12/airplane/enthalpy.htrnl, published by National Aeronautics and Space Administration on Nov. 23, 2009, 1 page.
Neiner, D. (Aug. 5, 2006). "Low-Temperature Solution Route to Macroscopic Amounts of Hydrogen Terminated Silicon Nanoparticles," *J. Am. Chem. Soc.* 128:11016-11017.
Netzer, L. et al. (1983). "A New Approach to Construction of Artificial Monolayer Assemblies," *J. Am. Chem. Soc.* 105(3):674-676.
Park, H.-Y. et al. (May 30, 2007). "Fabrication of Magnetic Core@Shell Fe Oxide@Au Nanoparticles for Interfacial Bioactivity and Bio-Separation," *Langmuir* 23: 9050-9056.
Park, N.-G. et al. (Feb. 17, 2004). "Morphological and Photoelectrochemical Characterization of Core-Shell Nanoparticle Films for Dye-Sensitized Solar Cells: Zn—O Type Shell on $SnO_2$ and $TiO_2$ Cores," *Langmuir* 20: 4246-4253.
"Plasma Spray and Wire Flame Spray Product Group," located at http://www.processmaterials.com/spray.html, published by Process Materials, Inc., last accessed Aug. 5, 2013, 2 pages.
"Platinum Group Metals: Annual Review 1996" (Oct. 1997). Engineering and Mining Journal, p. 63.
Rahaman, R. A. et al. (1995). "Synthesis of Powders," in *Ceramic Processing and Sintering*. Marcel Decker, Inc., New York, pp. 71-77.
Sailor, M. J. (1997). "Surface Chemistry of Luminescent Silicon Nanocrystallites," *Adv. Mater.* 9(10):783-793.
Schimpf, S. et al. (2002). "Supported Gold Nanoparticles: In-Depth Catalyst Characterization and Application in Hydrogenation and Oxidation Reactions," *Catalysis Today* 2592: 1-16.
Stiles, A. B. (Jan. 1, 1987). "Manufacture of Carbon-Supported Metal Catalysts," in *Catalyst Supports and Supported Catalysts*, Butterworth Publishers, MA, pp. 125-132.
Subramanian, S. et al. (1991). "Structure and Activity of Composite Oxide Supported Platinum—Iridium Catalysts," *Applied Catalysts* 74: 65-81.
Tao, Y.-T. (May 1993). "Structural Comparison of Self-Assembled Monolayers of *n*-Alkanoic Acids on the surfaces of Silver, Copper, and Aluminum," *J. Am. Chem. Soc.* 115(10):4350-4358.
Ünal, N. et al. (Nov. 2011). "Influence of WC Particles on the Microstructural and Mechanical Properties of 3 mol% $Y_2O_3$ Stabilized $ZrO_2$ Matrix Composites Produced by Hot Pressing," *Journal of the European Ceramic Society* (31)13: 2267-2275.
Vardelle, A. et al. (1996). "Coating Generation: Vaporization of Particles in Plasma Spraying and Splat Formation," Universite de Limoges, 123 Avenue A. Thomas 87000, Limoges, France, *Pure & Appl. Chem.* 68(5):1093-1099.
Vardelle, M. et al. (Jun. 1991). "Experimental Investigation of Powder Vaporization in Thermal Plasma Jets," *Plasma Chemistry and Plasma Processing* 11(2):185-201.
Viswanathan, V. et al. (2006). "Challenges and Advances in Nanocomposite Processing Techniques," *Materials Science and Engineering* R 54: 121-285.
Wan, J. et al. (2005). "Spark Plasma Sintering of Silicon Nitride/ Silicon Carbide Nanocomposites with Reduced Additive Amounts," *Scripta Materialia* 53: 663-667.
Yoshida, T. (1994). "The Future of Thermal Plasma Processing for Coating", *Pure & Appl. Chem.* 66(6):1223-1230.
Zou, J. et al. (Jun. 4, 2004). "Solution Synthesis of Ultrastable Luminescent Siloxane-Coated Silicon Nanoparticles," *Nano Letters* 4(7):1181-1186.
U.S. Appl. No. 13/291,983, filed Nov. 8, 2011, for Layman et al.
U.S. Appl. No. 12/152,084, filed May 9, 2008, for Biberger.
U.S. Appl. No. 13/028,693, filed Feb. 16, 2011, for Biberger.
U.S. Appl. No. 12/943,909, filed Nov. 10, 2010, for Layman.
U.S. Appl. No. 12/152,111, filed May 9, 2008, for Biberger et al.
U.S. Appl. No. 12/151,830, filed May 8, 2008, for Biberger et al.
U.S. Appl. No. 12/968,248, filed Dec. 14, 2010, for Biberger.
U.S. Appl. No. 12/968,245, filed Dec. 14, 2010, for Biberger.
U.S. Appl. No. 12/968,241, filed Dec. 14, 2010, for Biberger.
U.S. Appl. No. 12/968,239, filed Dec. 14, 2010, for Biberger.
U.S. Appl. No. 12/969,128, filed Dec. 15, 2010, for Biberger.
U.S. Appl. No. 12/962,463, filed Dec. 7, 2010, for Leamon.
U.S. Appl. No. 12/961,030, filed Dec. 6, 2010, for Lehman.
U.S. Appl. No. 12/961,108, filed Dec. 6, 2010, for Lehman.
U.S. Appl. No. 12/961,200, filed Dec. 6, 2010, for Lehman.
U.S. Appl. No. 12/968,253, filed Dec. 14, 2010, for Biberger.
U.S. Appl. No. 12/968,235, filed Dec. 14, 2010, for Biberger.
U.S. Appl. No. 12/969,306, filed Dec. 15, 2010, for Lehman et al.
U.S. Appl. No. 12/969,447, filed Dec. 15, 2010, for Biberger et al.
U.S. Appl. No. 12/969,087, filed Dec. 15, 2010, for Biberger.
U.S. Appl. No. 12/962,533, filed Dec. 7, 2010, for Yin et al.
U.S. Appl. No. 12/962,523, filed Dec. 7, 2010, for Yin et al.
U.S. Appl. No. 12/001,643, filed Dec. 11, 2007, for Biberger et al.
U.S. Appl. No. 12/474,081, filed May 28, 2009, for Biberger et al.
U.S. Appl. No. 12/001,602, filed Dec. 11, 2007, for Biberger et al.
U.S. Appl. No. 12/001,644, filed Dec. 11, 2007, for Biberger et al.
U.S. Appl. No. 12/969,457, filed Nov. 15, 2010, for Leamon et al.
U.S. Appl. No. 12/969,503, filed Nov. 15, 2010, for Leamon et al.
U.S. Appl. No. 12/954,813, filed Nov. 26, 2010, for Biberger.
U.S. Appl. No. 12/954,822, filed Nov. 26, 2010, for Biberger.
Li, J-G. et al. (2009). "Cobalt-Doped TiO2 Nanocrystallites: Radio-Frequency Thermal Plasma Processing, Phase Structure, and Magnetic Properties," *J. Phys. Chem.* 113 (19): 8009-8015.
Magdassi, S. et al. (Apr. 2010). "Triggering the Sintering of Silver Nanoparticles at Room Temperature," *ACS Nano* 4(4): 1943-1948.
Birlik, I. et al. (Jun. 15, 2010). "Nanoparticle Doped YBCO Films Prepared by Chemical Solution Deposition Method," *6th Nanoscience and Nanotechnology Conference*, Izmir, Turkey: 1 page.
Cospheric LLC. (Mar. 13, 2010). "Porous Ceramics: Application for Polyethylene Microspheres," Microspheres Online, located at http://microspheres.us/microsphere-manufacturing/porous-ceramics-polyethylene-microspheres/177.html, last accessed Mar. 17, 2015, 6 pages.
Jensen, J. et al. (2000). "Preparation of ZnO—$Al_2O_3$ Particles in a Premixed Flame," *Journal of Nanoparticle Research* 2: 363-373.

\* cited by examiner

CATALYST DESIGN FOR HEAVY-DUTY DIESEL COMBUSTION ENGINES

This application claims priority benefit of U.S. Provisional Patent Appl. No. 61/894,341, filed Oct. 22, 2013, and U.S. Provisional Patent Appl. No. 62/030,555, filed Jul. 29, 2014. The entire contents of those applications are hereby incorporated by reference herein.

FIELD OF THE INVENTION

The present invention relates to the field of catalysts. More specifically, the present disclosure relates to washcoats, coated substrates formed from such washcoats, and catalytic converters for diesel applications, such as heavy duty diesel applications.

BACKGROUND OF THE INVENTION

Growing global concern of chemical air pollutants has led a number of governing bodies to increase the emissions standards for exhaust from combustion engines. In particular, emissions standards are increasing for emissions from diesel engines and diesel vehicles, such as heavy-duty diesel engines and heavy-duty diesel vehicles. The United States Environmental Protection Agency ("U.S. EPA") defines a "heavy-duty vehicle" as those vehicles with a gross vehicle weight rating of more 8,500 pounds, except certain passenger vehicles weighing less than 10,000 pounds. The U.S. EPA further defines a "light heavy-duty diesel engine" as an engine used in a vehicle heavier than 8,500 pounds but lighter than 19,500 pounds, with the exception of certain passenger vehicles weighing less than 10,000 pounds. The U.S. EPA further defines a "medium heavy-duty diesel engine" as an engine used in a vehicle 19,500 pounds or heavier but 33,000 pounds or lighter. The U.S. EPA further defines a "heavy heavy-duty diesel engine" as an engine used in a vehicle more than 33,000 pounds. In California, "light heavy-duty diesel engines" are defined as engines used in a vehicle heavier than 14,000 pounds but lighter than 19,500 for those vehicles manufactured in the year 1995 or later. In Europe, a "heavy-duty diesel engine" has been considered to be an engine used in a vehicle of more than 3.5 metric tons (more than 7,716 pounds). A heavy-duty diesel vehicle may therefore be considered to be a diesel vehicle with a weight of more than about 7,700 pounds, or more than about 8,500 pounds, or more than about 10,000 pounds, or more than about 14,000 pounds, or more than about 19,500 pounds, or more than about 33,000 pounds, and a heavy-duty diesel engine is an engine used in a heavy-duty diesel vehicle.

Conventional, commercially available catalytic converters generally use platinum group metal (PGM) catalysts deposited on substrates using only wet-chemistry methods, such as precipitation of platinum ions and/or palladium ions from solution onto a substrate. These PGM catalysts are a considerable portion of the cost of catalytic converters. Accordingly, any reduction in the amount of PGM catalysts used to produce a catalytic converter is desirable. Commercially available catalytic converters also display a phenomenon known as "aging," in which they become less effective over time due, in part, to an agglomeration of the PGM catalyst, resulting in a decreased surface area. Accordingly, reduction of the aging effect is also desirable to prolong the efficacy of the catalytic converter for controlling emissions.

Unlike light-duty vehicles, where much of the developing technology in catalytic converters concerns increasing the catalytic efficiency of "cold-start" emissions wherein the catalytic converter is cool for much of the running time, heavy-duty vehicle engines are on for longer periods of time, increasing the average running temperature of the catalytic converter. Furthermore, emissions standards often differ for light-duty and heavy-duty vehicles. Nitrogen oxide ($NO_x$) emissions are of a particular concern, however technologies must be developed to meet other increasing emissions standards as well, including a reduction of pollutants such as carbon monoxide (CO) and hydrocarbons (HC). At the elevated average running temperature of heavy-duty vehicle catalytic converters, however, catalysis of $NO_x$ emissions and CO or HC emissions are not always maximally efficient when using the same catalyst. Therefore, there remains a need to develop catalytic converter washcoats, and catalytic converters using those washcoats, that are able to meet the increasing emissions standards for heavy-duty vehicle combustion engines while reducing the effect of aging and minimizing the amount of PGM required to produce the catalytic converter.

SUMMARY OF THE INVENTION

Disclosed are washcoats, coated substrates formed from such washcoats, and catalytic converters for use in diesel applications, such as heavy duty diesel applications.

In some embodiments, a coated substrate includes a substrate; an optional corner-fill layer disposed directly on top of the substrate, a first washcoat layer, and a second washcoat layer. In some embodiments, the coated substrate is free of zeolites or substantially free of zeolites. In some embodiments, the catalytic washcoat layers of the coated substrate are free of zeolites or substantially free of zeolites, and zeolites are optionally present in other washcoat layers. In one embodiment, the optional corner-fill layer is present and comprises zeolites. The first washcoat layer includes boehmite particles and a first catalytically active material comprising platinum and palladium in a weight ratio of equal to or less than 4:1 Pt:Pd, such as 1:1 to 4:1 Pt:Pd, 1:1 to 2:1 Pt:Pd, or 2:1 to 4:1 Pt:Pd. In one embodiment, the second washcoat layer includes boehmite particles and a second catalytically active material comprising platinum and palladium in a weight ratio of greater than 4:1 Pt:Pd and greater than the Pt:Pd ratio of the first catalytically active material, such as a weight ratio of 10:1 platinum:palladium to 100:1 platinum:palladium; in a further embodiment, the second catalytically active material comprises platinum and no palladium. In another embodiment, the second washcoat layer includes boehmite particles and two or more catalytically active materials which together comprise platinum and palladium in a weight ratio of 1:2 platinum:palladium to 8:1 platinum:palladium; in a further embodiment, these two or more catalytically active materials comprise a catalyst comprising a platinum:palladium alloy (such as about a 20:1 Pt:Pd alloy by weight) and a catalyst comprising palladium, such that the combined weight ratio of the catalysts is a weight ratio of 1:2 platinum:palladium to 8:1 platinum:palladium (such as about a 3:1 Pt:Pd ratio, about a 3.8:1 Pt:Pd ratio, about a 4:1 Pt:Pd ratio, about 5:1 Pt:Pd ratio or about a 5:1.2 Pt:Pd ratio by weight; or between about a 3:1 Pt:Pd ratio to about a 5:1 Pt:Pd ratio). The first catalytically active material and the second catalytically active material, or the two or more catalytically active materials of the second washcoat, comprise one or more materials which are independently selected from the group consisting of:

plasma-created composite nanoparticles bonded to micron-sized carrier particles, the composite nanoparticles comprises a support nanoparticle and a catalytic nanoparticle where the catalytic nanoparticle can comprise platinum metal or a platinum-palladium alloy (these plasma-created composite nanoparticles bonded to micron-sized carrier particles are referred to as NNm particles, as described herein);

a micron-sized carrier particle impregnated with platinum metal or a platinum-palladium alloy using only wet-chemistry techniques;

plasma-created composite nanoparticles bonded to micron-sized carrier particles or plasma-created nanoparticles embedded within micron-sized carrier particles where the porous micron-sized carrier particles comprise a carrier matrix which has been formed around the plasma-created nanoparticles, the composite nanoparticles comprises a support nanoparticle and a catalytic nanoparticle where the catalytic nanoparticle can comprise platinum metal or a platinum-palladium alloy, and where the micron-sized carrier particles are also impregnated with platinum metal or a platinum-palladium alloy using wet-chemistry techniques (these particles are referred to as hybrid NNm/wet-chemistry particles, as described herein); and plasma-created composite nanoparticles which are embedded within porous micron-sized carrier particles, where the porous micron-sized carrier particles comprise a carrier matrix which has been formed around the plasma-created nanoparticles, and the composite nanoparticles comprises a support nanoparticle and a catalytic nanoparticle where the catalytic nanoparticle can comprise platinum metal or a platinum-palladium alloy (these plasma-created composite nanoparticles embedded within porous micron-sized carrier particles, where the porous micron-sized carrier particles comprise a carrier matrix which has been formed around the plasma-created nanoparticles, are referred to as NNiM particles, as described herein).

In one embodiment, the first washcoat layer is disposed directly on the substrate, or directly on the corner-fill layer which is directly on the substrate, and the second washcoat layer is disposed directly on the first washcoat layer. In another embodiment, the second washcoat layer is disposed directly on the substrate, or directly on the corner-fill layer which is directly on the substrate, and the first washcoat layer is disposed directly on the second washcoat layer. That is, the first washcoat layer and the second washcoat layer can be deposited onto the substrate in either order.

In some embodiments, a coated substrate includes a substrate; and a washcoat layer. In some embodiments, the coated substrate is free of zeolites or substantially free of zeolites. In some embodiments, the catalytic washcoat layers of the coated substrate are free of zeolites or substantially free of zeolites, and zeolites are optionally present in other washcoat layers. The washcoat layer includes boehmite particles, a first catalytically active material, and a second catalytically active material. The first catalytically active material comprises platinum and palladium in a weight ratio of 10:1 platinum:palladium to 100:1 platinum:palladium, or comprises platinum and no palladium. The second catalytically active material comprises platinum and palladium in a weight ratio of 1:2 platinum:palladium to 8:1 platinum:palladium, or comprises palladium and no platinum. The second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium. The first catalytically active material comprises plasma-created composite nanoparticles bonded to micron-sized carrier particles or plasma-created nanoparticles embedded within micron-sized carrier particles where the porous micron-sized carrier particles comprise a carrier matrix which has been formed around the plasma-created nanoparticles, where the composite nanoparticles comprise a support nanoparticle and a catalytic nanoparticle. In other embodiments, the first catalytically active material is catalytic particles produced by only wet-chemistry methods or hybrid NNm/wet-chemistry particles.

In some embodiments, the second catalytically active material is catalytic particles produced by only wet-chemistry methods, or plasma-created composite nanoparticles bonded to micron-sized carrier particles or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle. In some embodiments, the second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium; these catalysts can be independently selected from catalytic particles produced by only wet-chemistry methods, or plasma-created composite nanoparticles bonded to micron-sized carrier particles or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle.

In some embodiments, the second catalytically active material is catalytic particles produced by only wet-chemistry methods. In some embodiments, the second catalytically active material is plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle. In some embodiments, the second catalytically active material is hybrid NNm/wet-chemistry particles. In some embodiments where the second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium, the platinum:palladium catalyst can comprise composite nanoparticles comprising a Pt:Pd alloy nanoparticle on a nanoparticle support, where the composite nanoparticles are bonded to a micron-sized carrier particle; and the catalyst comprising palladium can comprise palladium deposited on a micron-sized particle by wet-chemistry methods.

In some embodiments, a coated substrate comprises: a substrate; and a washcoat layer. In some embodiments, the coated substrate is free of zeolites or substantially free of zeolites. In some embodiments, the catalytic washcoat layers of the coated substrate are free of zeolites or substantially free of zeolites, and zeolites are optionally present in other washcoat layers. The washcoat layer comprises: boehmite particles; a first catalytically active material comprising platinum and palladium in a weight ratio of 10:1 platinum:palladium to 100:1 platinum:palladium, or platinum and no palladium, wherein the first catalytically active material is catalytic particles produced by only wet-chemistry methods; a second catalytically active material comprising platinum and palladium in a weight ratio of 1:2 platinum:palladium to 8:1 platinum:palladium, or palladium and no platinum, wherein the second catalytically active material comprises plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle. In some embodiments, the second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium. In some embodiments where the second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum: palladium, the platinum:palladium catalyst can comprise composite nanoparticles comprising a Pt:Pd alloy nanoparticle on a nanoparticle support, where the composite nanoparticles are bonded to a micron-sized carrier particle; and the catalyst comprising palladium can comprise palladium deposited on a micron-sized particle by wet-chemistry methods.

In some embodiments, the first catalytically active material comprises platinum and palladium at a platinum:palladium ratio of 15:1 to 25:1. In some embodiments, the first catalytically active material comprises platinum and no palladium. In some embodiments, the second catalytically active material comprises platinum and palladium at a platinum:palladium ratio of 1:2 to 8:1. In some embodiments, the second catalytically active material comprises palladium and no platinum. In some embodiments, the second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium. In some embodiments where the second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum: palladium, the platinum:palladium catalyst can comprise composite nanoparticles comprising a Pt:Pd alloy nanoparticle on a nanoparticle support, where the composite nanoparticles are bonded to a micron-sized carrier particle; and the catalyst comprising palladium can comprise palladium deposited on a micron-sized particle by wet-chemistry methods. In some embodiments, the washcoat layer comprises 1% to 20% boehmite particles by weight. In some embodiments, the washcoat layer comprises 1% to 10% boehmite particles by weight.

In some embodiments, the washcoat layer comprises 1% to 5% boehmite particles by weight. In some embodiments, the washcoat layer comprises filler particles. In some embodiments, the filler particles are alumina particles.

A catalytic converter may comprise a coated substrate comprising one of the previously described washcoat layers. An exhaust treatment system may comprise a conduit for exhaust gas and the catalytic converter. A heavy-duty diesel vehicle may comprise the catalytic converter.

In some embodiments, a coated substrate comprises: a substrate; and a first washcoat layer comprising: boehmite particles; and a first catalytically active material comprising platinum and palladium in a weight ratio of 10:1 platinum: palladium to 100:1 platinum:palladium, or platinum and no palladium, wherein the first catalytically active material comprises plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle; and a second washcoat layer comprising: boehmite particles; and a second catalytically active material comprising platinum and palladium in a weight ratio of 1:2 platinum:palladium to 8:1 platinum:palladium, or palladium and no platinum, or the second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium, wherein the second catalytically active material comprises plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle; in embodiments where the second catalytic material comprises two or more catalysts, the catalysts can be independently selected from any of the foregoing configurations. In some embodiments, the coated substrate is free of zeolites or substantially free of zeolites. In some embodiments, the catalytic washcoat layers of the coated substrate are free of zeolites or substantially free of zeolites, and zeolites are optionally present in other washcoat layers.

In some embodiments, a heavy-duty diesel vehicle comprises a coated substrate, the coated substrate comprising: a substrate; and a washcoat layer comprising: boehmite particles; a first catalytically active material comprising platinum and palladium in a weight ratio of 10:1 platinum: palladium to 100:1 platinum:palladium, or platinum and no palladium, wherein the first catalytically active material comprises plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle; a second catalytically active material comprising platinum and palladium in a weight ratio of 1:2 platinum:palladium to 8:1 platinum: palladium, or palladium and no platinum, or the second catalytically active material can comprise a catalyst comprising a weight ratio of platinum:palladium of about 20:1 and another catalyst comprising palladium, such that the combined catalysts comprise a weight ratio of 1:2 platinum: palladium to 8:1 platinum:palladium, wherein the second catalytically active material comprises plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles; in embodiments where the second catalytic material comprises two or more catalysts, the catalysts can be independently selected from any of the foregoing configurations. In some embodiments, the coated substrate is free of zeolites or substantially free of zeolites. In some embodiments, the catalytic washcoat layers of the coated substrate are free of zeolites or substantially free of zeolites, and zeolites are optionally present in other washcoat layers.

In some embodiments, a heavy-duty diesel vehicle comprises a coated substrate, the coated substrate comprising: a substrate; and a washcoat layer comprising: boehmite particles; a first catalytically active material comprising platinum and palladium in a weight ratio of 10:1 platinum:palladium to 100:1 platinum:palladium, or platinum and no palladium, wherein the first catalytically active material is catalytic particles produced by only wet-chemistry methods; a second catalytically active material comprising platinum and palladium in a weight ratio of 1:2 platinum:palladium to 8:1 platinum:palladium or palladium and no platinum, or the second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium, wherein the second catalytically active material comprises plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle; in embodiments where the second catalytic material comprises two or more catalysts, the catalysts can be independently selected from any of the foregoing configurations. In some embodiments, the coated substrate is free of zeolites or substantially free of zeolites. In some embodiments, the catalytic washcoat layers of the coated substrate are free of zeolites or substantially free of zeolites, and zeolites are optionally present in other washcoat layers.

In some embodiments, a heavy-duty diesel vehicle comprises a coated substrate, the coated substrate comprising: a substrate; a first washcoat layer comprising: boehmite particles; and a first catalytically active material comprising platinum and palladium in a weight ratio of 10:1 platinum:palladium to 100:1 platinum:palladium, or platinum and no palladium, wherein the first catalytically active material comprises plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle; and a second washcoat layer comprising: boehmite particles; and a second catalytically active material comprising platinum and palladium in a weight ratio of 1:2 platinum:palladium to 8:1 platinum:palladium, or palladium and no platinum, or the second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium, wherein the second catalytically active material comprises plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle; in embodiments where the second catalytic material comprises two or more catalysts, the catalysts can be independently selected from any of the foregoing configurations. In some embodiments, the coated substrate is free of zeolites or substantially free of zeolites. In some embodiments, the catalytic washcoat layers of the coated substrate are free of zeolites or substantially free of zeolites, and zeolites are optionally present in other washcoat layers.

In some embodiments, the heavy-duty diesel vehicle meets the European emission standard Euro 5 for heavy-duty diesel vehicles. In some embodiments, the heavy-duty diesel vehicle meets the European emission standard Euro 6 for heavy-duty diesel vehicles. In some embodiments, the heavy-duty diesel vehicle meets the U.S. EPA standard for heavy-duty diesel vehicles. In some embodiments, the heavy-duty diesel vehicle meets the U.S. EPA Inherently Low Emissions Vehicle (ILEV) standard for heavy-duty diesel vehicles. In some embodiments, In some embodiments, the heavy-duty diesel vehicle meets the U.S. EPA Ultra Low Emissions Vehicle (ULEV) standard for heavy-duty diesel vehicles.

In some embodiments, a method of forming a coated substrate comprises: coating a substrate with a catalytic washcoat composition comprising boehmite particles, a first catalytically active material, and a second catalytically active material; wherein the first catalytically active material comprises platinum and palladium in a weight ratio of 10:1 platinum:palladium to 100:1 platinum:palladium, or platinum and no palladium, wherein the first catalytically active material comprises plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle, wherein the second catalytically active material comprises plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles and the second catalytically active material comprises platinum and palladium in a weight ratio of about 1:2 platinum:palladium to about 8:1 platinum:palladium, or palladium and no platinum, or the second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium; in embodiments where the second catalytic material comprises two or more catalysts, the catalysts can be independently selected from any of the foregoing configurations of nanoparticles and carrier particles. In some embodiments, the coated substrate is free of zeolites or substantially free of zeolites. In some embodiments, the catalytic washcoat layers of the coated substrate are free of zeolites or substantially free of zeolites, and zeolites are optionally present in other washcoat layers.

In some embodiments, a method of forming a coated substrate comprises: coating a substrate with a catalytic washcoat composition comprising boehmite particles, a first catalytically active material, and a second catalytically active material, wherein the first catalytically active material comprises platinum and palladium in a weight ratio of 10:1 platinum:palladium to 100:1 platinum:palladium, or platinum and no palladium, wherein the first catalytically active material is catalytic particles produced by only wet-chemistry methods, wherein the second catalytically active material comprises platinum and palladium in a weight ratio of about 1:2 platinum:palladium to about 8:1 platinum:palladium, or palladium and no platinum, or the second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium, wherein the second catalytically active material comprises plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle; in embodiments where the second catalytic material comprises two or more catalysts, the catalysts can be independently selected from any of the foregoing configurations. In some embodiments, the coated substrate is free of zeolites or substantially free of zeolites. In some embodiments, the catalytic washcoat layers of the coated substrate are free of zeolites or substantially free of zeolites, and zeolites are optionally present in other washcoat layers.

In some embodiments, a method of forming a coated substrate comprises: (a) coating a substrate with a first catalytic washcoat composition comprising boehmite particles and a first catalytically active material; wherein the first catalytically active material comprises platinum and palladium in a weight ratio of 10:1 platinum:palladium to 100:1 platinum:palladium, or platinum and no palladium; and (b) coating the substrate with a second catalytic washcoat composition comprising boehmite particles and a second catalytically active material; wherein the second catalytically active material comprises platinum and palladium in a weight ratio of about 1:2 platinum:palladium to about 8:1 platinum:palladium, or palladium and no platinum, wherein the first catalytically active material and the second catalytically active material comprise plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle. In some embodiments, the second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium; in embodiments where the second catalytic material comprises two or more catalysts, the catalysts can be independently selected from any of the foregoing configurations of nanoparticles and carrier particles. In some embodiments, the coated substrate is free of zeolites or substantially free of zeolites. In some embodiments, the catalytic washcoat layers of the coated substrate are free of zeolites or substantially free of zeolites, and zeolites are optionally present in other washcoat layers.

In some embodiments, a catalytic washcoat composition comprises a solids content of: 35% to 95% by weight of a first catalytically active material comprising platinum and palladium in a weight ratio of 10:1 platinum:palladium to 100:1 platinum:palladium, or platinum and no palladium, wherein the first catalytically active material comprises plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle; and 35% to 95% by weight of a second catalytically active material, wherein the second catalytically active material comprises plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles, and the second catalytically active material comprises platinum and palladium in a weight ratio of 1:2 platinum:palladium to 8:1 platinum:palladium, or palladium and no platinum, or the second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium; in embodiments where the second catalytic material comprises two or more catalysts, the catalysts can be independently selected from any of the foregoing configurations of nanoparticles and carrier particles. In some embodiments, the catalytic washcoat composition is free of zeolites or substantially free of zeolites. In some embodiments, the catalytic washcoat layers of the coated substrate are free of zeolites or substantially free of zeolites, and zeolites are optionally present in other washcoat layers.

In some embodiments, a catalytic washcoat composition comprising a solids content of: 35% to 95% by weight of a first catalytically active material comprising platinum and palladium in a weight ratio of 10:1 platinum:palladium to 100:1 platinum:palladium, or platinum and no palladium, wherein the first catalytically active material is catalytic particles produced by only wet-chemistry methods; and 35% to 95% by weight of a second catalytically active material comprising platinum and palladium in a weight ratio of 1:2 platinum:palladium to 8:1 platinum:palladium, or palladium and no platinum, or the second catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium, wherein the second catalytically active material comprises plasma-created composite nanoparticles bonded to micron-sized carrier particles, or plasma-created nanoparticles embedded within micron-sized carrier particles where the porous micron-sized carrier particles comprise a carrier matrix which has been formed around the plasma-created nanoparticles, or hybrid NNm/wet-chemistry particles, the composite nanoparticles comprising a support nanoparticle and a catalytic nanoparticle; in embodiments where the second catalytic material comprises two or more catalysts, the catalysts can be independently selected from any of the foregoing configurations. In some embodiments, the catalytic washcoat composition is free of zeolites or substantially free of zeolites. In some embodiments, the catalytic washcoat layers of the coated substrate are free of zeolites or substantially free of zeolites, and zeolites are optionally present in other washcoat layers.

In some embodiments, the catalytic solids of the washcoat compositions are suspended in an aqueous medium at a pH between 3 and 5.

In any of the embodiments described herein, the substrate can be coated with an optional corner-fill washcoat layer prior to coating with other washcoat layers.

As will be appreciated from the disclosure herein, in some embodiments, the coated substrate of the present invention, or coated substrate made from the methods of the present invention, may be free of zeolites and comprise:
  a substrate; and
  a washcoat layer comprising:
    boehmite particles;
    a first catalytically active material comprising platinum and palladium in a weight ratio of 10:1 platinum:palladium to 100:1 platinum:palladium, or comprising platinum and no palladium; and
    a second catalytically active material comprising platinum and palladium in a weight ratio of 1:2 platinum:palladium to 8:1 platinum:palladium, or comprising palladium and no platinum; wherein:
A. the first catalytically active material comprises plasma-created composite nanoparticles bonded to or embedded within micron-sized carrier particles, the composite nanoparticles comprising a support nanoparticle and a catalytic nanoparticle; or
B. the first catalytically active material is catalytic particle produced by wet-chemistry methods, and the second catalytically active materials comprise plasma-created composite nanoparticles bonded to or embedded within micron-sized carrier particles, the composite nanoparticles comprising a support nanoparticle and a catalytic nanoparticle; or
C. neither A nor B apply.

As will also be appreciated from the disclosure herein, in some embodiments, the coated substrate of the present invention, or coated substrate made from the methods of the present invention, may be free of zeolites and comprise:
  a substrate;
  a first washcoat layer comprising:
    boehmite particles; and
    a first catalytically active material comprising platinum and palladium in a weight ratio of 10:1 platinum:palladium to 100:1 platinum:palladium, or platinum and no palladium; and
  a second washcoat layer comprising:
    boehmite particles; and
    a second catalytically active material comprising platinum and palladium in a weight ratio of 1:2 platinum:palladium to 8:1 platinum:palladium, or palladium and no platinum; wherein:
D. said first catalytically active material and/or second catalytically active material comprise plasma created composite nanoparticles bonded to or embedded within micron-sized carrier particles, the composite nanoparticles comprising a support nanoparticle and a catalytic nanoparticle; or
E. D does not apply.

BRIEF DESCRIPTION OF THE DRAWINGS

FIG. 1 illustrates a catalytic converter in accordance with some embodiments of the present invention, while FIG. 1A is a magnified view of a portion of the drawing of FIG. 1.

DETAILED DESCRIPTION OF THE INVENTION

Figure 1:
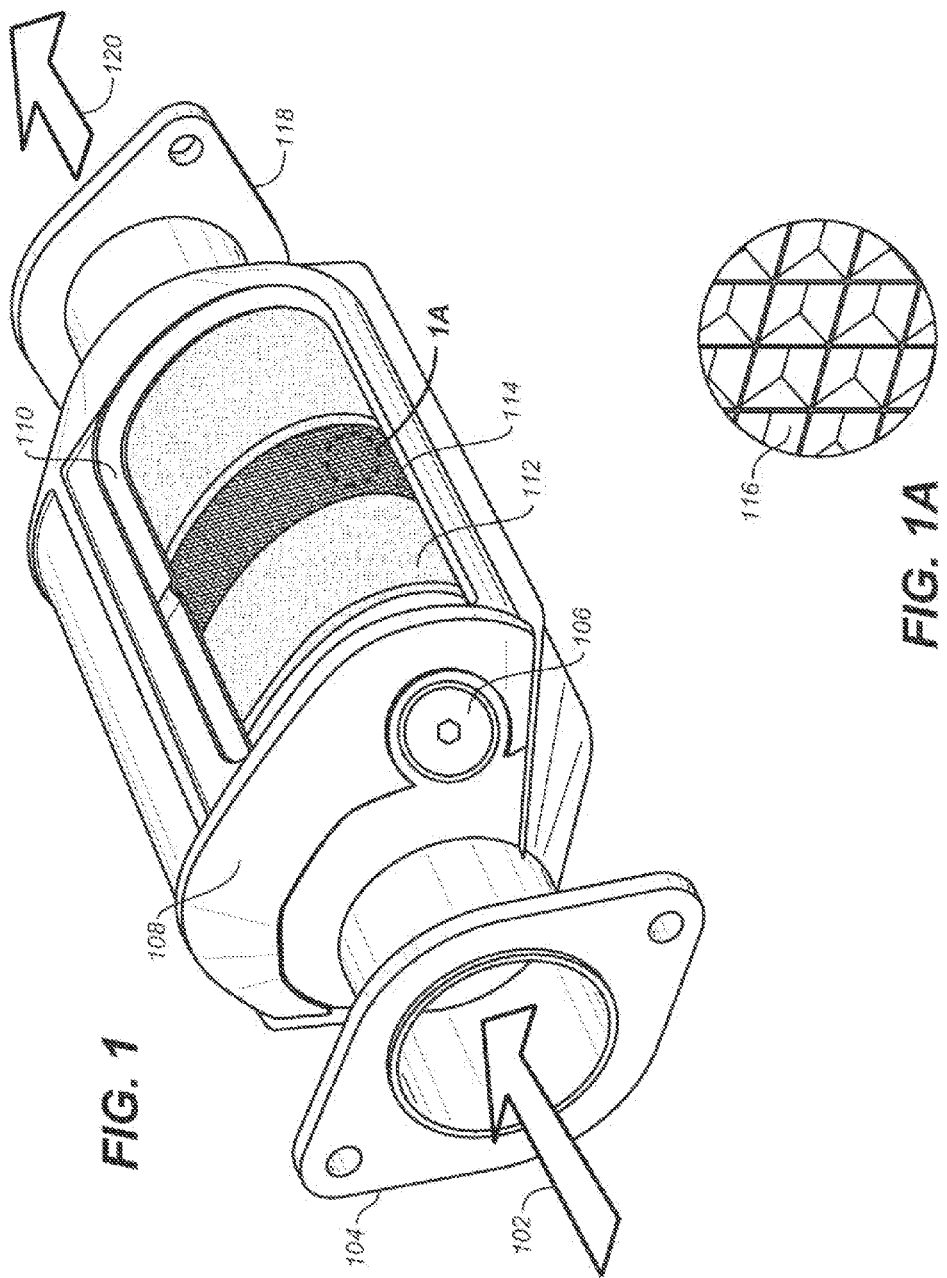

The invention catalyst substrates for use in catalytic converters, and methods of production and use thereof, with several advantages. One such advantage is that the catalyst substrates and catalytic converters of the invention can require less platinum group metal catalyst than catalyst substrates and catalytic converters of the prior art, while maintaining the same or similar pollution control parameters as the prior art catalyst substrates and catalytic converters. Another advantage is that the catalyst substrates and catalytic converters of the invention can provide better pollution control parameters that those of prior art catalyst substrates and catalytic converters while using the same amount of platinum group metal catalyst. In some embodiments, the catalyst substrates and catalytic converters of the invention can require less platinum group metal catalyst than those of the prior art, while simultaneously providing better pollution control parameters than those of prior art catalyst substrates and catalytic converters. The invention accomplishes these advantages by combining two or more different types of catalytically active material in a single catalytic washcoat layer of a coated catalytic substrate, or by providing two or more different catalytic washcoat layers with different types of catalytically active material on a coated substrate. The particular combinations of catalysts described herein increase the overall catalytic efficiency for treating a mixture of emissions. For example, the catalytic efficiency for lowering NO emissions can be improved without significant impairment of catalytic efficiency for lowering hydrocarbon (HC) or carbon monoxide (CO) emissions.

Described are composite nanoparticle catalysts, washcoat formulations, coated substrates, and catalytic converters for heavy-duty diesel applications. Also described are methods of making and using these composite nanoparticle catalysts, washcoat formulations, coated substrates, and catalytic converters for heavy-duty diesel applications. In some embodiments, a heavy-duty diesel catalytic converter can be produced using a washcoat layer including boehmite and a mixture of two or more different types of catalytically active material, the first type of catalytically active material having a platinum:palladium ratio of between about 10:1 and about 100:1 (weight/weight), and the second type of catalytically active material having a platinum:palladium ratio of between about 1:2 and about 8:1 or palladium and no platinum, or the second type of catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium. In some embodiments, a heavy-duty diesel catalytic converter can be produced using two different washcoat layers including catalytically active material. The first layer may include catalytically active material with a platinum:palladium ratio of between about 10:1 and 100:1, and the second layer may include catalytically active material with a platinum:palladium ratio of between about 1:2 and about 8:1, either as a single catalyst, or as two or more catalysts which together have a platinum:palladium ratio of between about 1:2 and about 8:1.

The invention also embraces catalyst-containing washcoat compositions for heavy-duty diesel applications, and methods of making the washcoats by combining different types of catalytically active materials. It has been found that by providing two or more different types of catalytically active material on a coated substrate may allow increased performance of a catalytic converter used in a heavy-duty diesel engine or a heavy-duty diesel vehicle in comparison to catalytic converters using a single type of catalytically active material. In some embodiments, two or more different types of catalytically active material may be found within a single catalytic washcoat. In some embodiments, two or more different types of catalytically active material may be found within two or more different catalytic washcoats. For example, in some embodiments, a first type of catalytically active material may be found in a first catalytic washcoat, and a second type of catalytically active material may be found in a second catalytic washcoat. In some embodiments, the different types of catalytically active material may include different ratios of PGM material, for example platinum and palladium. In some embodiments, the different types of catalytically active material may be made by different methods, for example plasma or wet-chemistry, and/or have different configurations including different support particles.

The terms "type of catalytically active material" or "types of catalytically active material" are generally understood to encompass the structure of the catalytically active material, for example, but not limited to, catalytic particles produced by only wet-chemistry methods, "nano-on-nano-on-micron" (NNm) particles, or "nano-on-nano-in-micron" (NNiM) particles, or hybrid NNm/wet-chemistry particles; and also to encompass catalytically active material of different ratios of catalytic metals with the same or different structure, for example, but not limited to, catalytic particles produced by only wet-chemistry methods with a mixture of platinum and palladium with a ratio range of about 10:1 to about 100:1 (weight/weight), or about 10:1 to about 40:1 (weight/weight), or about 10:1 to about 30:1 (weight/weight), or about 15:1 to about 25:1 (weight/weight), or about 20:1 (weight/weight), or platinum and no palladium; and catalytic particles produced by only wet-chemistry methods with a mixture of platinum and palladium with a ratio range of about 1:2 to about 8:1 (weight/weight), or about 1:1 to about 5:1, or about 2:1 to about 4:1, or about 2:1 to about 8:1, or palladium and no platinum. In another example, a different types of catalytically active material may include catalytic particles produced by only wet-chemistry methods with a mixture of platinum and palladium with a ratio range of about 10:1 to about 100:1 (weight/weight), or about 10:1 to about 40:1 (weight/weight), or about 10:1 to about 30:1 (weight/weight), or about 15:1 to about 25:1 (weight/weight), or about 20:1 (weight/weight), or platinum and no palladium; and NNiM particles with a mixture of platinum and palladium with a ratio range of about 1:2 to about 8:1 (weight/weight), or about 1:1 to about 5:1, or about 2:1 to about 4:1, or about 2:1 to about 8:1, or palladium and no platinum.

It is understood that the coated substrates described herein, catalytic converters using the coated substrates described herein, and exhaust treatment systems using the coated substrates described herein, are particularly useful for heavy-duty diesel engines and heavy-duty diesel vehicles. Vehicles using the catalytic converters described herein may meet the Euro 5, Euro 6, U.S. EPA (as of year 2010), U.S. EPA Inherently Low Emissions Vehicle (ILEV), and/or U.S. EPA Ultra Low Emissions Vehicle (ULEV) standards for heavy-duty diesel vehicles.

Catalytically active materials may include, but are not limited to, catalytic particles produced by only wet-chemistry methods, "nano-on-nano-on-micron" or "NNm" particles, "nano-on-nano-in-micron" or "NNiM" particles, or hybrid NNm/wet-chemistry particles. NNm particles include composite nanoparticles, with a catalytic component and a support component, bonded to the surface and in the pores of a porous carrier particle. NNiM particles include composite nanoparticles, with a catalytic component and a support component, embedded within a porous carrier particle, where the porous carrier is formed around the composite nanoparticles. Hybrid NNm/wet-chemistry particles are NNm particles where the micron-sized porous carrier particle has been impregnated with platinum group metal by wet-chemistry methods.

Washcoat compositions may be formulated in order to provide one or more layers on a catalyst substrate, such as a catalytic converter substrate. In some embodiments, two or more washcoat formulations may provide two or more layers in which a first catalytic layer comprises a first type of catalytically active material and the second catalytic layer comprises a second type of catalytically active material, wherein the first type of catalytically active material differs from the second type of catalytically active material. In some embodiments, a single catalytic washcoat formulation may comprise both a first type of catalytically active material and a second type of catalytically active material wherein the first type of catalytically active material differs from the second type of catalytically active material.

Various aspects of the disclosure can be described through the use of flowcharts. Often, a single instance of an aspect of the present disclosure is shown. As is appreciated by those of ordinary skill in the art, however, the protocols, processes, and procedures described herein can be repeated continuously or as often as necessary to satisfy the needs described herein. Additionally, it is contemplated that certain method steps can be performed in alternative sequences to those disclosed in the flowcharts.

When numerical values are expressed herein using the term "about" or the term "approximately," it is understood that both the value specified, as well as values reasonably close to the value specified, are included. For example, the description "about 50° C." or "approximately 50° C." includes both the disclosure of 50° C. itself, as well as values close to 50° C. Thus, the phrases "about X" or "approximately X" include a description of the value X itself. If a range is indicated, such as "approximately 50° C. to 60° C.," it is understood that both the values specified by the endpoints are included, and that values close to each endpoint or both endpoints are included for each endpoint or both endpoints; that is, "approximately 50° C. to 60° C." is equivalent to reciting both "50° C. to 60° C." and "approximately 50° C. to approximately 60° C."

The word "substantially" does not exclude "completely." E.g., a composition which is "substantially free" from Y may be completely free from Y. The term "substantially free" permits trace or naturally occurring impurities. It should be noted that, during fabrication, or during operation (particularly over long periods of time), small amounts of materials present in one washcoat layer may diffuse, migrate, or otherwise move into other washcoat layers. Accordingly, use of the terms "substantial absence of" and "substantially free of" is not to be construed as absolutely excluding minor amounts of the materials referenced. Where necessary, the word "substantially" may be omitted from the definition of the invention.

It should be noted that, during fabrication, or during operation (particularly over long periods of time), small amounts of materials present in one washcoat layer may diffuse, migrate, or otherwise move into other washcoat layers. Accordingly, use of the terms "substantial absence of" and "substantially free of" is not to be construed as absolutely excluding minor amounts of the materials referenced. This disclosure provides several embodiments. It is contemplated that any features from any embodiment can be combined with any features from any other embodiment. In this fashion, hybrid configurations of the disclosed features are within the scope of the present invention. For the avoidance of doubt, it is confirmed that in the general description herein, in the usual way, features described as part of "one" embodiment or "some" embodiments are generally combinable with features of another embodiment, in so far as they are compatible.

It is understood that reference to relative weight percentages in a composition assumes that the combined total weight percentages of all components in the composition add up to 100. It is further understood that relative weight percentages of one or more components may be adjusted upwards or downwards such that the weight percent of the components in the composition combine to a total of 100, provided that the weight percent of any particular component does not fall outside the limits of the range specified for that component.

By "catalytically active material" is meant a material that catalyzes a chemical reaction. The platinum, palladium, combinations of platinum and palladium, and/or platinum: palladium alloy catalyze the oxidation of hydrocarbons (such as the unburnt hydrocarbons in the exhaust stream of a combustion engine) to $CO_2$ and $H_2O$, and/or the oxidation of CO (such as occurs in the exhaust stream of a combustion engine) to $CO_2$. Under appropriate operating conditions, such as the typical fuel-lean conditions of a diesel engine (where oxygen is in stoichiometric excess relative to fuel), platinum, palladium, combinations of platinum and palladium, or a platinum/palladium alloy catalyze the oxidation of hydrocarbons to $CO_2$ and $H_2O$, and/or the oxidation of CO to $CO_2$. The catalytic material can also oxidize NO to $NO_2$. Many heavy-duty diesel catalysts are used in conjunction with a downstream selective catalytic reduction (SCR) unit which converts the pollutant $NO_x$ to $N_2$ and $H_2O$. Commercially available SCR units typically function optimally when the ratio of $NO_2$ to $NO_x$ is about 50%. However, the $NO_x$ from a diesel engine is typically predominantly NO. Thus, oxidation of a portion of the NO to $NO_2$ by the heavy-duty diesel catalyst can actually enhance the performance of the subsequent reduction of NO and NO2 by the downstream SCR unit. (See, for example, Nova, Isabella and Enrico Tronconi, editors, *Urea-SCR Technology for deNOx After Treatment of Diesel Exhausts*. New York: Springer Science+Business Media, 2014, at section 3.9, page 81.)

This disclosure refers to both particles and powders. These two terms are equivalent, except for the caveat that a singular "powder" refers to a collection of particles. The present invention can apply to a wide variety of powders and particles. The terms "nano\particle" and "nano-sized particle" are generally understood by those of ordinary skill in the art to encompass a particle on the order of nanometers in diameter, typically between about 0.3 nm to 500 nm, about 1 nm to 500 nm, about 1 nm to 100 nm, or about 1 nm to 50 nm. Preferably, the nanoparticles have an average grain size less than 250 nanometers. In some embodiments, the nanoparticles have an average grain size of about 50 nm or less, about 30 nm or less, or about 20 nm or less. In additional embodiments, the nanoparticles have an average diameter of about 50 nm or less, about 30 nm or less, or about 20 nm or less, or about 10 nm or less, or about 5 nm or less. The aspect ratio of the particles, defined as the longest dimension of the particle divided by the shortest dimension of the particle, is preferably between one and ten, more preferably between one and two, and yet more preferably between one and 1.2. "Grain size" is measured using the ASTM (American Society for Testing and Materials) standard (see ASTM E112-10). When calculating a diameter of a particle, the average of its longest and shortest dimension is taken; thus, the diameter of an ovoid particle with long axis 20 nm and short axis 10 nm would be 15 nm. The average diameter of a population of particles is the average of diameters of the individual particles, and can be measured by various techniques known to those of skill in the art.

In additional embodiments, the nanoparticles have a grain size of about 50 nm or less, about 30 nm or less, or about 20 nm or less, or about 10 nm or less, or about 5 nm or less. In additional embodiments, the nano-particles have a diameter of about 50 nm or less, about 30 nm or less, or about 20 nm or less, or about 10 nm or less, or about 5 nm or less.

The terms "micro-particle," "micro-sized particle" "micron-particle," and "micron-sized particle" are generally understood to encompass a particle on the order of micrometers in diameter, typically between about 0.5 µm to 1000 µm, about 1 µm to 1000 µm, about 1 µm to 100 µm, or about 1 µm to 50 µm. Additionally, the term "platinum group metals" (abbreviated "PGM") used in this disclosure refers to the collective name used for six metallic elements clustered together in the periodic table. The six platinum group metals are ruthenium, rhodium, palladium, osmium, iridium, and platinum.

The term "catalytic washcoat layers of the coated substrate" refers to the washcoat layers of the coated substrate that contain catalytic materials, that is, the layers that contain platinum group metals such as platinum or palladium.

Catalytically Active Materials

Catalytically active materials can be any catalyst impregnated on or embedded within a support. Preferred catalysts comprise platinum group metals (PGMs). Platinum group metals are the metals platinum, palladium, rhodium, ruthenium, osmium, and iridium. Other catalysts may include transition metals, such as scandium, titanium, chromium, vanadium, manganese, iron, cobalt, nickel, copper, zinc, yttrium, zirconium, niobium, molybdenum, cadmium, tantalum, tungsten, and mercury. Poor metals comprise aluminum, germanium, gallium, tin, antimony, lead, indium, tellurium, bismuth and polonium. In some embodiments, a single metal type may be used as a catalyst (such as only palladium or only platinum), and in other embodiments, various combinations of catalytic metals are used. For example, in some embodiments, a catalyst may comprise a mixture of platinum and palladium. In some embodiments, a catalyst may comprise a mixture of platinum and palladium at any ratio or any range of ratios, such as about 1:2 to about 100:1 Pt/Pd (weight/weight), 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or about 20:1 Pt/Pd (weight/weight).

In some embodiments, the catalytically active materials are micron-sized powders. In some embodiments, the catalytically active material may be catalytic particles prepared by only wet-chemistry methods. In some embodiments, the catalytically active material may comprise nano-on-nano-on-micro (NNm) particles. In some embodiments, the catalytically active material may comprise nano-on-nano-in-micro (NNiM) particles. In some embodiments, the catalytically active material may comprise hybrid NNm/wet-chemistry particles.

Catalytic Particles Produced by Only Wet-Chemistry Methods

Catalytic particles produced by only wet-chemistry methods generally comprise precipitated elemental catalytic metal impregnated into porous supports. In some embodiments, the porous supports are micron-sized particles. In some embodiments, the porous support comprises a metal oxide, such as alumina ($Al_2O_3$), or silica ($SiO_2$), or zirconia ($ZrO_2$), or titania ($TiO_2$), or ceria ($CeO_2$), or baria (BaO), or yttria ($Y_2O_3$). In some embodiments, a single metal type may be impregnated into the support, and in other embodiments, various combinations of catalytic metals may be impregnated into the support. For example, in some embodiments, a catalyst may comprise a mixture of platinum and palladium. In some embodiments, a catalyst may comprise a mixture of platinum and palladium at any ratio or any range of ratios, such as about 1:2 to about 100:1 Pt/Pd (weight/weight), 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or about 20:1 Pt/Pd (weight/weight).

The production of catalytic particles produced by only wet-chemistry methods generally involves the use of a solution of one or more catalytic metal ions or metal salts, which are impregnated into supports (typically micron-sized particles), and reduced to platinum group metal in elemental form. For example, in some embodiments a solution of chloroplatinic acid, $H_2PtCl_6$, can be applied to alumina micro-particles (such as MI-386 material from Grace Davison, Rhodia, or the like), followed by drying and calcining, resulting in precipitation of platinum onto the alumina. In some embodiments, a mixture of two or more different solutions of catalytic metal ions or metal salts, such as chloroplatinic acid, $H_2PtCl_6$, and chloropalladic acid, $H_2PdCl_6$, may be applied to alumina micro-particles, followed by drying and calcining, resulting in precipitation of both platinum and palladium onto the alumina. When using two or more different solutions of catalytic metal ions or metal salts, the solution may be of the concentration or amount necessary to obtain the desired ratio of catalytic metal.

Catalytically Active Materials with Composite Catalysts

In some embodiments, catalytically active material may comprise composite nanoparticles, comprising a catalytic particle and a support particle. In some embodiments, catalytically active material may be nano-on-nano-on-micro (NNm) particles, such as those described in U.S. application Ser. No. 13/589,024, the disclosure of which is hereby incorporated by reference in its entirety. NNm particles comprise composite nanoparticles impregnated on the surface of and within larger pores of porous micron-sized support particles. In some embodiments, catalytically active material may be nano-on-nano-in-micro (NNiM) particles, such as those described in U.S. Provisional Patent Appl. No. 61/881,337 filed Sep. 23, 2013, U.S. patent application Ser. No. 14/494,156 filed Sep. 23, 2014, and International Patent Appl. No. PCT/US2014/057036 filed Sep. 23, 2014, the disclosures of which are hereby incorporated by reference in their entirety. NNiM particles comprise composite nanoparticles embedded within porous micron-sized carrier particles, where the micron-sized carrier particles comprise a carrier material which is formed around the composite nanoparticles. In some embodiments, the catalytically active material may comprise hybrid NNm/wet-chemistry particles, which are NNm particles where the micron-sized support is also impregnated with one or more platinum group metals by wet-chemistry techniques.

Composite Nanoparticles

In some embodiments, catalysts may comprise nanoparticles. In some embodiments, such as those using NNm particles or NNiM particles, catalysts may comprise composite nanoparticles. In some embodiments of composite nanoparticles, one or more nano-sized catalytic particles are disposed on a nano-sized support particle. In embodiments comprising a single nano-sized catalytic particle disposed on the nano-sized support particle, the nano-sized catalytic particle may be a homogenous metal or may be a metal alloy. In embodiments comprising two or more nano-sized catalytic particles, each nano-sized catalytic particle may be a homogenous metal or an alloy, and the nano-sized catalytic particles may be comprised of the same homogenous metal or alloy, or of differing homogenous metals or alloys. In some embodiments, the nano-sized catalytic particle is a platinum group metal, such as platinum or palladium. Although platinum group metals are generally described, all catalytic metals are contemplated. In some embodiments, the nano-sized catalytic particle comprises an alloy two or more platinum group metals, such as platinum and palladium. In some embodiments, such as when the nano-sized catalytic particle comprises both platinum and palladium, the metals may be found in any ratio, or any range of ratios, such as about 100:1 Pt/Pd (weight/weight), 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or about 20:1 Pt/Pd (weight/weight).

In some embodiments of composite nanoparticles, the nano-sized support particle may be an oxide. By way of example, oxides such as alumina ($Al_2O_3$), silica ($SiO_2$), zirconia ($ZrO_2$), titania ($TiO_2$), ceria ($CeO_2$), baria (BaO), and yttria ($Y_2O_3$) may be used. Other useful oxides will be apparent to those of ordinary skill.

In some embodiments, the relative proportion of platinum group metal to support material, such as aluminum oxide, may be a range of about 0.001 wt % to about 65 wt % platinum group metal(s) and about 99.999 wt % to about 35 wt % metal oxide. In some embodiments, such as some embodiments using NNm particles, the composite nanoparticles preferably comprise a range of about 10 wt % to about 65 wt % platinum group metal(s) and about 35 wt % to about 90 wt % metal oxide, and even more preferably a composition of about 35 wt % to about 45 wt % platinum group metal(s) and about 55 wt % to about 65 wt % metal oxide. In some embodiments, composite nanoparticles used in NNm particles may comprise from about 0 wt % to about 65 wt % platinum, about 0 wt % to about 65 wt % palladium, and about 35 wt % to about 99.999 wt % aluminum oxide; in some embodiments, from about 30 wt % to about 40 wt % platinum, about 2 wt % to about 10 wt % palladium, and about 50 wt % to about 68 wt % aluminum oxide; in further embodiments, from about 35 wt % to about 40 wt % platinum, about 2 wt % to about 5 wt % palladium, and about 55 wt % to about 63 wt % aluminum oxide; or in still further embodiments, about 0 wt % to about 5 wt % platinum, about 35 wt % to about 55 wt % palladium, and about 40 wt % to about 65 wt % aluminum oxide. An exemplary composite nano-on-nano particle used in NNm particles comprises about 38.1 wt % platinum, about 1.9 wt % palladium, and about 60 wt % aluminum oxide; or about 33.3 wt % platinum, about 6.7 wt % palladium and about 60 wt % aluminum oxide; or about 40 wt % palladium and 60% aluminum oxide. In some embodiments, such as those using NNiM particles, the composite nanoparticles preferably comprise a range of about 0.001 wt % to about 20 wt % platinum group metals mad about 80 wt % to about 99.999 wt % aluminum oxide, and even more preferably about 0.04 wt % to about 5 wt % platinum group metals and about 95 wt % to about 99.9 wt % aluminum oxide. In some embodiments of composite nanoparticles used in NNiM particles, materials range from about 0 wt % to about 20 wt % platinum, about 0 wt % to about 20 wt % palladium, and about 80 wt % to about 99.999 wt % aluminum oxide; in further embodiments, from about 0.5 wt % to about 1.5 wt % platinum, about 0.01 wt % to about 0.1 wt % palladium, and about 97.9 wt % to about 99.1 wt % aluminum oxide; in still further embodiments, from about 0.5 wt % to about 1.5 wt % platinum, about 0.1 wt % to about 0.3 wt % palladium, and about 98.2 wt % to about 99.4 wt % aluminum oxide. An exemplary composite nano-on-nano particle used in NNiM particles comprises about 0.952 wt % platinum, about 0.048 wt % palladium, and about 99 wt % aluminum oxide; or about 0.83 wt % platinum, about 0.17 wt % palladium, and about 99 wt % aluminum oxide; or about 1 wt % palladium and about 99 wt % aluminum oxide.

In some embodiments, the catalytic nanoparticles have an average diameter or average grain size between about 0.3 nm and about 10 nm, such as between about 1 nm to about 5 nm, that is, about 3 nm+/−2 nm. In some embodiments, the catalytic nanoparticles have an average diameter or average grain size between approximately 0.3 nm to approximately 1 nm, while in other embodiments, the catalytic nanoparticles have an average diameter or average grain size between approximately 1 nm to approximately 5 nm, while in other embodiments, the catalytic nanoparticles have an average diameter or average grain size between approximately 5 nm to approximately 10 nm. In some embodiments, the support nanoparticles, such as those comprising a metal oxide, for example aluminum oxide, have an average diameter of about 20 nm or less; or about 15 nm or less; or about 10 nm or less; or about 5 nm or less; or about 2 nm or less; or between about 2 nm and about 5 nm, that is, 3.5 nm+/−1.5 nm; or between 2 nm and about 10 nm, that is 6 nm+/−4 nm; or between about 10 nm and about 20 nm, that is, about 15 nm+/−5 nm; or between about 10 nm and about 15 nm, that is, about 12.5 nm+/−2.5 nm. In some embodiments, the composite nanoparticles have an average diameter or average grain size of about 2 nm to about 20 nm, that is 11 nm+/−9 nm; or about 4 nm to about 18 nm, that is 11+/−7 nm; or about 6 nm to about 16 nm, that is 11+/−5 nm; or about 8 nm to about 14 nm, that is about 11 nm+/−3 nm; or about 10 nm to about 12 nm, that is about 11+/−1 nm; or about 10 nm; or about 11 nm; or about 12 nm. In one preferred combination, the catalytic nanoparticles have an average diameter between approximately 1 nm to approximately 5 nm, and the support nanoparticles have an average diameter between approximately 10 nm and approximately 20 nm. In another combination, the catalytic nanoparticles have an average diameter between approximately 0.3 nm to approximately 10 nm, and the support nanoparticles have an average diameter between approximately 10 nm and approximately 20 nm.

Production of Composite Nanoparticles

The composite nano-particles may be formed by plasma reactor methods, by feeding one or more catalytic materials, such as one or more platinum group metal(s), and one or more support materials, such as a metal oxide, into a plasma gun, where the materials are vaporized. Plasma guns such as those disclosed in US 2011/0143041, the disclosure of which is hereby incorporated by reference in its entirety, can be used, and techniques such as those disclosed in U.S. Pat. Nos. 5,989,648, 6,689,192, 6,755,886, and US 2005/0233380, the entire disclosures of which are hereby incorporated by reference herein, can be used to generate plasma. The high-throughput system disclosed in U.S. Published Patent Application No. 2014/0263190 and International Patent Application No. PCT/US2014/024933 (published as WO 2014/159736), the entire disclosures of which are hereby incorporated by reference herein, can be used to generate the composite nanoparticles. A working gas, such as argon, is supplied to the plasma gun for the generation of plasma; in one embodiment, an argon/hydrogen mixture (for example, in the ratio of 10:1 $Ar/H_2$ or 10:2 $Ar/H_2$) is used as the working gas. In one embodiment, one or more platinum group metals, such as platinum or palladium, which are generally in the form of metal particles of about 0.5 to 6 microns in diameter, can be introduced into the plasma reactor as a fluidized powder in a carrier gas stream such as argon. In some embodiments two or more platinum group metals may be added, such as a mixture of platinum and palladium, in any ratio, or any range of ratios, such as about 1:2 to about 100:1 Pt/Pd (weight/weight), 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or about 20:1 Pt/Pd (weight/weight). Support material, for example a metal oxide, typically aluminum oxide, in a particle size of about 15 to 25 microns diameter, is also introduced as a fluidized powder in carrier gas. In some embodiments, such as some embodiments using NNm particles, a composition of about 10 wt % to about 65 wt % platinum group metal(s) and about 90 wt % to about 35 wt % metal oxide may be used, and even more preferably a composition of about 35 wt % to about 45 wt % platinum group metal(s) and about 65 wt % to about 55 wt % metal oxide may be used. Examples of ranges of compositions that may be used to form composite nanoparticles used in NNm particles are from about 0 wt % to about 65 wt % platinum, about 0 wt % to about 65 wt % palladium, and about 35 wt % to about 99.999 wt % aluminum oxide; in some embodiments, from about 30 wt % to about 40 wt % platinum, about 2 wt % to about 10 wt % palladium, and about 50 wt % to about 68 wt % aluminum oxide are used; in further embodiments, from about 35 wt % to about 40 wt % platinum, about 2 wt % to about 5 wt % palladium, and about 55 wt % to about 63 wt % aluminum oxide is used; or in still further embodiments, about 0 wt % to about 5 wt % platinum, about 35 wt % to about 55 wt % palladium, and about 40 wt % to about 65 wt % aluminum oxide is used. An exemplary composition useful for forming composite nano-on-nano particle used in NNm particles comprises about 38.1 wt % platinum, about 1.9 wt % palladium, and about 60 wt % aluminum oxide; or about 33.3 wt % platinum, about 6.7 wt % palladium and about 60 wt % aluminum oxide; or about 40 wt % palladium and 60% aluminum oxide. In some embodiments, such as some embodiments using NNiM particles, the composition preferably has a range of about 0.001 wt % to about 20 wt % platinum group metals mad about 80 wt % to about 99.999 wt % aluminum oxide, and even more preferably about 0.04 wt % to about 5 wt % platinum group metals and about 95 wt % to about 99.9 wt % aluminum oxide. Example ranges of materials that can be used to form composite nanoparticles used in NNiM particles are from about 0 wt % to about 20 wt % platinum, about 0 wt % to about 20 wt % palladium, and about 80 wt % to about 99.999 wt % aluminum oxide; in some embodiments, from about 0.5 wt % to about 1.5 wt % platinum, about 0.01 wt % to about 0.1 wt % palladium, and about 97.9 wt % to about 99.1 wt % aluminum oxide; in further embodiments, from about 0.5 wt % to about 1.5 wt % platinum, about 0.1 wt % to about 0.3 wt % palladium, and about 98.2 wt % to about 99.4 wt % aluminum oxide. An exemplary composition useful for forming composite nano-on-nano particle used in NNiM particles comprises about 0.952 wt % platinum, about 0.048 wt % palladium, and about 99 wt % aluminum oxide; or about 0.83 wt % platinum, about 0.17 wt % palladium, and about 99 wt % aluminum oxide; or about 1 wt % palladium and about 99 wt % aluminum oxide.

Other methods of introducing the materials into the reactor can be used, such as in a liquid slurry. Any solid or liquid materials are rapidly vaporized or turned into plasma. The kinetic energy of the superheated material, which can reach temperatures of 20,000 to 30,000 Kelvin, ensures extremely thorough mixing of all components.

The superheated material of the plasma stream is then quenched rapidly, using such methods as the turbulent quench chamber disclosed in US 2008/0277267. Argon quench gas at high flow rates, such as 2400 to 2600 liters per minute, is injected into the superheated material. The material is further cooled in a cool-down tube, and collected and analyzed to ensure proper size ranges of material. Equipment suitable for plasma synthesis is disclosed in U.S. Patent Application Publication No. 2008/0277267, U.S. Pat. No. 8,663,571, U.S. patent application Ser. No. 14/207,087 and International Patent Appl. No. PCT/US2014/024933

The plasma production method described above produces uniform composite nano-particles, where the composite nano-particles comprise a catalytic nano-particle disposed on a support nano-particle. The catalytic nano-particle comprises the platinum group metal or metals, at about 1:2 to about 100:1 Pt/Pd (weight/weight), 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or about 20:1 Pt/Pd (weight/weight).

Nano-on-Nano-on-Micro" or "NNm" Particle Catalytically Active Materials

In some embodiments, catalytically active material may be "nano-on-nano-on-micron" or "NNm" particles. The composite nanoparticles (nano-on-nano particles) may be further bonded to the surface of and within the pores of micron-sized carrier particles to produce "nano-on-nano-on-micron" particles or "NNm" particles. The carrier particles are typically metal oxide particles, such as alumina ($Al_2O_3$). The micron-sized particles can have an average size between about 1 micron and about 100 microns, such as between about 1 micron and about 20 microns, such as between about 1 micron and about 10 microns, between about 3 microns and about 7 microns, or between about 4 microns and about 6 microns. In one preferred embodiment, the catalytic nanoparticles have an average diameter between approximately 1 nm to approximately 5 nm, the support nanoparticles have an average diameter between approximately 10 nm and approximately 20 nm, and the micron-sized particles have an average diameter between approximately 1 micron and 10 microns. In another embodiment, the catalytic nanoparticles have an average diameter between approximately 0.3 nm to approximately 10 nm, the support nanoparticles have an average diameter between approximately 10 nm and approximately 20 nm, and the micron-sized particles have an average diameter between approximately 1 micron and 10 microns.

In general, the NNm particles are produced by a process forming a colloid of composite nanoparticles (nano-on-nano particles) in water, adjusting the pH of the suspension to between about 2 and about 7, between about 3 and about 5, or about 4, adding surfactants to the suspension (or, alternatively, adding the surfactants to the water before suspending the composite nano-particles in the water), sonicating the composite nano-particle suspension, applying the suspension to micron-sized metal oxide particles until the point of incipient wetness, thereby impregnating the micron-sized particles with composite nano-particles, drying the micron-sized metal oxide particles which have been impregnated with composite nanoparticles, and calcining the micron-sized metal oxide particles which have been impregnated with composite nanoparticles.

Typically, the composite nanoparticles are dispersed in water, and the colloid is adjusted to have a pH of between about 2 and about 7, preferably between about 3 and about 5, more preferably a pH of about 4 (the pH is adjusted with acetic acid or another organic acid). Dispersants and/or surfactants are added to the composite nano-particles. Surfactants suitable for use include Jeffsperse® X3202 (Chemical Abstracts Registry No. 68123-18-2, and described as 4,4'-(1-methylethylidene)bis-phenol polymer with 2-(chloromethyl)oxirane, 2-methyloxirane, and oxirane), Jeffsperse® X3204, and Jeffsperse® X3503 surfactants from Huntsman (JEFFSPERSE is a registered trademark of Huntsman Corporation, The Woodlands, Tex., United States of America for chemicals for use as dispersants and stabilizers), which are nonionic polymeric dispersants. Other suitable surfactants include Solsperse® 24000 and Solsperse® 46000 from Lubrizol (SOLSPERSE is a registered trademark of Lubrizol Corporation, Derbyshire, United Kingdom for chemical dispersing agents). The Jeffsperse® X3202 surfactant, Chemical Abstracts Registry No. 68123-18-2 (described as 4,4'-(1-methylethylidene)bis-phenol polymer with 2-(chloromethyl)oxirane, 2-methyloxirane, and oxirane), is preferred. The surfactant is added in a range of about 0.5% to about 5%, with about 2% being a typical value.

The mixture of aqueous surfactants and composite nano-particles is sonicated to disperse the composite nano-particles. The quantity of composite nano-particles particles in the dispersion is usually in the range of about 2% to about 15% (by mass). The dispersion is then applied to porous, micron sized $Al_2O_3$, which may be purchased from companies such as Rhodia or Sasol. In some embodiments, the porous, micron sized, $Al_2O_3$ powders may be stabilized with a small percentage of lanthanum (about 2% to about 4% La). One commercial alumina powder suitable for use is MI-386, purchased from Grace Davison or Rhodia. The usable surface for this powder, defined by pore sizes greater than 0.28 μm, is approximately 2.8 $m^2/g$. In addition, the porous, micron-sized $Al_2O_3$ powders may be impregnated with oxidative PGM via wet-chemistry methods, for preparation of hybrid particles. The ratio of composite nano-particles used to micron-sized carrier particles used may be from about 3:100 to about 10:100, about 5:100 to about 8:100, or about 6.5:100, in terms of (weight of composite nanoparticle):(weight of micron carrier particle). In some embodiments, about 8 grams of composite nano-particles may be used with about 122 grams of carrier micro-particles. The aqueous dispersion of composite nano-particles is applied in small portions (such as by dripping or other methods) to the micron-sized powder until the point of incipient wetness, producing a material similar to damp sand.

The micron-sized carrier particles, impregnated with the composite nano-particles, may then be dried (for example, at about 30° C. to about 95° C., preferably about 60° C. to about 70° C., at atmospheric pressure or at reduced pressure such as from about 1 pascal to about 90,000 pascal). After drying, the particles may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere or under an inert atmosphere such as nitrogen or argon) to yield the composite micro/nano-particles, also referred to as nano-on-nano-on-micron particles, or NNm particles. The drying step may be performed before the calcining step to remove the water before heating at the higher calcining temperatures; this avoids boiling of the water, which would disrupt the impregnated nano-particles which are lodged in the pores of the micron-sized carrier.

The NNm particles may contain PGM from about 0.001 wt % to about 10 wt %, such as between 1 wt % to about 8 wt %, or about 4 wt % to about 8 wt %, or about 1 wt % to about 4 wt % of the total mass of the NNm particle. In some embodiments, NNm particles may contain PGM from about 2% to 3% by weight, or in some embodiments, about 2.5% by weight, of the total mass of the NNm particle. In some embodiments, NNm particles may contain PGM from about 5% to 7% by weight, or in some embodiments, about 6% by weight, of the total mass of the NNm particle. The NNm particles can then be used for formulations for coating substrates, where the coated substrates may be used in catalytic converters.

Examples of production of NNm material are described in the following co-owned patents and patent applications: U.S. Patent Publication No. 2005/0233380, U.S. Patent Publication No. 2006/0096393, U.S. patent application Ser. No. 12/151,810, U.S. patent application Ser. No. 12/152,084, U.S. patent application Ser. No. 12/151,809, U.S. Pat. No. 7,905,942, U.S. patent application Ser. No. 12/152,111, U.S. Patent Publication 2008/0280756, U.S. Patent Publication 2008/0277270, U.S. patent application Ser. Nos. 12/001,643, 12/474,081, 12/001,602, 12/001,644, 12/962,518, 12/962,473, 12/962,490, 12/969,264, 12/962,508, 12/965,745, 12/969,503, 13/033,514, WO 2011/081834 (PCT/US2010/59763) and US 2011/0143915 (U.S. patent application Ser. No. 12/962,473), U.S. Patent Application Publication No. 2008/0277267, U.S. Pat. No. 8,663,571, U.S. patent application Ser. No. 14/207,087 and International Patent Appl. No. PCT/US2014/024933, the disclosures of which are hereby incorporated by reference in its entirety.

Production of Hybrid Micron-Sized Carrier Particles Bearing Composite Nanoparticles ("Nano-on-Nano-on-Micro" Particles or "NNm"™ Particles) and Also Impregnated with Platinum Group Metal(s) Using Wet-Chemistry Methods—"Hybrid NNm/Wet-Chemistry Particles" or "Hybrid Composite/Wet-Chemistry Particles"

The micron-sized particles which bear the composite (nano-on-nano) nanoparticles can additionally be impregnated with platinum group metals using wet-chemistry methods, so that PGM is present on the micron-sized particle due to the nano-on-nano composite nanoparticles and also due to the deposition via wet-chemistry. The micron-sized particles can be impregnated with PGM before or after the composite nanoparticles (nano-on-nano) are bonded to the micron-sized particles. When the nano-on-nano particles are added to the micron-sized carrier particles, the nano-on-nano particles tend to stay near the surface of the micron particle, as they are too large to penetrate into the smaller pores of the micron particle. Therefore, impregnating these micron-sized particles via wet-chemistry methods allows for PGM to penetrate deeper into the micron-sized particles than the corresponding nano-on-nano particles. In addition, because the nano-on-nano particles of these hybrid NNm/wet-chemistry particles contain PGM, lower amounts of PGM can be impregnated by wet-chemistry on the micron-sized particles to achieve the total desired loading. For example, if a final loading of 5 g/l of PGM is desired on the final catalyst, loading 3 g/l of PGM as nano-on-nano (NN) particles requires only 2 g/l of PGM to be loaded via wet-chemistry methods. A lower amount of wet-chemistry impregnated PGM can reduce the agglomeration rate of these wet-chemistry impregnated catalytic particles when the catalyst is exposed to prolonged elevated temperatures since there is less PGM to agglomerate. That is, the rate of aging of the catalyst will be reduced, since the rate of collision and agglomeration of mobile wet-chemistry-deposited PGM is reduced at a lower concentration of the wet-chemistry-deposited PGM, but without lowering the overall loading of PGM due to the contribution of PGM from the nano-on-nano particles. Thus, employing the nano-on-nano-on-micro configuration and using a micron-sized particle with wet-chemistry deposited platinum group metal can enhance catalyst performance while avoiding an excessive aging rate.

Methods for impregnation of carriers and production of catalysts by wet-chemistry methods are discussed in Heck, Ronald M.; Robert J. Farrauto; and Suresh T. Gulati, Catalytic Air Pollution Control: Commercial Technology, Third Edition, Hoboken, N.J.: John Wiley & Sons, 2009, at Chapter 2, pages 24-40 (see especially pages 30-32) and references disclosed therein, and also in Marceau, Eric; Xavier Carrier, and Michel Che, "Impregnation and Drying," Chapter 4 of Synthesis of Solid Catalysts (Editor: de Jong, Krijn) Weinheim, Germany: Wiley-VCH, 2009, at pages 59-82 and references disclosed therein.

For wet-chemistry impregnation, typically a solution of a platinum group metal salt is added to the micron sized carrier particle to the point of incipient wetness, followed by drying, calcination, and reduction as necessary to elemental metal. Platinum can be deposited on carriers such as alumina by using Pt salts such as chloroplatinic acid H2PtCl6), followed by drying, calcining, and reduction to elemental metal. Palladium can be deposited on carriers such as alumina using salts such as palladium nitrate (Pd(NO3)2), palladium chloride (PdCl2), palladium(II) acetylacetonate (Pd(acac)2), followed by drying, calcining, and reduction to elemental metal (see, e.g., Toebes et al., "Synthesis of supported palladium catalysts," Journal of Molecular Catalysis A: Chemical 173 (2001) 75-98). Reduction can be carried out by exposure to reducing gases, such as hydrogen or ethylene, at elevated temperatures.

"Nano-on-Nano-in-Micro" or "NNiM" Particles

In some embodiments, catalytically active material may be "nano-on-nano-in-micron" or "NNiM" particles, such as those disclosed in U.S. Provisional Patent Appl. No. 61/881,337 filed Sep. 23, 2013, U.S. patent application Ser. No. 14/494,156 filed Sep. 23, 2014, and International Patent Appl. No. PCT/US2014/057036 filed Sep. 23, 2014, the disclosures of which are hereby incorporated by reference in their entirety. NNiM particles are micron-sized catalytic particles wherein composite nanoparticles, such as those described above, are embedded within porous micron-sized carrier particles. The NNiM particles are created by mixing composite nanoparticles with a precursor material of the porous carrier. The precursor material is then transformed (for example, by chemical reaction and/or heating) into the porous carrier material, typically in a solid block form, where the porous carrier material now forms a porous carrier matrix. The solid block of porous carrier material with embedded composite nanoparticles is then ground or milled into micron-sized carrier particles.

The porous micron-sized carrier may be any micron-sized substance that contains any large number of interconnected pores, holes, channels, or pits, with an average pore, hole, channel, or pit width (diameter) ranging from about 1 nm to about 200 nm, or about 1 nm to about 100 nm, or about 2 nm to about 50 nm, or about 3 nm to about 25 nm. In some embodiments, a porous carrier has a mean pore, hole, channel, or pit width (diameter) of less than about 1 nm, while in other embodiments, a porous carrier has a mean pore, hole, channel, or pit width (diameter) of greater than about 100 nm. In some embodiments, a porous carrier has an average pore surface area in a range of about 50 $m^2/g$ to about 500 $m^2/g$. In some embodiments, a porous carrier has an average pore surface area in a range of about 100 $m^2/g$ to about 400 $m^2/g$. In other embodiments, a porous carrier has an average pore surface area in a range of about 150 $m^2/g$ to about 300 $m^2/g$. In some embodiments, a porous carrier has an average pore surface area of less than about 50 $m^2/g$. In some embodiments, a porous carrier has an average pore surface area of greater than about 500 $m^2/g$. In some embodiments, a porous carrier has an average pore surface area of about 200 $m^2/g$.

A porous carrier embedded with nanoparticles can be formed using any porous material as the carrier matrix. A porous carrier material precursor may include, but is not limited to, any gel produced by the sol-gel method, for example, alumina ($Al_2O_3$) or silica aerogels. In some embodiments, a porous carrier precursor may be comprised of porous metal oxide (such as aluminum oxide), or an organic polymer (such as polymerized resorcinol), or amorphous carbon, or silica, or porous ceramic. In some embodiments, a porous carrier precursor may comprise a mixture of two or more different types of interspersed porous materials, for example, a mixture of aluminum oxide and polymerized resorcinol. In some embodiments, the porous carrier may comprise aluminum oxide after a spacer material has been removed from the precursor. For example, in some embodiments, a composite material may be formed with interspersed aluminum oxide and polymerized resorcinol, and the polymerized resorcinol is removed, for example, by calcination, resulting in a porous carrier. In another embodiment, a composite material may be formed with interspersed aluminum oxide and carbon black, and the carbon black is removed, for example, by calcination, resulting in a porous carrier.

In NNiM particles, such as catalytic nanoparticles or catalytic composite nanoparticles are embedded within the porous carrier which has been formed around the nanoparticles. In some embodiments, the catalytic particles are evenly distributed throughout the porous carrier. In other embodiments, the catalytic particles are clustered throughout the porous carrier. In some embodiments, platinum group metals comprise about 0.001 wt % to about 10 wt % of the total catalytic material (catalytic particles and porous carrier). For example, platinum group metals may comprise about 1 wt % to about 8 wt % of the total catalytic material (catalytic particles and porous carrier). In some embodiments, platinum group metals may comprise less than about 10 wt %, less than about 8 wt %, less than about 6 wt %, less than about 4 wt %, less than about 2 wt %, or less than about 1 wt % of the total catalytic material (catalytic particles and porous carrier). In some embodiments, platinum group metals may comprise about 1 wt %, about 2 wt %, about 3 wt %, about 4 wt %, about 5 wt %, about 6 wt %, about 7 wt %, about 8 wt %, about 9 wt %, or about 10 wt % of the total catalytic material (catalytic particles and porous carrier).

In some embodiments, the catalytic nanoparticles comprise one or more platinum group metals. In embodiments with two or more platinum group metals, the metals may be in any ratio. In some embodiments, the catalytic nanoparticles comprise platinum group metal or metals, such as about 1:2 to about 100:1 Pt/Pd (weight/weight), 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or about 20:1 Pt/Pd (weight/weight).

The micron-sized NNiM particles can have an average size between about 1 micron and about 100 microns, such as between about 1 micron and about 10 microns, between about 3 microns and about 7 microns, or between about 4 microns and about 6 microns. In some embodiments, the NNiM particles can be used in catalytic washcoat formulations for coating substrates, where the coated substrates may be used in catalytic converters.

NNiM particles may be produced through a variety of different methods, for example, those methods disclosed in U.S. Provisional Patent Appl. No. 61/881,337 filed Sep. 23, 2013, U.S. patent application Ser. No. 14/494,156 filed Sep. 23, 2014, and International Patent Appl. No. PCT/US2014/057036 filed Sep. 23, 2014, the disclosures of which are hereby incorporated by reference in their entirety. In some embodiments, catalytic nano-particles or composite nano-particles can be embedded in a porous carrier by forming a suspension or colloid of composite catalytic nanoparticles, and mixing the suspension or colloid of composite catalytic nanoparticles with a porous material precursor solution. Upon solidification of the porous material with the mixture, such as by polymerization, precipitation, or freeze-drying, the porous material will form around the nano-particles, resulting in a catalytic material comprising nano-particles embedded in a porous carrier. In some embodiments, the catalytic material is then processed, such as by grinding or milling, into a micron-sized powder, resulting in NNiM particles.

The detailed description below describes the production of NNiM particles using a porous aluminum oxide carrier formed using a composite carrier precursor comprising a combustible organic gel component and an aluminum oxide component, followed by drying and calcination. However, any manner of porous carrier originating from soluble or suspendable precursors may be used to form NNiM particles.

For typical NNiM particles produced using a porous aluminum oxide carrier formed using a composite material comprising a combustible organic gel component and an aluminum oxide component, the composite nano-particles are initially dispersed in ethanol. In some embodiments, at least 95 vol % ethanol is used. In other embodiments, at least 99 vol % ethanol is used. In still other embodiments, at least 99.9 vol % ethanol is used. Dispersants and/or surfactants are typically added to the ethanol before suspension of the composite nano-particles. A suitable surfactant includes DisperBYK®-145 (and others of the family) from BYK-Chemie GmbH LLC, Wesel, which can be added in a range of about 2 wt % to about 12 wt %, with about 7 wt % being a typical value, and dodecylamine, which can be added in a range of about 0.25 wt % to about 3 wt %, with about 1 wt % being a typical value. Preferably, both DisperBYK®-145 and dodecylamine are used at about 7 wt % and 1 wt %, respectively. In some embodiments, the mixture of ethanol, composite nano-particles, and surfactants and/or dispersants is sonicated to uniformly disperse the composite nano-particles. The quantity of composite nano-particles particles in the dispersion is usually in the range of about 5 wt % to about 20 wt %.

Separately from the composite nano-particle suspension, a gel activation solution is prepared by mixing formaldehyde and propylene oxide. The formaldehyde is preferably in an aqueous solution. In some embodiments, the concentration of the aqueous formaldehyde solution is about 5 wt % to about 50 wt % formaldehyde, about 20 wt % to about 40 wt % formaldehyde, or about 30 wt % to about 40 wt % formaldehyde. Preferably, the aqueous formaldehyde is about 37.5 wt % formaldehyde. In some embodiments, the aqueous formaldehyde may contain about 5 wt % to about 15 wt % methanol to stabilize the formaldehyde in solution. The aqueous formaldehyde solution can be added in a range of about 25% to about 50% of the final weight of the gel activation solution, with the remainder being propylene oxide. Preferably, the gel activation solution comprises 37.5 wt % of the aqueous formaldehyde solution (which itself comprises 37.5 wt % formaldehyde) and 62.5 wt % propylene oxide, resulting in a final formaldehyde concentration of about 14 wt % of the final gel activation solution.

Separately from the composite nano-particle suspension and gel activation solution, an aluminum chloride solution is produced by dissolving aluminum chloride in a mixture of resorcinol and ethanol. Resorcinol can be added at a range of about 10 wt % to about 30 wt %, with about 23 wt % being a typical value. Aluminum chloride can be added at a range of about 2 wt % to about 12 wt %, with about 7 wt % being a typical value.

The composite nano-particle suspension, gel activation solution, and aluminum chloride solution can be mixed together at a ratio from of about 100:10:10 to about 100:40:40, or about 100:20:20 to about 100:30:30, or about 100:25:25, in terms of (weight of composite nano-particle suspension):(weight of gel activation solution):(weight of aluminum chloride solution). The final mixture will begin to polymerize into a porous gel embedded with composite nanoparticles. The resulting gel may then be dried (for example, at about 30° C. to about 95° C., preferably about 50° C. to about 60° C., at atmospheric pressure or at reduced pressure such as from about 1 pascal to about 90,000 pascal, for about one day to about 5 days, or for about 2 days to about 3 days). After drying, the resulting gel may then be calcined (at elevated temperatures, such as from about 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere or under an inert atmosphere such as nitrogen or argon) to yield a gel comprising composite catalytic nano-particles and non-composite aluminate nano-particles. When the composite gel is calcined under ambient atmosphere or other oxygenated conditions, organic material, such as polymerized resorcinol, formaldehyde, or propylene oxide, is burnt off, resulting in a substantially pure aluminum oxide porous carrier embedded with composite nanoparticles. The resulting gel can be processed, such as by grinding or milling, into a micro-sized powder of NNiM particles.

In another method of forming NNiM particles, composite catalytic nanoparticles may be mixed with a dispersion comprising metal oxide nanoparticles, such as aluminum oxide nanoparticles, and amorphous carbon, such as carbon black. The dispersed solid particles from resulting dispersed colloid may be separated from the liquid by co-precipitation, dried, and calcined. Upon calcination of the solid material in an ambient or oxygenated environment, the amorphous carbon is exhausted. Simultaneously, the heat from the calcination process causes the aluminum oxide nanoparticles to sinter together, resulting in pores throughout the precipitated aluminum oxide.

In some embodiments, aluminum oxide nanoparticles can be suspended in ethanol, water, or a mix of ethanol and water. Carbon black with an average grain size ranging from about 1 nm to about 200 nm, or about 20 nm to about 100 nm, or about 20 nm to about 50 nm, or about 35 nm, may be added to the aluminum oxide suspension. In some embodiments, sufficient carbon black to obtain a pore surface area of about 50 $m^2/g$ to about 500 $m^2/g$ should be used, such as about 50 $m^2/g$, about 100 $m^2/g$, about 150 $m^2/g$, about 200 $m^2/g$, about 250 $m^2/g$, about 300 $m^2/g$, about 350 $m^2/g$, about 400 $m^2/g$, about 450 $m^2/g$, or about 500 $m^2/g$. Composite nanoparticles may be mixed into the dispersion comprising aluminum oxide nanoparticles and carbon black. In some embodiments, the composite nanoparticles are dispersed in a separate colloid, optionally with dispersants or surfactants, before being mixed with the dispersion comprising aluminum oxide nanoparticles and carbon black. The pH of the resulting mixture can be adjusted to a range of about 2 to about 7, such as a pH of between about 3 and about 5, preferably a pH of about 4, allowing the particles to precipitate. The precipitant can be dried (for example, at about 30° C. to about 95° C., preferably about 50° C. to about 70° C., at atmospheric pressure or at reduced pressure such as from about 1 pascal to about 90,000 pascal, for about one day to about 5 days, or for about 2 days to about 3 days). After drying, the carrier may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere). The calcination process causes the carbon black to substantially burn away and the aluminum oxide nanoparticles sinter together, yielding a porous aluminum oxide carrier embedded with composite nanoparticles.

The resulting carrier embedded with composite nanoparticles may be further processed, for example by grinding or milling, into micron-sized NNiM particles. Generally, to form the NNiM particles, a gel is formed using a suspension of composite nano-particles and a precursor gel carrier. Drying, pyrolysis, or calcination of the gel results in the formation of a porous carrier with composite nano-particles embedded within and distributed throughout the composite material. The resulting composite material can then be ground or milled into micro-sized powder NNiM particles.

Non-Exclusive Use of Different Types of Catalytically Active Materials.

In some embodiments, two or more different types of catalytically active materials are used. In some embodiments, two or more different types of catalytically active materials may be used in the same catalytic washcoat composition or catalytic layer. For example, in some embodiments, both catalytic particles produced by only wet-chemistry methods and NNm particles may be used in a single catalytic washcoat composition or catalytic layer. In another example, in some embodiments, both catalytic particles produced by only wet-chemistry methods and NNiM particles may be used in a single catalytic washcoat composition or catalytic layer. In some embodiments, both NNiM particles and NNm particles may be used in a single catalytic washcoat composition or catalytic layer. In another example, in some embodiments, catalytic particles produced by only wet-chemistry methods, NNm particles, and NNiM particles may be used in a single catalytic washcoat composition or catalytic layer. In some embodiments, NNm particles and hybrid NNm/wet-chemistry particles may be used in a single catalytic washcoat composition or catalytic layer. In some embodiments, catalytic particles produced by only wet-chemistry methods and hybrid NNm/wet-chemistry particles may be used in a single catalytic washcoat composition or catalytic layer. In some embodiments, NNiM particles and hybrid NNm/wet-chemistry particles may be used in a single catalytic washcoat composition or catalytic layer. In some embodiments, NNm particles, catalytic particles produced by only wet-chemistry methods, and hybrid NNm/wet-chemistry particles may be used in a single catalytic washcoat composition or catalytic layer. In some embodiments, NNiM particles, catalytic particles produced by only wet-chemistry methods, and hybrid NNm/wet-chemistry particles may be used in a single catalytic washcoat composition or catalytic layer. In some embodiments, NNm particles, NNiM particles, and hybrid NNm/wet-chemistry particles may be used in a single catalytic washcoat composition or catalytic layer. In some embodiments, NNm particles, NNiM particles, catalytic particles produced by only wet-chemistry methods, and hybrid NNm/wet-chemistry particles may be used in a single catalytic washcoat composition or catalytic layer.

In some embodiments of the present invention, different ratios of different catalytic metals may be more or less efficient in catalyzing various emissions, such as carbon monoxide (CO), nitrogen oxides ($NO_x$), or hydrocarbons (HC). For example, in some embodiments, catalytically active materials with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight) are more efficient at catalyzing $NO_x$ emissions and less efficient at catalyzing HC emissions when compared to catalytically active materials with a mixture of platinum and palladium at a ratio of 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, for an equivalent amount of total PGM used. Therefore, in some embodiments of the invention, it is preferred to utilize different types of catalytically active materials with different ratios of catalytic metals (or catalytically active materials with a mixture of metal types and catalytically active materials with a single metal type), and for such ratios to be maintained during the continued operation of the catalysts.

In some embodiments, different types of catalytically active materials of the same structure but with different catalytic metal ratios are used in a single catalytic washcoat composition or catalytic layer. For example, in some embodiments, catalytic particles produced by only wet-chemistry methods with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with catalytic particles produced by only wet-chemistry methods with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer. In some embodiments, NNm particles with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with NNm particles with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer. In some embodiments, NNiM particles with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with NNiM particles with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer. In some embodiments, hybrid NNm/wet-chemistry particles with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with hybrid NNm/wet-chemistry particles with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer.

In some embodiments, different types of catalytically active materials of different structures and with different catalytic metal ratios are used in a single catalytic washcoat composition or catalytic layer. For example, in some embodiments, catalytic particles produced by only wet-chemistry methods with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with NNm particles with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer. In some embodiments, catalytic particles produced by only wet-chemistry methods with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with NNiM particles with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer. In some embodiments, NNiM particles with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with catalytic particles produced by only wet-chemistry methods with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer. In some embodiments, NNm particles with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with catalytic particles produced by only wet-chemistry methods with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer. In some embodiments, NNm particles with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with NNiM particles with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer. In some embodiments, different types of catalytically active materials of different structures and with different catalytic metal ratios are used in a single catalytic washcoat composition or catalytic layer. For example, in some embodiments, catalytic particles produced by only wet-chemistry methods with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with hybrid NNm/wet-chemistry particles with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer. In some embodiments, hybrid NNm/wet-chemistry particles with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with NNm particles with a mixture of platinum and palladium at a ratio of about 1:2 to about 8:1 Pt/Pd (weight/weight), or about 1:1 to about 5:1

Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer. In some embodiments, NNiM particles with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with hybrid NNm/wet-chemistry particles with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer. In some embodiments, hybrid NNm/wet-chemistry particles with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with catalytic particles produced by only wet-chemistry methods with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer. In some embodiments, NNm particles with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with hybrid NNm/wet-chemistry particles with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer. In some embodiments, hybrid NNm/wet-chemistry particles with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), may be mixed with NNm particles with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, in a single catalytic washcoat composition or catalytic layer.

Combinations of different types of catalytically active materials, such as catalytically active materials with different structures or different ratios of catalytic metals are contemplated by this invention. Different types catalytically active materials with different or the same catalytic metal ratios but with different structures may be combined in any proportion. Different types catalytically active materials with different or the same catalytic structure but with different ratios of catalytic ratios may be combined in any proportion. In some embodiments, a first type of catalytically active material and a second type of catalytically active material may be combined a proportion of about 99.9:0.1 to about 50:50 by weight, or about 95:5 by weight, about 90:10 by weight, about 80:20 by weight, about 70:30 by weight, about 65:35 by weight, about 60:40 by weight, about 55:45 by weight, or about 50:50 by weight.

The platinum group metals deposited by wet-chemical methods onto metal oxide supports, such as alumina, are mobile at high temperatures, such as temperatures encountered in catalytic converters, such as when used with heavy-duty vehicles. That is, at elevated temperatures, the platinum group metal atoms can migrate over the surface on which they are deposited, and may clump together with other PGM atoms within a single catalytic layer. The finely-divided portions of PGM combine into larger and larger agglomerations of platinum group metal as the time of exposure to high temperature increases. This agglomeration leads to reduced catalyst surface area and degrades the performance of the catalytic converter. This phenomenon is referred to as "aging" of the catalytic converter. When different catalytic particles produced by wet-chemistry methods with different catalytic metal ratios (such as different Pt/Pd ratio) are used in a single catalytic layer, there is some concern that the aging catalytic converter will allow the PGMs to combine, decreasing the ratio differential between the different catalytic particles produced by wet-chemistry methods. It is therefore preferred, but should not be considered limiting, that when using different types of catalytic particles produced by wet-chemistry methods with different catalytic metal ratios, the different catalytic particles be located in different catalytic layers. This should not be considered limiting, however, as in some embodiments different catalytic particles produced by wet-chemistry methods with different catalytic metal ratios are located in the same catalytic layer.

In embodiments using composite nanoparticles, such as NNiM particles or NNm particles, catalytic platinum group metals generally have much lower mobility than the platinum group metals deposited by wet-chemistry methods. The resulting plasma-produced catalysts age at a much slower rate than the wet-chemistry produced catalysts. Thus, catalytic converters using plasma-produced catalysts can maintain a larger surface area of exposed catalyst to gases emitted by the engine over a longer period. The Pt/Pd-alumina composite nanoparticles, when produced under reducing conditions, such as by using argon/hydrogen working gas, results in a partially reduced alumina surface on the support nano-particle on which the platinum group metal catalytic nano-particle is disposed, as described in US 2011/0143915 at paragraphs 0014-0022, the disclosure of which is hereby incorporated by reference in its entirety. The partially reduced alumina surface, or $Al_2O_{(3-x)}$ where x is greater than zero, but less than three, inhibits migration of the platinum group metal on the alumina surface at high temperatures. This in turn limits the agglomeration of platinum group metal when the particles are exposed to prolonged elevated temperatures, such as those found in catalytic converters of heavy-duty vehicles. It is therefore preferred, but not considered limiting, that in embodiments where catalytic particles produced by wet-chemistry methods with a first catalytic metal ratio, or hybrid NNm/wet-chemistry particles with a first catalytic metal ratio, are mixed in the same washcoat layer with a second type of catalytically active material with a second ratio of catalytic metal, that the second type of catalytically active material with the second ratio of catalytic material be of a type using composite nanoparticles, such as NNm particles or NNiM particles. However, this should not be considered limiting, as combinations of any or all types of particles as disclosed herein in the same washcoat layer can be used.

Impregnation of a support, such as a micron-sized support, using wet-chemistry methods tends to deposit the material throughout the material, that is, deep into the interior of the material. For example, applying a solution of chloroplatinic acid to a micron-sized aluminum oxide particle will result in penetration of the solution throughout the particle. When followed by drying and calcining, platinum precipitates from solution onto the alumina in finely-divided portions (typically on the order of tenths of nanometers, i.e., clusters of a few atoms, or on the order of nanometers) throughout the entire volume of the particle. Thus, a support impregnated with a metal salt via wet-chemistry methods will have material distributed substantially evenly throughout the volume of the support, or at the very least throughout the volume of the particle accessible to the metal salt solution.

In contrast, impregnation of a support, such as a micron-sized support, with composite nanoparticles ("nano-on-nano" or "NN" particles) tends to result in the catalytic material distributed primarily on or near the surface of the support particle. As the nano-on-nano particles are applied to the support particle in a suspension, they cannot penetrate as deeply into the interior of the support particle as the solution of metal salt used in the wet-chemistry methods, resulting in an "eggshell" distribution, where a thin layer of NN particles coats the surface (and the pores closest to the surface) of the support. Thus, the majority of NN particles tend to be located on or near the surface of the support. The NN particles cannot penetrate into pores of the support which are not large enough to accept the NN particles, and are restricted to the exterior surface, and the interior portions of the support particle that are accessible to the NN particles. The nano-on-nano-on-micro ("NNm") particles thus have composite nanoparticles distributed on the exterior surface and on the nano-on-nano accessible interior surface of the micron-sized support particle.

The nano-on-nano-in-micro (NNiM) particles described herein, and described in more detail in co-owned U.S. Provisional Patent Appl. No. 61/881,337 filed Sep. 23, 2013, U.S. patent application Ser. No. 14/494,156 filed Sep. 23, 2014, and International Patent Appl. No. PCT/US2014/057036 filed Sep. 23, 2014, the disclosures of which are hereby incorporated by reference in their entirety, were designed in order to remedy the uneven distribution of the composite nanoparticles on the micron-sized support. By forming a matrix of the support material around the composite nanoparticles (nano-on-nano or "NN" particles), the composite nanoparticles can be substantially evenly distributed throughout the support material. The support material containing the composite nanoparticles can be milled or ground to the desired micron-sized dimension, thus creating a micron-sized support particle with a substantially uniform distribution of composite nanoparticles throughout its entire volume. This nano-on-nano-IN-micro (NNiM) configuration permits loading much more catalyst per unit volume of support material (i.e., per unit volume of micron-sized support particle) than the nano-on-nano-ON-micro (NNm) configuration.

The hybrid particles as described herein also alleviate the uneven distribution of catalyst material to some extent, by using a wet-chemistry-impregnated particle as the support micron particle for the nano-on-nano-on-micron (NNm) procedure. By impregnating the micron support with a PGM salt solution, then drying and calcining, and then by adding nano-on-nano particles to the wet-chemistry-impregnated micron support, a hybrid particle, with catalyst distributed substantially evenly throughout the volume of the support, or at the very least throughout the volume of the particle accessible to the metal salt solution, and also having composite nanoparticles distributed on the exterior surface and on the nano-on-nano accessible interior surface of the micron-sized support particle, can be formed. As noted above, the inclusion of nano-on-nano particles reduces the concentration of the catalyst material that must be impregnated by wet-chemistry methods, which in turn slows down the kinetics of aging of the catalyst material deposited by wet-chemistry methods.

Washcoat Compositions and Layers Applied to Substrates

Catalytic converters may be formed by applying one or more washcoats on a substrate, such as a catalytic converter substrate. At least one washcoat applied to the substrate should be a catalytic washcoat, and comprise catalytically active material. In some embodiments, one catalytic washcoat is applied to a substrate. In another embodiment, two catalytic washcoats are applied to a substrate. In some embodiments, three or more catalytic washcoats are applied to a substrate.

In some embodiments, additional washcoats may be applied to the substrate in addition to the catalytic washcoat. For example, in some embodiments, a corner fill washcoat may be applied to the substrate. In some embodiments, a washcoat comprising zeolites may be applied to the substrate. The washcoat comprising zeolites can be applied to the substrate as a corner-fill washcoat (that is, the first washcoat to be applied to the substrate), or under or over any of the other washcoats on the substrate. In some embodiments, no washcoat comprising zeolite particles is present. In some embodiments, washcoats are substantially free of zeolite particles. In some embodiments, the washcoats containing catalytically active materials are substantially free of zeolite particles. In some embodiments, washcoats containing nano-on-nano-on-micro (NNm) particles are substantially free of zeolite particles. In some embodiments, washcoats containing nano-on-nano-in-micro (NNiM) particles are substantially free of zeolite particles. In some embodiments, washcoats containing nano-on-nano-on-micro (NNm) particles and nano-on-nano-in-micro (NNiM) particles are substantially free of zeolite particles.

In some embodiments, the coated substrate is free of zeolites. In some embodiments, the coated substrate is substantially free of zeolites. In some embodiments, the coated substrate contains less than about 0.1% zeolites, less than about 0.5% zeolites, less than about 1% zeolites, less than about 2% zeolites, or less than about 5% zeolites by weight of the total weight of all of the washcoats on the substrate.

Some embodiments of washcoat layers applied to a substrate may be configured as follows:
Substrate-Catalytic Layer (S-C)
Substrate-First Catalytic Layer-Second Catalytic Layer (S-C1-C2)
Substrate-Corner-Fill Layer-Catalytic Layer (S-F-C)
Substrate-Corner-Fill Layer-First Catalytic Layer-Second Catalytic Layer (S-F-$C_1$-$C_2$)

The catalytic layer (or catalyst-containing layer) refers to the catalytic washcoat composition after it has been applied to the substrate, dried, and calcined. The corner-fill layer refers to the corner-fill washcoat composition after it has been applied to the substrate, dried, and calcined. Similarly, any other referenced layer refers to a washcoat composition after it has been applied to the substrate, dried, and calcined. It should be noted that, in some embodiments, additional washcoat layers can be disposed under, over, or between any of the washcoat layers indicated in these basic configurations; that is, further layers can be present on the catalytic converter substrate in addition to the ones listed in the configurations above. In other embodiments, additional washcoat layers are not applied; that is, the washcoats listed in the configurations above are the only washcoats present on the catalytic converter substrate.

Substrates

The initial substrate is preferably a catalytic converter substrate that demonstrates good thermal stability, including resistance to thermal shock, and to which the described washcoats can be affixed in a stable manner. Suitable substrates include, but are not limited to, substrates formed from cordierite or other ceramic materials, and substrates formed from metal. The substrates may include a honeycomb structure, which provides numerous channels and results in a high surface area. The high surface area of the coated substrate with its applied washcoats in the catalytic converter provides for effective treatment of the exhaust gas flowing through the catalytic converter.

General Washcoat Preparation Procedure

Washcoats are prepared by suspending the designated materials in an aqueous solution, adjusting the pH to between about 2 and about 7, to between about 3 and about 5, or to about 4, and adjusting the viscosity, if necessary, using cellulose, cornstarch, or other thickeners, to a value between about 300 cP to about 1200 cP.

The washcoat is applied to the substrate (which may already have one or more previously-applied washcoats) by coating the substrate with the aqueous solution, blowing excess washcoat off the substrate (and optionally collecting and recycling the excess washcoat blown off the substrate), drying the substrate, and calcining the substrate.

Corner-Fill Washcoat Compositions and Layers

Figure 2:
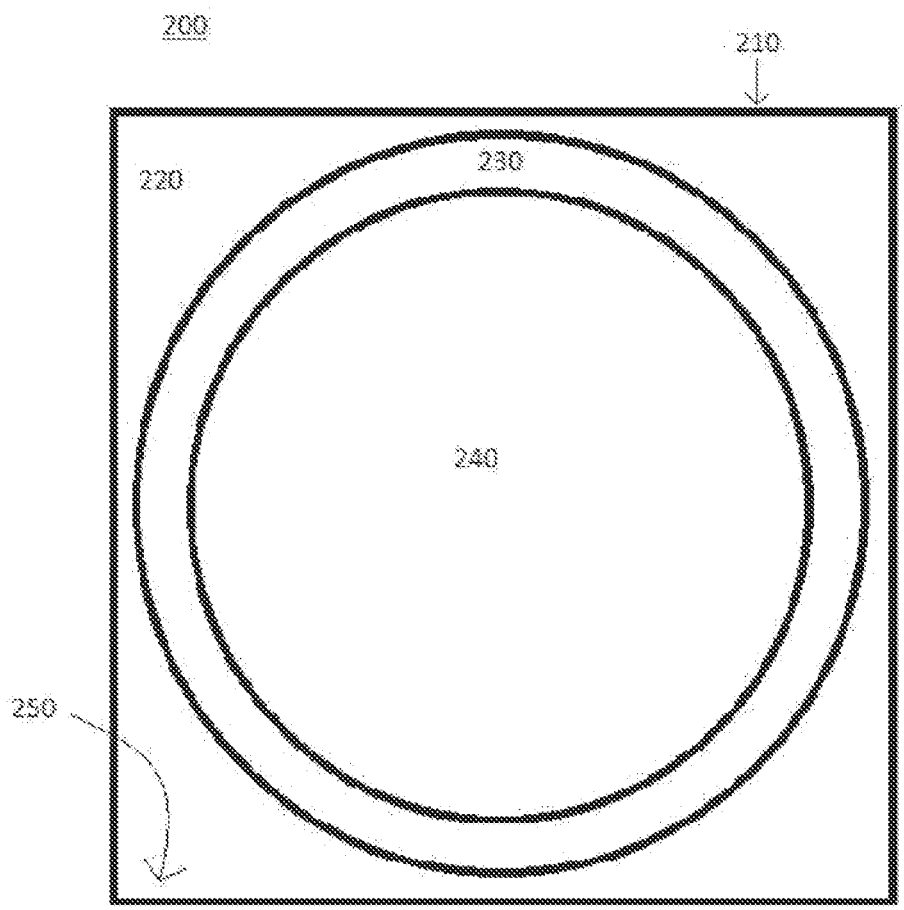
FIG. 2 illustrates a single rectangular channel in a coated substrate according to one embodiment of the present invention.

The corner-fill washcoat and the corner-fill washcoat layer (F) may be a relatively inexpensive layer, which may be applied to the substrate to fill up the "corners" and other areas of the substrate where exhaust gases are unlikely to penetrate in significant amounts. Preferably, this layer does not include any PGM. In some embodiments, the corner-fill washcoat layer may comprise zeolite particles. In some embodiments, the corner-fill washcoat layer does not comprise zeolite particles or is substantially free of zeolite particles. FIG. 2 shows a schematic of one embodiment in which a corner-fill washcoat is applied to a rectangular substrate channel 200 in a S-F-C configuration. The wall 210 of the substrate channel 200 has been coated with a corner-fill layer 220, and then a catalytic layer 230. When the coated substrate is operating in the catalytic converter, exhaust gases pass through the lumen 240 of the channel. The substrate channel corners 250 (as indicated by an arrow) have a relatively thick washcoat coating, and exhaust gases will be less likely to contact those regions. In, for example, the S-C configuration, the layers 220 and 230 would be a single layer, the catalytic layer, and significant amounts of expensive platinum group metal would be located in the corners (such as 250) where they are relatively inaccessible for catalysis. Thus, while the S-C configuration can be used, it may not be as cost-effective.

While a rectangular shape is shown for illustration, an equivalent analysis holds for any substrate with polygonal-shaped channels, or any substrate with channels that are not essentially cylindrical. For substrates with essentially cylindrical channels, which by definition do not have corners, a corner-fill washcoat may not be necessary for economic reasons (although it may still be applied for other reasons, such as to adjust the diameter of the channels).

In some embodiments, the corner-fill washcoat compositions may comprise filler particles, such as aluminum oxide particles (i.e., alumina). In some embodiments, the corner-fill washcoat compositions further comprise boehmite particles. In some embodiments, aluminum-oxide particles such as MI-386 material from Grace Davison, or the like, can be used. The size of the aluminum oxide particles is generally above about 0.2 microns, preferably above about 1 micron. In some embodiments, the solids content of the corner-fill washcoat comprises about 80 wt % to about 100 wt % porous alumina (MI-386 or the like). In some embodiments, the solids content of the corner-fill washcoat comprises about 80 wt % to about 99 wt % porous alumina and about 20 wt % to about 1 wt % boehmite, such as about 90 wt % to 99 wt % alumina and about 10 wt % to 1 wt % boehmite, or about 95 wt % to 99 wt % alumina and about 5 wt % to about 1 wt % boehmite, such as a corner-fill washcoat including about 97 wt % porous alumina and about 3 wt % boehmite.

In some embodiments, each of the aluminum oxide particles or substantially each of the aluminum oxide particles in the corner-fill washcoat composition have a diameter of approximately 0.2 microns to approximately 8 microns, such as about 4 microns to about 6 microns. In some embodiments, the aluminum oxide particles in the corner-fill washcoat composition have an average grain size of approximately 0.2 microns to approximately 8 microns, such as about 4 microns to about 6 microns. In some embodiments, at least about 75 wt %, at least about 80 wt %, at least about 90 wt %, or at least about 95 wt % of the aluminum oxide particles in the corner-fill washcoat composition have a particle size falling within the range of approximately 0.2 microns to approximately 8 microns, such as within the range of about 4 microns to about 6 microns. After a washcoat layer has been applied to a substrate, it may be dried, then calcined, onto the substrate. The corner-fill washcoat may be applied in a thickness of from about 30 g/l up to about 100 g/l; a typical value may be about 50 g/l.

Catalytic Washcoat Compositions and Layers

The catalytic washcoat composition and the catalytic layer on the substrate useful for application in heavy-diesel systems comprise a catalytically active material, and can be formed in a variety of ways. In some embodiments, the catalytically active material may be catalytic particles prepared by only wet-chemistry methods. In some embodiments, the catalytically active material may comprise nano-on-nano-on-micron (NNm) particles. In some embodiments, the catalytically active material may comprise nano-on-nano-in-micron (NNiM) particles. In some embodiments, the catalytically active material may comprise hybrid NNm/wet-chemistry particles. In some embodiments, the catalytic washcoat may comprise one, one or more, two, two or more, three, three or more, four, or four or more different types of catalytically active materials. For example, in some embodiments, a catalytic washcoat may comprise NNm particles and catalytic particles prepared by only wet-chemistry methods. In some embodiments, a catalytic washcoat may comprise NNiM particles and catalytic particles prepared by only wet-chemistry methods. In some embodiments, a catalytic washcoat may comprise NNm particles and NNiM particles. In some embodiments, a catalytic washcoat may comprise hybrid NNm/wet-chemistry particles and catalytic particles prepared by only wet-chemistry methods. In some embodiments, a catalytic washcoat may comprise hybrid NNm/wet-chemistry particles and NNiM particles. In some embodiments, a catalytic washcoat may comprise hybrid NNm/wet-chemistry particles and NNm particles. In some embodiments, a catalytic washcoat may comprise NNm particles, NNiM particles, and catalytic particles prepared by only wet-chemistry methods. In some embodiments, a catalytic washcoat may comprise NNm particles, hybrid NNm/wet-chemistry particles, and catalytic particles prepared by only wet-chemistry methods. In some embodiments, a catalytic washcoat may comprise NNiM particles, hybrid NNm/wet-chemistry particles, and catalytic particles prepared by only wet-chemistry methods. In some embodiments, a catalytic washcoat may comprise NNm particles, hybrid NNm/wet-chemistry particles, and NNiM particles. In some embodiments, a catalytic washcoat may comprise NNm particles, NNiM particles, hybrid NNm/wet-chemistry particles, and catalytic particles prepared by only wet-chemistry methods.

Preferred catalytically active materials comprise platinum group metals (PGMs). Platinum group metals are the metals platinum, palladium, rhodium, ruthenium, osmium, and iridium. In some embodiments, a single metal type may be used as catalysts in a particular catalytic washcoat (such as only palladium or only platinum), and in some embodiments, various combinations of PGMs may be used. For example, in some embodiments, a catalytic washcoat may comprise a mixture of platinum and palladium. In some embodiments, a catalytic washcoat may comprise a mixture of platinum and palladium at any ratio, or any range of ratios, such as about 1:2 to about 100:1 Pt/Pd (weight/weight), 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight). In some embodiments, such ratios of differing PGMs may arise from two or more different catalytically active materials, such as catalytically active materials comprising different types of PGM, or catalytically active materials comprising different ratios of different PGMs.

In some embodiments, a catalytic washcoat may comprise catalytic particles prepared by only wet-chemistry methods with a mixture of platinum and palladium at a ratio of about or any range of ratios, such as about 1:2 to about 100:1 Pt/Pd (weight/weight), 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or palladium and no platinum, or platinum and no palladium. In some embodiments, a catalytic washcoat may comprise NNm particles with a mixture of platinum and palladium at a ratio, or any range of ratios, such as about 1:2 to about 100:1 Pt/Pd (weight/weight), 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or palladium and no platinum, or platinum and no palladium. In some embodiments, a catalytic washcoat may comprise NNiM particles with a mixture of platinum and palladium at a ratio, or any range of ratios, such as about 1:2 to about 100:1 Pt/Pd (weight/weight), 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or palladium and no platinum, or platinum and no palladium. In some embodiments, a catalytic washcoat may comprise hybrid NNm/wet-chemistry particles with a mixture of platinum and palladium at a ratio, or any range of ratios, such as about 1:2 to about 100:1 Pt/Pd (weight/weight), 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or palladium and no platinum, or platinum and no palladium. In some embodiments, a catalytic washcoat can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium. In some embodiments where a catalytic washcoat can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium, the platinum:palladium catalyst can comprise composite nanoparticles comprising a Pt:Pd alloy nanoparticle on a nanoparticle support, where the composite nanoparticles are bonded to a micron-sized carrier particle; and the catalyst comprising palladium can comprise palladium deposited on a micron-sized particle by wet-chemistry methods.

In some embodiments, a catalytic washcoat may comprise a mixture of different types of catalytically active materials with different ratios of different catalytic metals. In other embodiments, the different types of catalytically active materials can be placed in different washcoats. In some embodiments, a catalytic washcoat may comprise catalytically active material with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, catalytically active material with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum:palladium to 8:1 platinum:palladium.

In some embodiments, a catalytic washcoat may comprise catalytic particles prepared by only wet-chemistry methods with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, catalytic particles prepared by only wet-chemistry methods with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum: palladium of about 20:1 and another catalyst comprising palladium, such that the combined catalysts comprise a weight ratio of 1:2 platinum:palladium to 8:1 platinum: palladium.

In some embodiments, a catalytic washcoat may comprise NNm particles with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, NNm particles with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum: palladium to 8:1 platinum:palladium.

In some embodiments, a catalytic washcoat may comprise NNiM particles with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, NNiM particles with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum: palladium to 8:1 platinum:palladium.

In some embodiments, a catalytic washcoat may comprise hybrid NNm/wet-chemistry particles with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, hybrid NNm/wet-chemistry particles with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum: palladium to 8:1 platinum:palladium.

In some embodiments, a catalytic washcoat may comprise a mixture of different types of catalytically active material, for example, catalytically active material of different structures or different ratios of different catalytic metals, including but not limited to catalytically active material of different structures and different ratios of different catalytic metals. In other embodiments, the different types of catalytically active materials can be placed in different washcoats. For example, in some embodiments, a catalytic washcoat may comprise a mixture of catalytic particles prepared by only wet-chemistry methods with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, NNm particles with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum: palladium to 8:1 platinum:palladium.

In some embodiments, a catalytic washcoat may comprise a mixture of catalytic particles prepared by only wet-chemistry methods with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, NNiM particles with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum:palladium to 8:1 platinum:palladium.

In some embodiments, a catalytic washcoat may comprise a mixture of NNm particles with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, catalytic particles prepared by only wet-chemistry methods with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum: palladium to 8:1 platinum:palladium.

In some embodiments, a catalytic washcoat may comprise a mixture of NNm particles with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, NNiM particles with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum:palladium to 8:1 platinum:palladium.

In some embodiments, a catalytic washcoat may comprise a mixture of NNiM particles with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, catalytic particles prepared by only wet-chemistry methods with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum:palladium to 8:1 platinum:palladium.

In some embodiments, a catalytic washcoat may comprise a mixture of NNiM particles with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, NNm particles with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum:palladium to 8:1 platinum:palladium.

In some embodiments, a catalytic washcoat may comprise a mixture of hybrid NNm/wet-chemistry catalytic particles with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, NNm particles with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum:palladium to 8:1 platinum:palladium.

In some embodiments, a catalytic washcoat may comprise a mixture of hybrid NNm/wet-chemistry catalytic particles with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, NNiM particles with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum:palladium to 8:1 platinum:palladium.

In some embodiments, a catalytic washcoat may comprise a mixture of NNm particles with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, hybrid NNm/wet-chemistry catalytic particles with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum:palladium to 8:1 platinum:palladium.

In some embodiments, a catalytic washcoat may comprise a mixture of NNiM particles with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, hybrid NNm/wet-chemistry catalytic particles with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum:palladium to 8:1 platinum:palladium.

In some embodiments, a catalytic washcoat may comprise a mixture of hybrid NNm/wet-chemistry catalytic particles with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, catalytic particles prepared by only wet-chemistry methods with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum:palladium to 8:1 platinum:palladium.

In some embodiments, a catalytic washcoat may comprise a mixture of catalytic particles prepared by only wet-chemistry methods with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and, in the same washcoat or a different washcoat, hybrid NNm/wet-chemistry catalytic particles with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or a catalyst comprising a weight ratio of platinum:palladium of about 20:1 and another catalyst comprising palladium, such that the combined catalysts comprise a weight ratio of 1:2 platinum:palladium to 8:1 platinum:palladium.

Any other combination of different types of catalytically active materials in the catalytic washcoat is contemplated by this invention.

In the following descriptions, the percentages of the components of the washcoat compositions are provided in terms of the amount of solids present in the washcoat compositions, as the washcoat compositions can be provided in an aqueous suspension or, in some instances, as dry powder.

In some embodiments, the catalytic washcoat composition further includes or "filler" particles, where the filler particles may be ceramic, metal oxide, or metallic particles. In some embodiments, the filler particles may be silica or a metal oxide (such as alumina, for example MI-386, and the like) or any mixture of silica or metal oxide particles in any proportion. In some embodiments, filler particles may comprise zeolite particles. In some embodiments, no zeolite particles or substantially no zeolite particles are present in the catalytic washcoat composition.

In some embodiments, the percentage of platinum group metal in the catalytic washcoat composition and catalytic layers ranges from between about 0.01 wt % to about 20 wt %, about 0.1 wt % to about 15 wt %, about 0.5 wt % to about 12 wt %, about 1 wt % to about 10 wt %, about 2 wt % to about 9 wt %, about 3 wt % to about 8 wt %, about 4 wt % to about 7 wt %, or about 5 wt % to about 7 wt %.

In some embodiments, the catalytic washcoat composition and catalytic layers comprise, consist essentially of, or consist of boehmite particles, filler particles, and catalytically active material (such as catalytic particles prepared by only wet-chemistry methods, NNm particles, or NNiM particles). In some embodiments, the catalytically active material makes up between about 35 wt % to about 92 wt % of the combination of the catalytically active material, the boehmite particles, and the filler particles in the catalytic washcoat composition or catalytic layer. In some embodiments, the catalytically active material makes up between about 40 wt % to about 92 wt % of the combination of the catalytically active material, the boehmite particles, and the filler particles in the catalytic washcoat composition or catalytic layer. In some embodiments, the catalytically active material makes up between about 60 wt % to about 95 wt % of the combination of the catalytically active material, the boehmite particles, and the filler particles in the catalytic washcoat composition or catalytic layer. In some embodiments, the catalytically active material makes up between about 80 wt % to about 95 wt % of the combination of the catalytically active material, the boehmite particles, and the filler particles in the catalytic washcoat composition or catalytic layer. In some embodiments, the catalytically active material makes up between about 80 wt % to about 92 wt % of the combination of the catalytically active material, the boehmite particles, and the filler particles in the catalytic washcoat composition or catalytic layer. In some embodiments, the catalytically active material makes up between about 35 wt % to about 95 wt % of the combination of the catalytically active material, the boehmite particles, and the filler particles in the catalytic washcoat composition or catalytic layer. In some embodiments, the catalytically active material makes up about 92 wt % of the combination of the catalytically active material, the boehmite particles, and the filler particles in the catalytic washcoat composition or catalytic layer. In some embodiments, the catalytically active material makes up about 95 wt % of the combination of the catalytically active material, the boehmite particles, and the filler particles in the catalytic washcoat composition or catalytic layer.

In some embodiments, the boehmite particles make up about 20 wt % or less of the combination of the catalytically active material, the boehmite particles, and the filler particles in the catalytic washcoat composition or catalytic layer. In some embodiments, the boehmite particles make up about 10 wt % or less of the combination of the catalytically active material, the boehmite particles, and the filler particles in the catalytic washcoat composition or catalytic layer. In some embodiments, the boehmite particles make up about 5 wt % or less of the combination of the catalytically active material, the boehmite particles, and the filler particles in the catalytic washcoat composition or catalytic layer. In some embodiments, the boehmite particles make up about 1 wt % or less of the combination of the catalytically active material, the boehmite particles, and the filler particles in the catalytic washcoat composition or catalytic layer. In various embodiments, the boehmite particles make up about 1 wt % to about 20 wt %, or about 1 wt % to about 10 wt %, or about 1 wt % to about 5 wt %, or about 2 wt % to about 5 wt % of the combination of the catalytically active material, the boehmite particles, and the filler particles in the catalytic washcoat composition or catalytic layer. In some embodiments, the boehmite particles make up about 1 wt % of the combination of the catalytically active material, the boehmite particles, and the filler particles in the catalytic washcoat composition or catalytic layer. In some embodiments, the boehmite particles make up about 2 wt % of the combination of the catalytically active material, the boehmite particles, and the filler particles in the catalytic washcoat composition or catalytic layer. In some embodiments, the boehmite particles make up about 3 wt % of the combination of the catalytically active material, the boehmite particles, and the filler particles in the catalytic washcoat composition or catalytic layer. In some embodiments, the boehmite particles make up about 4 wt % of the combination of the catalytically active material, the boehmite particles, and the filler particles in the catalytic washcoat composition or catalytic layer. In some embodiments, the boehmite particles make up about 5 wt % of the combination of the catalytically active material, the boehmite particles, and the filler particles in the catalytic washcoat composition or catalytic layer.

In some embodiments, the filler particles, such as alumina particles (for example, MI-386, or the like), make up about 65 wt % or less of the combination of the catalytically active material, the boehmite particles, and the filler particles in the catalytic washcoat composition or catalytic layer. In some embodiments, the filler particles, for example metal oxide particles such as alumina particles (for example, MI-386, or the like) or silica particles, make up about 65 wt % or less, about 60 wt % or less, about 55 wt % or less, about 50 wt % or less, about 45 wt % or less, about 40 wt % or less, about 35 wt % or less, about 30 wt % or less, about 25 wt % or less, about 20 wt % or less, about 15 wt % or less, about 10 wt % or less, about 8 wt % or less, about 5 wt % or less, or about 3 wt % or less, or about 2% or less of the combination of the catalytically active material, the boehmite particles, and the filler particles in the catalytic washcoat composition or catalytic layer. In some embodiments, the filler particles may make up a range of about 2% to about 65%, or about 2% to about 55%, or about 3% to about 45% or about 3% to about 35% or about 5% to about 25%. It is contemplated that the concentration ranges discussed above for the catalytically active material, the boehmite particles, and the filler particles in the catalytic washcoat composition or catalytic layer can be applied to combination differing types of filler particles.

In some embodiments, the catalytic washcoat composition is mixed with water and acid, such as acetic acid, prior to the coating of the substrate with the catalytic washcoat composition, thereby forming an aqueous mixture of the catalytic washcoat composition, water, and acid. This aqueous mixture of the catalytic washcoat composition, water, and acid is then applied to the substrate (where the substrate may or may not already have other washcoat layers applied to it). In some embodiments, the pH of this aqueous mixture is adjusted to a pH level of about 2 to about 7, or about 3 to about 5, or about 4, prior to it being applied to the substrate. In some embodiments, the viscosity of the aqueous washcoat is adjusted by mixing with a cellulose solution, with cornstarch, or with similar thickeners. In some embodiments, the viscosity is adjusted to a value between about 300 cP to about 1200 cP.

In some embodiments, the catalytic washcoat composition comprises a thickness of about 30 g/l to about 250 g/l, or of about 50 g/l to about 250 g/l, such as about 30 g/l to about 140 g/l, or about 30 g/l to about 70 g/l, or about 30 g/l to about 60 g/l, or about 40 g/l to about 70 g/l, or about 40 g/l to about 60 g/l, or about 40 g/l to about 50 g/l, or about 50 g/l to about 140 g/l, or about 70 g/l to approximately 140 g/l, or about 90 g/l to about 140 g/l, or about 110 g/l to about 130 g/l. In some embodiments, the catalytic washcoat composition comprises a thickness of about 30 g/l, of about 40 g/l, of about 50 g/l, about 60 g/l, about 70 g/l, approximately 80 g/l, about 90 g/l, about 100 g/l, about 110 g/l, about 120 g/l, approximately 130 g/l, or about 140 g/l. Preferably, the catalytic washcoat composition comprises a thickness of about 40 g/l, 50 g/l, 60 g/l, or 120 g/l.

Drying and Calcining Conditions

Once each washcoat is applied to the substrate (which may or may not have already been coated with previous substrates), excess washcoat is blown off and the residue collected and recycled. The washcoat may then be dried. Drying of the washcoats can be performed at room temperature or elevated temperature (for example, from about 30° C. to about 95° C., preferably about 60° C. to about 70° C.), at atmospheric pressure or at reduced pressure (for example, from about 1 pascal to about 90,000 pascal, or from about 7.5 mTorr to about 675 Torr), in ambient atmosphere or under an inert atmosphere (such as nitrogen or argon), and with or without passing a stream of gas over the substrate (for example, dry air, dry nitrogen gas or dry argon gas). In some embodiments, the drying process is a hot-drying process. A hot drying process includes any way to remove the solvent at a temperature greater than room temperature, but at a temperature below a standard calcining temperature. In some embodiments, the drying process may be a flash drying process, involving the rapid evaporation of moisture from the substrate via a sudden reduction in pressure or by placing the substrate in an updraft of warm air. It is contemplated that other drying processes may also be used.

After drying the washcoat onto the substrate, the washcoat may then be calcined onto the substrate. Calcining takes place at elevated temperatures, such as from 400° C. to about 700° C., preferably about 500° C. to about 600° C., more preferably at about 540° C. to about 560° C. or at about 550° C. Calcining can take place at atmospheric pressure or at reduced pressure (for example, from about 1 pascal to about 90,000 pascal, or about 7.5 mTorr to about 675 Torr), in ambient atmosphere or under an inert atmosphere (such as nitrogen or argon), and with or without passing a stream of gas over the substrate (for example, dry air, dry nitrogen gas, or dry argon gas).

Catalytic Converters and Methods of Producing Catalytic Converters

In some embodiments, the invention provides for catalytic converters, which can comprise any of the washcoat layers and washcoat configurations described herein. The catalytic converters are useful in a variety of applications, such as in diesel vehicles, such as in heavy-duty diesel vehicles.

FIG. 1 illustrates a catalytic converter in accordance with some embodiments. Catalytically active material is included in a washcoat composition, which is coated onto a substrate to form a coated substrate. The coated substrate 114 is enclosed within an insulating material 112, which in turn is enclosed within a metallic container 110 (of, for example, stainless steel). A heat shield 108 and a gas sensor (for example, an oxygen sensor) 106 are depicted. The catalytic converter may be affixed to the exhaust system of the vehicle through flanges 104 and 118. The exhaust gas, which includes the raw emissions of hydrocarbons, carbon monoxide, and nitrogen oxides, enters the catalytic converter at 102. As the raw emissions pass through the catalytic converter, they react with the catalytically active material on the coated substrate, resulting in tailpipe emissions of water, carbon dioxide, and nitrogen exiting at 120. FIG. 1A is a magnified view of a section of the coated substrate 114, which shows the honeycomb structure of the coated substrate. The coated substrates, which are discussed in further detail below, may be incorporated into a catalytic converter for use in a vehicle emissions control system.

Figure 3A:
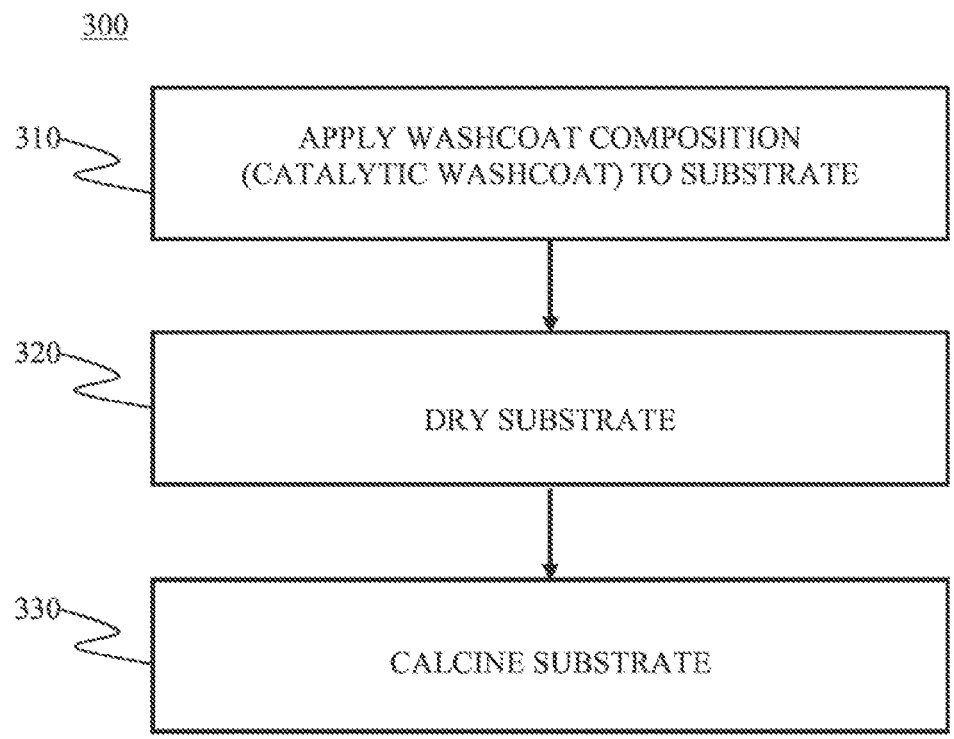
FIG. 3A illustrates one method of forming a coated substrate in accordance with some embodiments of the present invention.

FIG. 3A illustrates one method 300 of forming a coated substrate in accordance with some embodiments of the present invention. The method comprises coating a substrate with a catalytic washcoat composition, wherein the catalytic washcoat composition comprises catalytically active particles in high concentration. Preferably, a drying process and a calcining process are performed after the coating step. This configuration is designated S-C (substrate-catalytic layer).

At step 310, a washcoat composition (a catalytic washcoat composition) is applied to a substrate. Preferably, the substrate comprises, consists essentially of, or consists of cordierite and comprises a honeycomb structure. However, it is contemplated that the substrate can be formed from other materials and in other configurations as well, as discussed herein. The catalytic washcoat composition used in the S-C configuration generally comprises a mixture of two or more different types of catalytically active material, for example a first type of catalytically active material with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and a second type of catalytically active material with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or the second type of catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium. In some embodiments the first type catalytically active material or the second type of catalytically active material may be catalytic particles formed by only wet-chemistry methods, or plasma-created composite particles bonded to or embedded within micron-sized carrier particles.

At step 320, a drying process is performed on the substrate. Examples of such drying processes include, but are not limited to, a hot-drying process, or a flash drying process.

At step 330, a calcining process is performed on the substrate. It is contemplated that the length and temperature of the calcination process can vary depending on the characteristics of the components in a particular embodiment.

After the calcining process, the coated substrate includes a catalytic layer on its surface. The catalytic layer comprises catalytically active material. This method illustrates one method of producing the Substrate-Catalytic Layer (S-C) configuration without additional washcoat layers; the method can be readily modified to apply additional washcoat layers as desired, before or after any step illustrated. Preferably, a drying process and a calcining process are performed between each coating step.

Figure 3B:
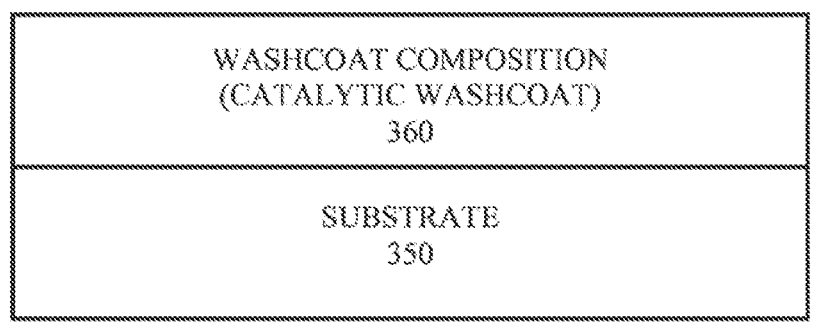
FIG. 3B illustrates one embodiment of a coated substrate according to the present invention.

FIG. 3B illustrates one embodiment of a substrate coated with a catalytic layer (S-C configuration). Preferably, the substrate 350 comprises, consists essentially of, or consists of cordierite and comprises a honeycomb structure. However, it is contemplated that the substrate can be formed from other materials and in other configurations as well, as discussed herein. The catalytic layer 360 coats the substrate 350. The catalytic layer 360 used in the S-C configuration generally comprises a mixture of two or more different types of catalytically active material, for example a first type of catalytically active material with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and a second type of catalytically active material with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or the second type of catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium. In some embodiments, the first type catalytically active material or the second type of catalytically active material may be catalytic particles formed by only wet-chemistry methods, or plasma-created composite particles bonded to or embedded within micron-sized carrier particles.

Figure 4A:
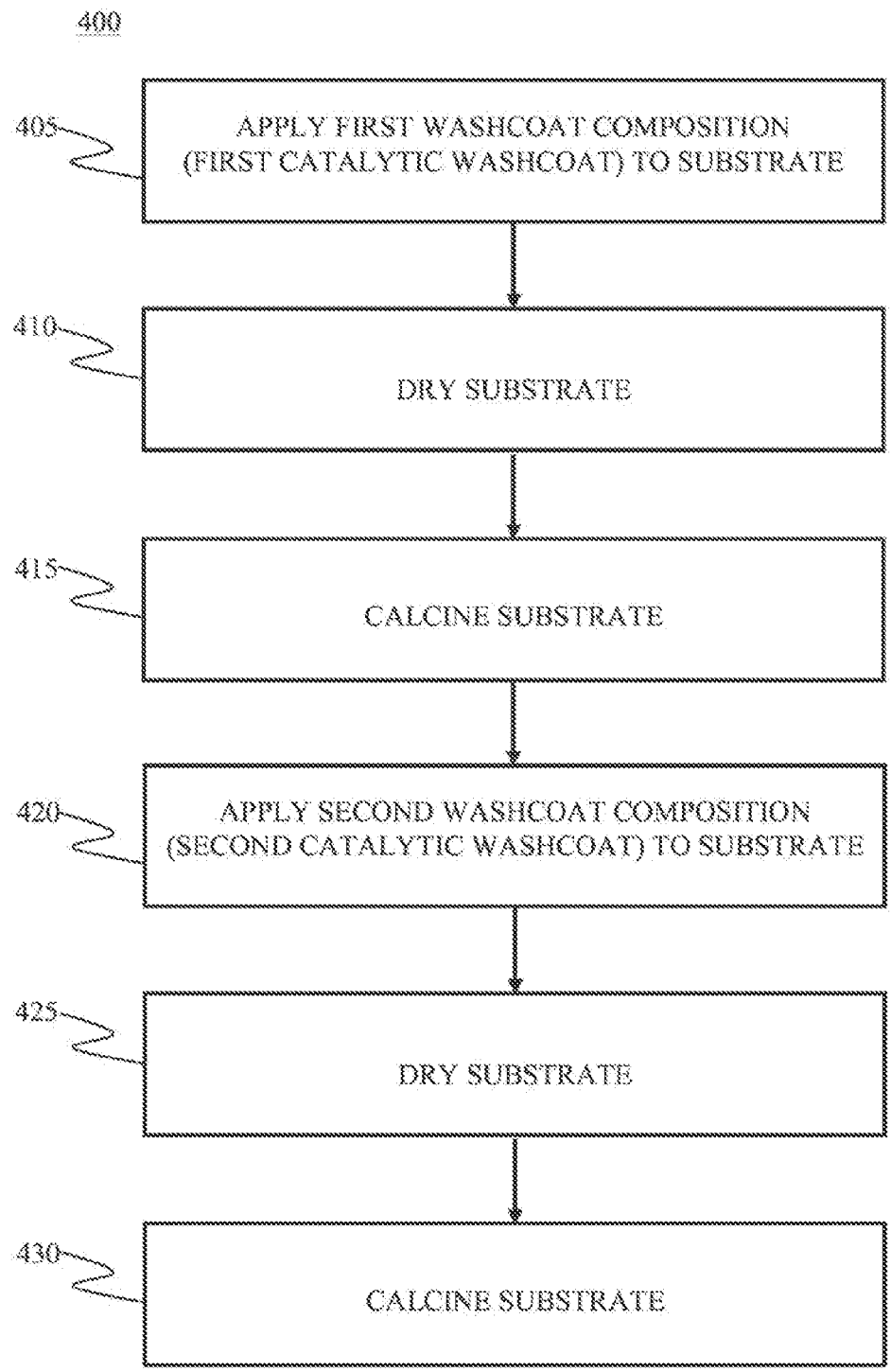
FIG. 4A illustrates one method of forming a coated substrate with more than one catalytic washcoat layer in accordance with some embodiments of the present invention.

FIG. 4A illustrates one method of forming a coated substrate in accordance with some embodiments of the present invention. The method comprises coating a substrate with a first washcoat composition, such as a first catalytic washcoat composition, to form a first washcoat composition layer, such as a first catalytic layer, and coating the substrate with a second washcoat composition, such as a second catalytic washcoat composition, to form a second washcoat composition layer, such as a second catalytic layer. This configuration is designated S-$C_1$-$C_2$ (Substrate-First Catalytic Layer-Second Catalytic Layer). In some embodiments, the first catalytic washcoat composition and the second catalytic washcoat composition may be of the same composition. In other embodiments, the first catalytic washcoat composition and second catalytic washcoat composition may be of different compositions. For example, in some embodiments, the first catalytic washcoat composition may comprise catalytically active material with a mixture of platinum and palladium at about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and the second catalytic washcoat composition may comprise catalytically active material with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or the second catalytic washcoat composition can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium. In some embodiments, the first catalytic washcoat composition may comprise catalytically active material with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or the first catalytic washcoat composition can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium, and the second catalytic washcoat composition may comprise catalytically active material with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium. Other ratios of catalytic metals in the first catalytic washcoat composition and the second catalytic washcoat composition are contemplated by this invention.

At step 405, a first washcoat composition (a first catalytic washcoat composition) is applied to a substrate to form a first catalytic layer. Preferably, the substrate comprises, consists essentially of, or consists of cordierite and comprises a honeycomb structure. However, it is contemplated that the substrate can be formed from other materials and in other configurations as well, as discussed herein.

At step 410, a first drying process is performed on the substrate. Examples of such drying processes include, but are not limited to, a hot-drying process, or a flash drying process.

At step 415, a first calcining process is performed on the substrate. It is contemplated that the length and temperature of the calcination process can vary depending on the characteristics of the components in a particular embodiment.

At step 420, a second washcoat composition (a second catalytic washcoat composition) is applied to the substrate in order to coat the first catalytic layer with a second layer.

At step 425, a second drying process is performed on the substrate. Examples of such drying processes include, but are not limited to, a hot-drying process, or a flash drying process.

At step 430, a second calcining process is performed on the substrate. It is contemplated that the length and temperature of the calcination process can vary depending on the characteristics of the components in a particular embodiment.

After the second calcining process, the coated substrate includes a first catalytic layer and a second catalytic layer on its surface. Both catalytic layers comprise catalytically active materials, but, in some embodiments, the composition of the catalytically active materials may differ between the first catalytic layer and the second catalytic layer. This method illustrates one method of producing the Substrate-First Catalytic Layer-Second Catalytic Layer (S-$C_1$-$C_2$) configuration without additional washcoat layers; the method can be readily modified to apply additional washcoat layers as desired, before or after any step illustrated. Preferably, a drying process and a calcining process are performed between each coating step.

Figure 4B:
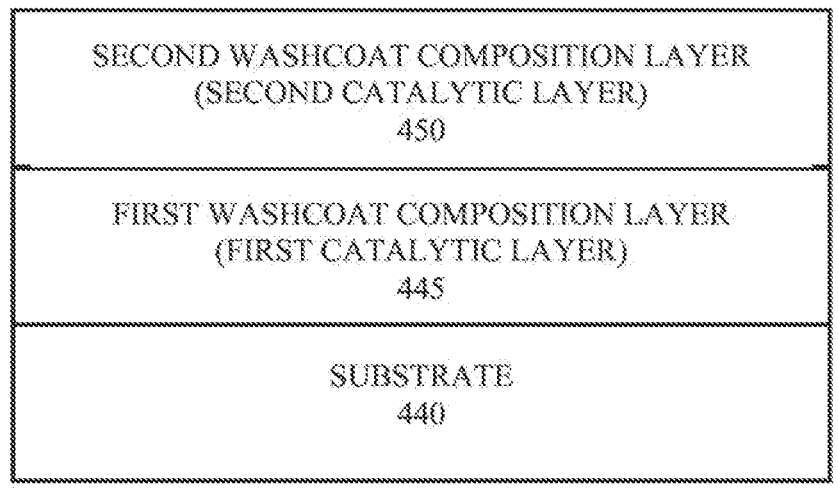
FIG. 4B illustrates one embodiment of a coated substrate with more than one catalytic washcoat layer according to the present invention.

FIG. 4B illustrates one embodiment of a substrate coated with a first catalytic layer and a second catalytic layer (S-$C_1$-$C_2$ configuration) 435. Preferably, the substrate 440 comprises, consists essentially of, or consists of cordierite and comprises a honeycomb structure. However, it is contemplated that the substrate can be formed from other materials and in other configurations as well, as discussed herein. The first catalytic layer 445 coats the substrate 440, and the second catalytic layer 450 coats the substrate 440 external to the first catalytic layer 445. In some embodiments, the first catalytic layer 445 and the second catalytic layer 450 may be of the same composition. In other embodiments, the first catalytic layer 445 and second catalytic layer 450 may be of different compositions. For example, in some embodiments, the first catalytic layer 445 may comprise catalytically active material with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and the second catalytic layer 450 may comprise catalytically active material with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or the second catalytic layer can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium. In some embodiments, the first catalytic layer 445 may comprise catalytically active material with a mixture of platinum and palladium at a ratio, or range of ratios, of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or the first catalytically active layer can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium, and the second catalytic layer 450 may comprise catalytically active material with a mixture of platinum and palladium at a ratio, or range of ratios, of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium. In some embodiments, the first catalytic layer or the second catalytic layer may comprise an additional type of catalytically active material. Other ratios of catalytic metals in the first catalytic layer and the second catalytic layer are contemplated by this invention.

Figure 5A:
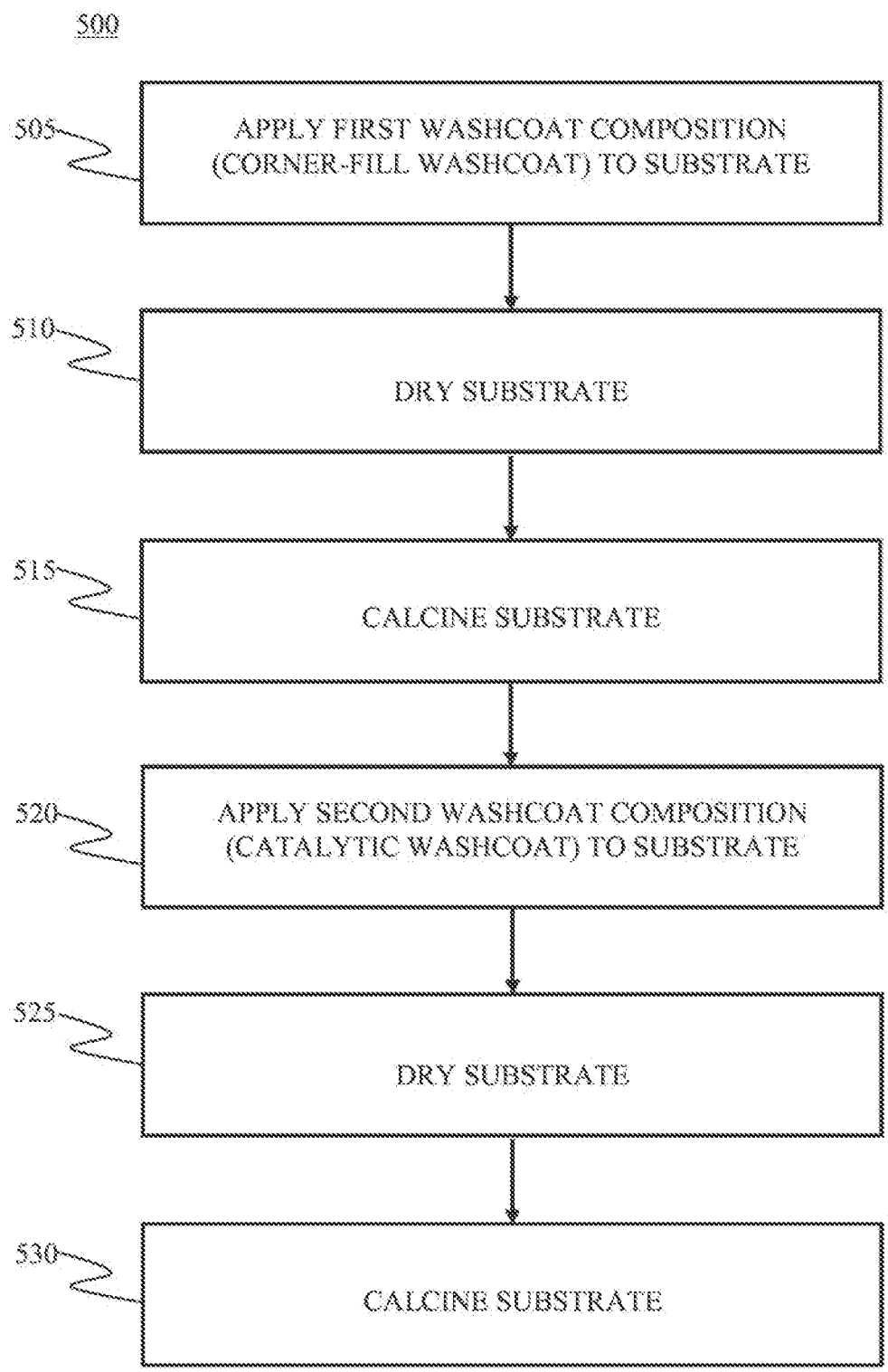
FIG. 5A illustrates one method of forming a coated substrate with a corner-fill washcoat layer and a catalytic washcoat layer in accordance with some embodiments of the present invention.

FIG. 5A illustrates one method of forming a coated substrate in accordance with some embodiments of the present invention. The method comprises coating a substrate with a first washcoat composition, such as a corner-fill washcoat composition, to form a first washcoat composition layer, such as a corner-fill layer, and coating the substrate with a second washcoat composition, such as a catalytic washcoat composition, to form a second washcoat composition layer, such as a catalytic layer. This configuration is designated S-F-C(Substrate-Corner Fill Layer-Catalytic Layer).

At step 505, a first washcoat composition (a corner-fill washcoat composition) is applied to a substrate to form a corner-fill layer. Preferably, the substrate comprises, consists essentially of, or consists of cordierite and comprises a honeycomb structure. However, it is contemplated that the substrate can be formed from other materials and in other configurations as well, as discussed herein.

At step 510, a first drying process is performed on the substrate. Examples of such drying processes include, but are not limited to, a hot-drying process, or a flash drying process.

At step 515, a first calcining process is performed on the substrate. It is contemplated that the length and temperature of the calcination process can vary depending on the characteristics of the components in a particular embodiment.

At step 520, a second washcoat composition (a catalytic washcoat composition) is applied to the substrate in order to coat the first washcoat layer, the corner-fill layer with a second washcoat layer, the catalytic layer. The catalytic washcoat composition used in the S-F-C configuration generally comprises a mixture of two or more different types of catalytically active material, for example a first type of catalytically active material with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and a second type of catalytically active material with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum or the second type of catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium.

At step 525, a second drying process is performed on the substrate. Examples of such drying processes include, but are not limited to, a hot-drying process, or a flash drying process.

At step 530, a second calcining process is performed on the substrate. It is contemplated that the length and temperature of the calcination process can vary depending on the characteristics of the components in a particular embodiment.

After the second calcining process, the coated substrate includes a corner-fill layer and a catalytic layer on its surface. Preferably, the corner fill layer comprises no catalytically active materials. The catalytic layer comprises catalytically active materials, preferably at a high concentration. This method illustrates one method of producing the Substrate-Corner-Fill Layer-Catalytic Layer (S-F-C) configuration without additional washcoat layers; the method can be readily modified to apply additional washcoat layers as desired, before or after any step illustrated. Preferably, a drying process and a calcining process are performed between each coating step.

Figure 5B:
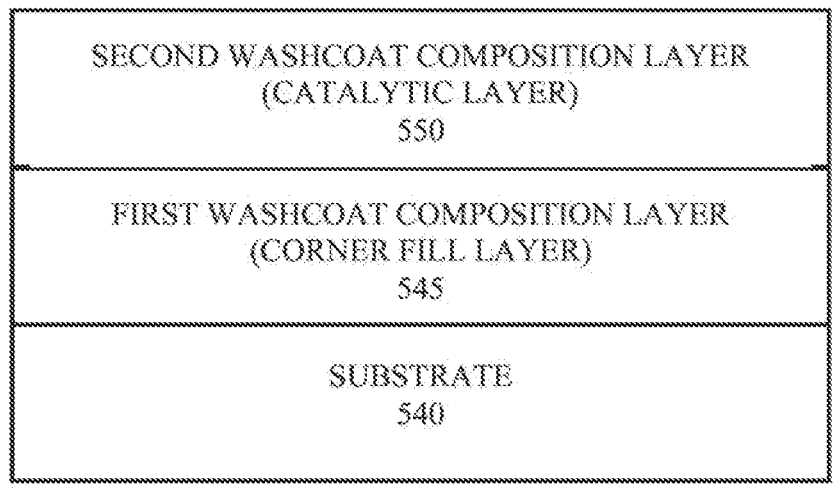
FIG. 5B illustrates one embodiment of a coated substrate with a corner-fill washcoat layer and a catalytic washcoat layer according to the present invention.

FIG. 5B illustrates one embodiment of a substrate coated with a corner-fill layer and a catalytic layer (S-F-C configuration) 535. Preferably, the substrate 540 comprises, consists essentially of, or consists of cordierite and comprises a honeycomb structure. However, it is contemplated that the substrate can be formed from other materials and in other configurations as well, as discussed herein. The corner-fill layer 545 coats the substrate 540, and the catalytic layer 550 coats the substrate 540 external to the corner-fill layer 545. The catalytic layer 550 used in the S-F-C configuration generally comprises a mixture of two or more different types of catalytically active material, for example a first type of catalytically active material with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and a second type of catalytically active material with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or the second type of catalytically active material can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium.

Figure 6A:
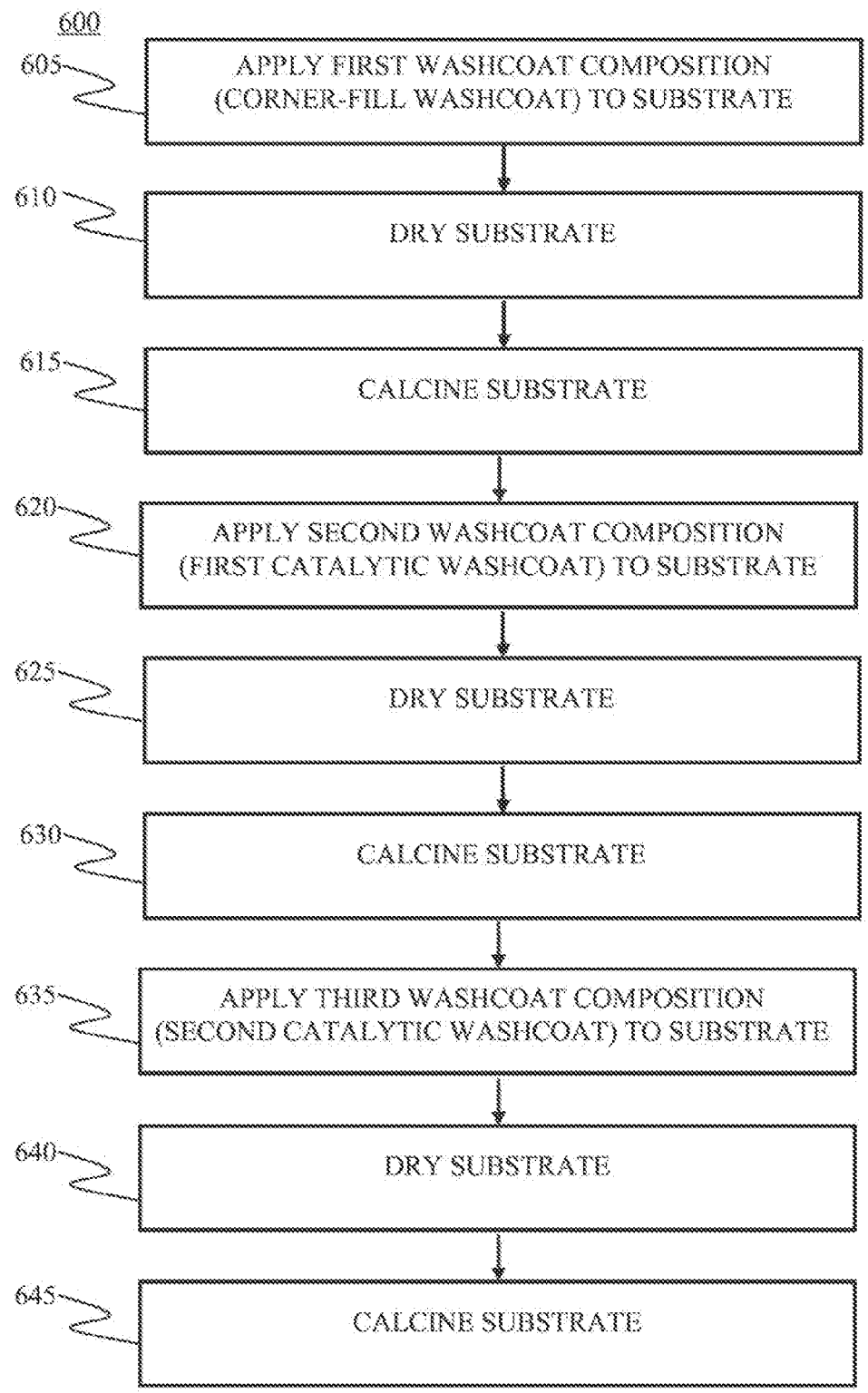
FIG. 6A illustrates one method of forming a coated substrate with a corner-fill washcoat layer and more than one catalytic washcoat layer in accordance with some embodiments of the present invention.

FIG. 6A illustrates one method of forming a coated substrate in accordance with some embodiments of the present invention. The method comprises coating a substrate with a first washcoat composition, such as a corner-fill washcoat composition, to form a first washcoat composition layer, such as a corner-fill layer, coating the substrate with a second washcoat composition, such as a first catalytic washcoat composition, to form a second washcoat composition layer, such as a first catalytic layer, and coating the substrate with a third washcoat composition, such as a second catalytic washcoat composition, to form a third washcoat composition layer, such as a second catalytic layer. This configuration is designated S-F-C$_1$-C$_2$ (Substrate-Corner Fill Layer-First Catalytic Layer-Second Catalytic Layer). In some embodiments, the first catalytic washcoat composition and the second catalytic washcoat composition may be of the same composition. In other embodiments, the first catalytic washcoat composition and second catalytic washcoat composition may be of different compositions. For example, in some embodiments, the first catalytic washcoat composition may comprise catalytically active material with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and the second catalytic washcoat composition may comprise catalytically active material with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or the second washcoat composition can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium. In some embodiments, the first catalytic washcoat composition may comprise catalytically active material with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or the first catalytic washcoat composition can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium, and the second catalytic washcoat composition may comprise catalytically active material with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium. Other ratios of catalytic metals in the first catalytic washcoat composition and the second catalytic washcoat composition are contemplated by this invention.

At step 605, a first washcoat composition (a corner-fill washcoat composition) is applied to a substrate to form a corner-fill layer. Preferably, the substrate comprises, consists essentially of, or consists of cordierite and comprises a honeycomb structure. However, it is contemplated that the substrate can be formed from other materials and in other configurations as well, as discussed herein.

At step 610, a first drying process is performed on the substrate. Examples of such drying processes include, but are not limited to, a hot-drying process, or a flash drying process.

At step 615, a first calcining process is performed on the substrate. It is contemplated that the length and temperature of the calcination process can vary depending on the characteristics of the components in a particular embodiment.

At step 620, a second washcoat composition (a first catalytic washcoat composition) is applied to the substrate in order to coat the first washcoat layer, the corner-fill layer with a second washcoat layer, the first catalytic layer.

At step 625, a second drying process is performed on the substrate. Examples of such drying processes include, but are not limited to, a hot-drying process, or a flash drying process.

At step 630, a second calcining process is performed on the substrate. It is contemplated that the length and temperature of the calcination process can vary depending on the characteristics of the components in a particular embodiment.

At step 635, a third washcoat composition (a second catalytic washcoat composition) is applied to the substrate in order to coat the second washcoat layer, the first catalytic layer, with a third washcoat layer, the second catalytic layer.

At step 640, a third drying process is performed on the substrate. Examples of such drying processes include, but are not limited to, a hot-drying process, or a flash drying process.

At step 645, a third calcining process is performed on the substrate. It is contemplated that the length and temperature of the calcination process can vary depending on the characteristics of the components in a particular embodiment.

After the third calcining process, the coated substrate includes a corner-fill layer, a first catalytic layer, and a second catalytic layer on its surface. Both catalytic layers comprise catalytically active materials, but, in some embodiments, the composition of the catalytically active materials may differ between the first catalytic layer and the second catalytic layer. This method illustrates one method of producing the Substrate-Corner-Fill Layer-First Catalytic Layer-Second Catalytic Layer (S-F-$C_1$-$C_2$) configuration without additional washcoat layers; the method can be readily modified to apply additional washcoat layers as desired, before or after any step illustrated. Preferably, a drying process and a calcining process are performed between each coating step.

Figure 6B:
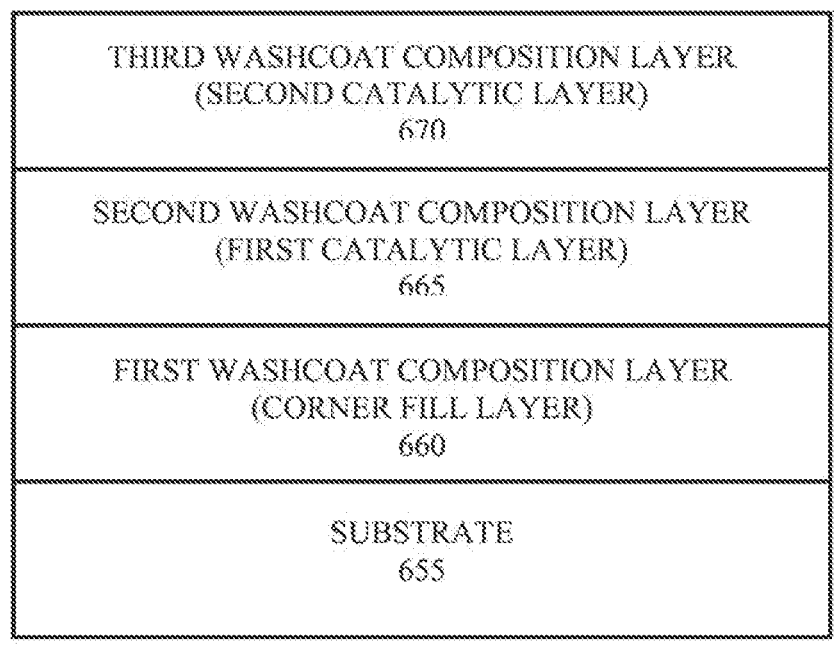
FIG. 6B illustrates one embodiment of a coated substrate with a corner-fill washcoat layer and more than one catalytic washcoat layer in accordance with the present invention.

FIG. 6B illustrates one embodiment of a substrate coated with a corner-fill layer, a first catalytic layer, and a second catalytic layer (S-F-$C_1$-$C_2$ configuration) 650. Preferably, the substrate 655 comprises, consists essentially of, or consists of cordierite and comprises a honeycomb structure. However, it is contemplated that the substrate can be formed from other materials and in other configurations as well, as discussed herein. The corner-fill layer 660 coats the substrate 650, the first catalytic layer 665 coats the substrate 655 external to the corner-fill layer 660, and the second catalytic layer 670 coats the substrate 655 external to the first catalytic layer 665. In some embodiments, the first catalytic layer 665 and the second catalytic layer 670 may be of the same composition. In other embodiments, the first catalytic layer 665 and second catalytic layer 670 may be of different compositions. For example, in some embodiments, the first catalytic layer 665 may comprise catalytically active material with a mixture of platinum and palladium at a ratio of about 10:1 to about 100:1 Pt/Pd (weight/weight), or about 10:1 to about 40:1 Pt/Pd (weight/weight), or about 10:1 to about 30:1 Pt/Pd (weight/weight), or about 15:1 to about 25:1 Pt/Pd (weight/weight), or platinum and no palladium, and the second catalytic layer 670 may comprise catalytically active material with a mixture of platinum and palladium at a ratio of about 1:2 to about 8:1 Pt/Pd (weight/weight), or about 1:1 to about 5:1 Pt/Pd (weight/weight), or about 2:1 to about 4:1 Pt/Pd (weight/weight), or about 2:1 to about 8:1 Pt/Pd (weight/weight), or palladium and no platinum, or the second catalytic layer can comprise a catalyst comprising a weight ratio of platinum:palladium of about 20:1 and another catalyst comprising palladium, such that the combined catalysts comprise a weight ratio of 1:2 platinum:palladium to 8:1 platinum:palladium. In some embodiments, the first catalytic layer 665 may comprise catalytically active material with a mixture of platinum and palladium at a ratio of 20:1 Pt/Pd (weight/weight), and the second catalytic layer 670 may comprise catalytically active material with palladium but no platinum. Other ratios of catalytic metals in the first catalytic layer and the second catalytic layer are contemplated by this invention.

Exhaust Systems, Vehicles, and Emissions Performance

In some embodiments of the invention, a coated substrate as disclosed herein is housed within a catalytic converter in a position configured to receive exhaust gas from an internal combustion engine, such as in an exhaust system of an internal combustion engine. The catalytic converter can be used with the exhaust from a diesel engine, such as a heavy-duty diesel engine. The catalytic converter can be installed on a vehicle containing a diesel engine, such as a heavy-duty diesel engine.

The coated substrate is placed into a housing, such as that shown in FIG. 1, which can in turn be placed into an exhaust system (also referred to as an exhaust treatment system) of an internal combustion engine. The internal combustion engine can be a diesel engine, such as a heavy-duty diesel engine, such as the engine of a heavy-duty diesel vehicle. The exhaust system of the internal combustion engine receives exhaust gases from the engine, typically into an exhaust manifold, and delivers the exhaust gases to an exhaust treatment system. The catalytic converter forms part of the exhaust system and is often referred to as the diesel oxidation catalyst (DOC). The exhaust system can also include a diesel particulate filter (DPF) and/or a selective catalytic reduction unit (SCR unit) and/or a lean $NO_x$ trap (LNT); typical arrangements, in the sequence that exhaust gases are received from the engine, are DOC-DPF and DOC-DPF-SCR. The exhaust system can also include other components, such as oxygen sensors, HEGO (heated exhaust gas oxygen) sensors, UEGO (universal exhaust gas oxygen) sensors, sensors for other gases, and temperature sensors. The exhaust system can also include a controller such as an engine control unit (ECU), a microprocessor, or an engine management computer, which can adjust various parameters in the vehicle (fuel flow rate, fuel/air ratio, fuel injection, engine timing, valve timing, etc.) in order to optimize the components of the exhaust gases that reach the exhaust treatment system, so as to manage the emissions released into the environment.

"Treating" an exhaust gas, such as the exhaust gas from a diesel engine, such as a heavy-duty diesel engine, refers to having the exhaust gas proceed through an exhaust system (exhaust treatment system) prior to release into the environment. As noted above, typically the exhaust gas from the engine will flow through an exhaust system comprising a diesel oxidation catalyst and a diesel particulate filter, or an exhaust system comprising a diesel oxidation catalyst, a diesel particulate filter, and selective catalytic reduction unit (SCR), prior to release into the environment.

Catalytic converters and exhaust systems described herein can be employed in heavy-duty diesel vehicles. The United States Environmental Protection Agency ("U.S. EPA") defines a "heavy-duty vehicle" as those vehicles with a gross vehicle weight rating of more 8,500 pounds, except certain passenger vehicles weighing less than 10,000 pounds. The U.S. EPA further defines a "light heavy-duty diesel engine" as an engine used in a vehicle heavier than 8,500 pounds but lighter than 19,500 pounds, with the exception of certain passenger vehicles weighing less than 10,000 pounds. The U.S. EPA further defines a "medium heavy-duty diesel engine" as an engine used in a vehicle which is 19,500 pounds or heavier but 33,000 pounds or lighter. The U.S. EPA further defines a "heavy heavy-duty diesel engine" as an engine used in a vehicle more than 33,000 pounds. In California, "light heavy-duty diesel engines" are defined as engines used in a vehicle heavier than 14,000 pounds but lighter than 19,500 for those vehicles manufactured in the year 1995 or later. In Europe, a "heavy-duty diesel engine" has been considered to be an engine used in a vehicle of more than 3.5 metric tons (more than 7,716 pounds). In some embodiments of the invention, a heavy-duty diesel vehicle is a diesel vehicle with a weight of more than about 7,700 pounds, or more than about 8,500 pounds, or more than about 10,000 pounds, or more than about 14,000 pounds, or more than about 19,500 pounds, or more than about 33,000 pounds, and a heavy-duty diesel engine is an engine used in a heavy-duty diesel vehicle.

When used in a catalytic converter, the coated substrates disclosed herein may provide a significant improvement over other catalytic converters used with heavy-duty vehicles. Different ratios of mixed platinum group metals can separately affect the catalytic efficiency of HC, CO, and $NO_x$ emissions. For example, in some embodiments, catalytically active materials with a mixture of platinum and palladium at a ratio of 20:1 Pt/Pd (weight/weight) are more efficient at catalyzing $NO_x$ emissions and less efficient at catalyzing HC emissions when compared to catalytically active materials with a mixture of platinum and palladium at a ratio of 5:1 Pt/Pd (weight/weight) for an equivalent amount of total PGM used. At the elevated average running temperatures of catalytic converters in heavy-duty vehicles, it is important to efficiently catalyze $NO_x$ emissions without losing efficient catalysis of HC and CO emissions. The catalyst combinations and washcoat architectures disclosed herein provide for both effective catalysis of $NO_x$ emissions and efficient catalysis of HC and CO emissions. The coated substrates disclosed herein are well-suited for use in combination with a downstream Selective Catalytic Reduction (SCR) unit. The SCR catalytic process reduces noxious nitrogen oxides ($NO_x$) to harmless nitrogen gas ($N_2$). Optimum SCR performance occurs when the ratio of NO to $NO_2$ (that is, the ratio of nitric oxide to nitrogen dioxide) entering the unit is 1:1. By oxidizing some of the NO to $NO_2$ upstream of the SCR unit, the coated substrates disclosed herein adjust the ratio of $NO:NO_2$ closer to that optimum 1:1 ratio, and thus improve the overall performance of the emission control system in reducing emissions of nitrogen oxides.

The Euro 5 emissions standards for heavy-duty vehicle emissions, in force as of October 2008, specify a limit of 1500 mg/kWh of CO emissions, 460 mg/kWh of HC emissions, and 2000 mg/kWh of $NO_x$ emissions (Directive 2005/55/EC). The Euro 6 emissions standards for heavy-duty vehicle emissions, scheduled for implementation in December 2013, specify a limit of 1500 mg/kWh of CO emissions, 130 mg/kWh of HC emissions, and 400 mg/kWh of $NO_x$ emissions (Regulation 595/2009/EC). The disclosed catalytic converter substrates can be used in an emission system to meet or exceed these standards. In some embodiments, the coated substrate is used in a catalytic converter (diesel oxidation catalyst) in the configuration DOC-DPF or DOC-DPF-SCR to meet or exceed these standards.

The U.S. EPA emissions standards for "heavy-duty highway compression-ignition engines and urban buses" for those vehicle manufactured after 2010 are summarized at http://www.epa.gov/otaq/standards/heavy-duty/hdci-exhaust.htm and specify a limit of 15.5 g/bhp-hr of CO emissions, 140 mg/bhp-hr of non-methane hydrocarbons (NMHC) emissions, and 200 mg/bhp-hr $NO_x$ emissions for the EPA Transient Test Procedure and the Supplemental Emission Test. The U.S. EPA emissions standards for "heavy-duty highway compression-ignition engines and urban buses" for those vehicle manufactured after 2010 have a limit of 15.5 g/bhp-hr of CO emissions, 210 mg/bhp-hr of non-methane hydrocarbons (NMHC) emissions, and 300 mg/bhp-hr NOx emissions for the Not to Exceed Test method.

The U.S. EPA emissions standards for "heavy-duty highway engine—clean fuel fleet exhaust emission standards" are summarized at http://www.epa.gov/otaq/standards/heavy-duty/hd-cff.htm and specify an additional limit of 14.4 g/bhp-hr of CO emissions for heavy-duty diesel engine Inherently Low Emissions Vehicles ("ILEVs") and 7.2 g/bhp-hr of CO emissions for heavy-duty diesel engine Ultra Low Emissions Vehicles ("ULEVs").

The U.S. EPA considers the "useful life" of an engine to be the earlier of 10 years or 110,000 miles for a light heavy-duty diesel engine, 185,000 miles for a medium heavy-duty diesel engine, and 435,000 miles (or 22,000 hours running time) for a heavy heavy-duty diesel engine manufactured after 2004.

In some embodiments, a catalytic converter made with a coated substrate of the invention employed on a diesel engine or diesel vehicle, such as a heavy-duty diesel engine or heavy-duty diesel vehicle, complies with the Euro 5 requirements for CO, HC, and $NO_x$ emissions. In some embodiments a catalytic converter made with a coated substrate of the invention employed on a diesel engine or diesel vehicle, such as a heavy-duty diesel engine or heavy-duty diesel vehicle, emits less than 1500 mg/kWh of CO emissions, less than 460 mg/kWh of HC emissions, and less than 2000 mg/kWh $NO_x$ emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation In some embodiments, a catalytic converter made with a coated substrate of the invention employed on a diesel engine or diesel vehicle, such as a heavy-duty diesel engine or heavy-duty diesel vehicle, complies with Euro 5 requirements, while using at least about 30% less, up to about 30% less, at least about 40% less, up to about 40% less, at least about 50% less, or up to about 50% less, platinum group metal or platinum group metal loading, as compared to a catalytic converter made using a single type of catalytically active material and complies with Euro 5 requirements. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation (for both the catalytic converter made with a coated substrate of the invention and the reference catalytic converter).

In some embodiments, a catalytic converter made with a coated substrate of the invention employed on a diesel engine or diesel vehicle, such as a heavy-duty diesel engine or heavy-duty diesel vehicle, complies with the Euro 6 requirements for CO, HC, and $NO_x$ emissions. In some embodiments a catalytic converter made with a coated substrate of the invention employed on a diesel engine or diesel vehicle, such as a heavy-duty diesel engine or heavy-duty diesel vehicle, emits less than 1500 mg/kWh of CO emissions, less than 130 mg/kWh of HC emissions, and less than 400 mg/kWh $NO_x$ emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation.

In some embodiments, a catalytic converter made with a coated substrate of the invention employed on a diesel engine or diesel vehicle, such as a heavy-duty diesel engine or heavy-duty diesel vehicle, complies with Euro 6 requirements, while using at least about 30% less, up to about 30% less, at least about 40% less, up to about 40% less, at least about 50% less, or up to about 50% less, platinum group metal or platinum group metal loading, as compared to a catalytic converter made using a single type of catalytically active material and complies with Euro 6 requirements. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation (for both the catalytic converter made with a coated substrate of the invention and the reference catalytic converter).

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), complies with the U.S. EPA "heavy-duty highway compression-ignition engines and urban buses" emissions standards for CO, HC, and $NO_x$ emissions. In some embodiments a catalytic converter made with a coated substrate of the invention employed on a diesel engine or diesel vehicle, such as a heavy-duty diesel engine or heavy-duty diesel vehicle, emits less than 15.5 g/bhp-hr of CO emissions, 140 mg/bhp-hr of non-methane hydrocarbons (NMHC) emissions, and 200 mg/bhp-hr of $NO_x$ emissions. In some embodiments, the emissions requirements are full "useful life" requirements. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation.

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), complies with U.S. EPA "heavy-duty highway compression-ignition engines and urban buses" emissions standards while using at least about 30% less, up to about 30% less, at least about 40% less, up to about 40% less, at least about 50% less, or up to about 50% less, platinum group metal or platinum group metal loading, as compared to a catalytic converter made using a single type of catalytically active material and complies with U.S. EPA "heavy-duty highway compression-ignition engines and urban buses" emissions standards. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation (for both the catalytic converter made with a coated substrate of the invention and the reference catalytic converter).

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), complies with the U.S. EPA "heavy-duty highway engine-clean fuel fleet exhaust emission standards" ILEV emissions standards for CO, HC, and $NO_x$ emissions. In some embodiments a catalytic converter made with a coated substrate of the invention employed on a diesel engine or diesel vehicle, such as a heavy-duty diesel engine or heavy-duty diesel vehicle, emits less than 14.4 g/bhp-hr of CO emissions, 140 mg/bhp-hr of non-methane hydrocarbons (NMHC) emissions, and 200 mg/bhp-hr of $NO_x$ emissions. In some embodiments, the emissions requirements are full "useful life" requirements. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation.

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), complies with U.S. EPA "heavy-duty highway engine—clean fuel fleet exhaust emission standards" ILEV emissions standards while using at least about 30% less, up to about 30% less, at least about 40% less, up to about 40% less, at least about 50% less, or up to about 50% less, platinum group metal or platinum group metal loading, as compared to a catalytic converter made using a single type of catalytically active material and complies with U.S. EPA "heavy-duty highway compression-ignition engines and urban buses" emissions standards. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation (for both the catalytic converter made with a coated substrate of the invention and the reference catalytic converter).

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), complies with the U.S. EPA "heavy-duty highway engine—clean fuel fleet exhaust emission standards" ULEV emissions standards for CO, HC, and $NO_x$ emissions. In some embodiments a catalytic converter made with a coated substrate of the invention employed on a diesel engine or diesel vehicle, such as a heavy-duty diesel engine or heavy-duty diesel vehicle, emits less than 7.2 g/bhp-hr of CO emissions, 140 mg/bhp-hr of non-methane hydrocarbons (NMHC) emissions, and 200 mg/bhp-hr of $NO_x$ emissions. In some embodiments, the emissions requirements are full "useful life" requirements. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation.

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), complies with U.S. EPA "heavy-duty highway engine-clean fuel fleet exhaust emission standards" ULEV emissions standards while using at least about 30% less, up to about 30% less, at least about 40% less, up to about 40% less, at least about 50% less, or up to about 50% less, platinum group metal or platinum group metal loading, as compared to a catalytic converter made using a single type of catalytically active material and complies with U.S. EPA "heavy-duty highway compression-ignition engines and urban buses" emissions standards. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation (for both the catalytic converter made with a coated substrate of the invention and the comparative catalytic converter).

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), displays $NO_x$ emissions of 4000 mg/bhp-hr or less, 2400 mg/bhp-hr or less, 1200 mg/bhp-hr or less, 400 mg/bhp-hr or less, 200 mg/bhp-hr or less, 150 mg/bhp-hr or less, or 100 mg/bhp-hr or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation.

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), displays $NO_x$ emissions of 4000 mg/kWh or less, 3000 mg/kWh or less, 2000 mg/kWh or less, 1000 mg/kWh or less, 400 mg/kWh or less, 300 mg/kWh or less, or 200 mg/kWh or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation.

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), displays carbon monoxide emissions of 46.5 g/bhp-hr or less, 31 g/bhp-hr or less, 15.5 g/bhp-hr or less, 14.4 g/bhp-hr or less, 7.2 g/bhp-hr or less, or 3.6 g/bhp-hr or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation.

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), displays carbon monoxide emissions of 4500 mg/kWh or less, 3000 mg/kWh or less, 1500 mg/kWh or less, 1200 mg/kWh or less, 800 mg/kWh or less, or 600 mg/kWh or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation.

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), displays carbon monoxide emissions of 46.5 g/bhp-hr (grams per brake horsepower-hour) or less, 31 g/bhp-hr or less, 15.5 g/bhp-hr or less, 14.4 g/bhp-hr or less, 7.2 g/bhp-hr or less, 3.6 g/bhp-hr or less, and $NO_x$ emissions of 4000 mg/bhp-hr or less, 2400 mg/bhp-hr or less, 1200 mg/bhp-hr, 400 mg/bhp-hr or less, 200 mg/bhp-hr or less, 150 mg/bhp-hr or less, or 100 mg/bhp-hr or less. In some embodiments, the catalytic converter made with a coated substrate of the invention demonstrates any of the foregoing performance standards about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation.

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), displays carbon monoxide emissions of 4500 mg/kWh or less, 3000 mg/kWh or less, 1500 mg/kWh or less, 1200 mg/kWh or less, 800 mg/kWh or less, or 600 mg/kWh or less, and $NO_x$ emissions of 4000 mg/kWh or less, 3000 mg/kWh or less, 2000 mg/kWh or less, 1000 mg/kWh or less, 400 mg/kWh or less, 300 mg/kWh or less, or 200 mg/kWh or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation.

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), displays non-methane hydrocarbon (NMHC) emissions of 2400 mg/bhp-hr or less, 1200 mg/bhp-hr or less, 600 mg/bhp-hr or less, 300 mg/bhp-hr or less, 140 mg/bhp-hr or less, 100 mg/bhp-hr or less, or 60 mg/bhp-hr or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation.

In some embodiments, a catalytic converter made with a coated substrate of the invention employed on a diesel engine or diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), such as a heavy-duty diesel engine or heavy-duty diesel vehicle, displays hydrocarbon (HC) emissions of 2000 mg/kWh or less, 1000 mg/kWh or less, 920 mg/kWh or less, 460 mg/kWh or less, 250 mg/kWh or less, 130 mg/kWh or less, or 60 mg/kWh or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation.

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), displays non-methane hydrocarbon (NMHC) emissions of 2400 mg/bhp-hr or less, 1200 mg/bhp-hr or less, 600 mg/bhp-hr or less, 300 mg/bhp-hr or less, 140 mg/bhp-hr or less, 100 mg/bhp-hr or less, or 60 mg/bhp-hr or less, and $NO_x$ emissions of 4000 mg/bhp-hr or less, 2400 mg/bhp-hr or less, 1200 mg/bhp-hr, 400 mg/bhp-hr or less, 200 mg/bhp-hr or less, 150 mg/bhp-hr or less, or 100 mg/bhp-hr or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation.

In some embodiments, a catalytic converter made with a coated substrate of the invention employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), displays hydrocarbon (HC) emissions of 2000 mg/kWh or less, 1000 mg/kWh or less, 920 mg/kWh or less, 460 mg/kWh or less, 250 mg/kWh or less, 130 mg/kWh or less, or 60 mg/kWh or less, and $NO_x$ emissions of 4000 mg/kWh or less, 3000 mg/kWh or less, 2000 mg/kWh or less, 1000 mg/kWh or less, 400 mg/kWh or less, 300 mg/kWh or less, or 200 mg/kWh or less. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation.

In some embodiments, a catalytic converter made with a coated substrate of the invention and employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), displays $NO_x$ emissions of 4000 mg/bhp-hr or less, 2400 mg/bhp-hr or less, 1200 mg/bhp-hr or less, 400 mg/bhp-hr or less, 200 mg/bhp-hr or less, 150 mg/bhp-hr or less, or 100 mg/bhp-hr or less, while using at least about 30% less, up to about 30% less, at least about 40% less, up to about 40% less, at least about 50% less, or up to about 50% less, platinum group metal or platinum group metal loading, as compared to a reference catalytic converter made using a single type of catalytically active material which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation (for both the catalytic converter made with a coated substrate of the invention and the reference catalytic converter).

In some embodiments, a catalytic converter made with a coated substrate of the invention and employed on a diesel engine or diesel vehicle, such as a heavy-duty diesel engine or heavy-duty diesel vehicle, displays $NO_x$ emissions of 4000 mg/kWh or less, 3000 mg/kWh or less, 1500 mg/kWh or less, 1200 mg/kWh or less, 800 mg/kWh or less, or 600 mg/kWh or less, while using at least about 30% less, up to about 30% less, at least about 40% less, up to about 40% less, at least about 50% less, or up to about 50% less, platinum group metal or platinum group metal loading, as compared to a reference catalytic converter made using a single type of catalytically active material which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation (for both the catalytic converter made with a coated substrate of the invention and the reference catalytic converter).

In some embodiments, a catalytic converter made with a coated substrate of the invention and employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), displays carbon monoxide emissions of 46.5 g/bhp-hr or less, 31 g/bhp-hr or less, 15.5 g/bhp-hr or less, 14.4 g/bhp-hr or less, 7.2 g/bhp-hr or less, or 3.6 g/bhp-hr or less, while using at least about 30% less, up to about 30% less, at least about 40% less, up to about 40% less, at least about 50% less, or up to about 50% less, platinum group metal or platinum group metal loading, as compared to a catalytic converter made with w using a single type of catalytically active material which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation (for both the catalytic converter made with a coated substrate of the invention and the reference catalytic converter).

In some embodiments, a catalytic converter made with a coated substrate of the invention and employed on a diesel engine or diesel vehicle, such as a heavy-duty diesel engine or heavy-duty diesel vehicle, displays carbon monoxide emissions of 4500 mg/kWh or less, 3000 mg/kWh or less, 1500 mg/kWh or less, 1200 mg/kWh or less, 800 mg/kWh or less, or 600 mg/kWh or less, while using at least about 30% less, up to about 30% less, at least about 40% less, up to about 40% less, at least about 50% less, or up to about 50% less, platinum group metal or platinum group metal loading, as compared to a reference catalytic converter made using a single type of catalytically active material which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation (for both the catalytic converter made with a coated substrate of the invention and the reference catalytic converter).

In some embodiments, a catalytic converter made with a coated substrate of the invention and employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), displays carbon monoxide emissions of 46.5 g/bhp-hr or less, 31 g/bhp-hr or less, 15.5 g/bhp-hr or less, 14.4 g/bhp-hr or less, 7.2 g/bhp-hr or less, or 3.6 g/bhp-hr or less, and $NO_x$ emissions of 4000 mg/bhp-hr or less, 2400 mg/bhp-hr or less, 1200 mg/bhp-hr, 400 mg/bhp-hr or less, 200 mg/bhp-hr or less, 150 mg/bhp-hr or less, or 100 mg/bhp-hr or less, while using at least about 30% less, up to about 30% less, at least about 40% less, up to about 40% less, at least about 50% less, or up to about 50% less, platinum group metal or platinum group metal loading, as compared to a catalytic converter made with w using a single type of catalytically active material which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation (for both the catalytic converter made with a coated substrate of the invention and the comparative catalytic converter).

In some embodiments, a catalytic converter made with a coated substrate of the invention and employed on a diesel engine or diesel vehicle, such as a heavy-duty diesel engine or heavy-duty diesel vehicle, displays carbon monoxide emissions of 4500 mg/kWh or less, 3000 mg/kWh or less, 1500 mg/kWh or less, 1200 mg/kWh or less, 800 mg/kWh or less, or 600 mg/kWh or less, and $NO_x$ emissions of 4000 mg/kWh or less, 3000 mg/kWh or less, 2000 mg/kWh or less, 1000 mg/kWh or less, 400 mg/kWh or less, 300 mg/kWh or less, or 200 mg/kWh or less, while using at least about 30% less, up to about 30% less, at least about 40% less, up to about 40% less, at least about 50% less, or up to about 50% less, platinum group metal or platinum group metal loading, as compared to a catalytic converter made using a single type of catalytically active material which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation for both the catalytic converter made with a coated substrate of the invention and the comparative catalytic converter).

In some embodiments, a catalytic converter made with a coated substrate of the invention and employed on a diesel engine or diesel vehicle, such as a heavy-duty diesel engine or heavy-duty diesel vehicle (for example, a light heavy-duty diesel engine or light heavy-duty diesel vehicle, or a medium heavy-duty diesel engine or medium heavy-duty diesel vehicle, or a heavy heavy-duty diesel engine or heavy heavy-duty diesel vehicle), displays non-methane hydrocarbon (NMHC) emissions of 2400 mg/bhp-hr or less, 1200 mg/bhp-hr or less, 600 mg/bhp-hr or less, 300 mg/bhp-hr or less, 140 mg/bhp-hr or less, 100 mg/bhp-hr or less, or 60 mg/bhp-hr or less, and $NO_x$ emissions of 4000 mg/bhp-hr or less, 2400 mg/bhp-hr or less, 1200 mg/bhp-hr, 400 mg/bhp-hr or less, 200 mg/bhp-hr or less, 150 mg/bhp-hr or less, or 100 mg/bhp-hr or less, while using at least about 30% less, up to about 30% less, at least about 40% less, up to about 40% less, at least about 50% less, or up to about 50% less, platinum group metal or platinum group metal loading, as compared to a reference catalytic converter made using a single type of catalytically active material which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation (for both the catalytic converter made with a coated substrate of the invention and the reference catalytic converter).

In some embodiments, a catalytic converter made with a coated substrate of the invention and employed on a diesel engine or diesel vehicle, such as a heavy-duty diesel engine or heavy-duty diesel vehicle, displays hydrocarbon (HC) emissions of 2000 mg/kWh or less, 1000 mg/kWh or less, 920 mg/kWh or less, 460 mg/kWh or less, 250 mg/kWh or less, 130 mg/kWh or less, or 60 mg/kWh or less, while using at least about 30% less, up to about 30% less, at least about 40% less, up to about 40% less, at least about 50% less, or up to about 50% less, platinum group metal or platinum group metal loading, as compared to a reference catalytic converter made using a single type of catalytically active material which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation (for both the catalytic converter made with a coated substrate of the invention and the reference catalytic converter).

In some embodiments, a catalytic converter made with a coated substrate of the invention and employed on a diesel engine or diesel vehicle, such as a heavy-duty diesel engine or heavy-duty diesel vehicle, displays hydrocarbon (HC) emissions of 2000 mg/kWh or less, 1000 mg/kWh or less, 920 mg/kWh or less, 460 mg/kWh or less, 250 mg/kWh or less, 130 mg/kWh or less, or 60 mg/kWh or less, and $NO_x$ emissions of 4000 mg/kWh or less, 3000 mg/kWh or less, 2000 mg/kWh or less, 1000 mg/kWh or less, 400 mg/kWh or less, 300 mg/kWh or less, or 200 mg/kWh or less, while using at least about 30% less, up to about 30% less, at least about 40% less, up to about 40% less, at least about 50% less, or up to about 50% less, platinum group metal or platinum group metal loading, as compared to a catalytic converter made using a single type of catalytically active material which displays the same or similar emissions. In some embodiments, the coated substrate is used in a catalytic converter (diesel oxidation catalyst) in the configuration DOC-DPF or DOC-DPF-SCR to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 110,00 km, about 110,000 miles, about 125,000 km, about 125,000 miles, about 150,000 km, about 150,000 miles, about 185,000 km, about 185,000 miles, about 200,000 km, about 200,000 miles, about 300,000 km, about 300,000 miles, about 400,000 km, about 400,000 miles, about 435,000 km, or about 435,000 miles of operation (for both the catalytic converter made with a coated substrate of the invention and the comparative catalytic converter).

In some embodiments, for the above-described comparisons, the thrifting (reduction) of platinum group metal for the catalytic converters made with substrates of the invention is compared with either 1) a commercially available catalytic converter, made using a single type of catalytically active material, for the application disclosed (e.g., for use on a diesel engine or vehicle, such as a heavy-duty diesel engine or heavy-duty diesel vehicle), or 2) a catalytic converter made using a single type of catalytically active material, which uses the minimal amount of platinum group metal to achieve the performance standard indicated.

In some embodiments, for the above-described comparisons, both the coated substrate according to the invention, and the catalyst used in the commercially available catalytic converter or the catalyst prepared using a single type of catalytically active material, are aged (by the same amount) prior to testing. In some embodiments, both the coated substrate according to the invention, and the catalyst substrate used in the commercially available catalytic converter or the catalyst substrate prepared using a single type of catalytically active material, are aged to about (or up to about) 50,000 km, about (or up to about) 50,000 miles, about (or up to about) 75,000 km, about (or up to about) 75,000 miles, about (or up to about) 100,000 km, about (or up to about) 100,000 miles, about (or up to about) 110,00 km, about (or up to about) 110,000 miles, about (or up to about) 125,000 km, about (or up to about) 125,000 miles, about (or up to about) 150,000 km, about (or up to about) 150,000 miles, about (or up to about) 185,000 km, about (or up to about) 185,000 miles, about (or up to about) 200,000 km, about (or up to about) 200,000 miles, about (or up to about) 300,000 km, about (or up to about) 300,000 miles, about (or up to about) 400,000 km, about (or up to about) 400,000 miles, about (or up to about) 435,000 km, or about (or up to about) 435,000 miles of operation. In some embodiments, for the above-described comparisons, both the coated substrate according to the invention, and the catalyst substrate used in the commercially available catalytic converter or the catalyst substrate prepared using a single type of catalytically active material, are artificially aged (by the same amount) prior to testing. In some embodiments, they are artificially aged by heating to anywhere from about 200° C. to about 1200° C., for example about 400° C., about 500° C., about 600° C., about 700°, about 800° C., about 900° C., about 1000° C., about 1100° C., or about 1200° C. for anywhere from about (or up to about) 1 hour to about (our up to about 1000 hours, for example about (or up to about) 4 hours, about (or up to about) 6 hours, about (or up to about) 8 hours, about (or up to about) 10 hours, about (or up to about) 12 hours, about (or up to about) 14 hours, about (or up to about) 16 hours, about (or up to about) 18 hours, about (or up to about) 20 hours, about (or up to about) 22 hours, about (or up to about) 24 hours, about (or up to about) 50 hours, (about or up to about) 100 hours, about (or up to about) 500 hours, or about (or up to about) 1000 hours. In some embodiments, they can be artificially aged under any atmosphere, for example 0% to 80% oxygen, 0-80% nitrogen, and 0-80% moisture content. In some embodiments, they are artificially aged by heating to about 700° C. for about 16 hours under an atmosphere comprising about 20% oxygen, 75% nitrogen, and about 5% moisture.

In some embodiments, for the above-described catalytic converters employing the coated substrates of the invention, for the exhaust treatment systems using catalytic converters employing the coated substrates of the invention, and for vehicles employing these catalytic converters and exhaust treatment systems, the catalytic converter is employed as a diesel oxidation catalyst along with a diesel particulate filter, or the catalytic converter is employed as a diesel oxidation catalyst along with a diesel particulate filter and a selective catalytic reduction unit, to meet or exceed the standards for CO and/or $NO_x$, and/or HC described above.

Exemplary Embodiments

The invention is further described by the following embodiments. The features of each of the embodiments are combinable with any of the other embodiments where appropriate and practical.

Embodiment 1. A coated substrate that is free of zeolites comprising: a substrate; and a washcoat layer comprising: boehmite particles; a first catalytically active material comprising platinum and palladium in a weight ratio of 10:1 platinum:palladium to 100:1 platinum:palladium, or platinum and no palladium, wherein the first catalytically active material comprises plasma-created composite nanoparticles bonded to or embedded within micron-sized carrier particles, the composite nanoparticles comprising a support nanoparticle and a catalytic nanoparticle; and a second catalytically active material comprising platinum and palladium in a weight ratio of 1:2 platinum:palladium to 8:1 platinum:palladium, or palladium and no platinum.

Embodiment 2. The coated substrate of embodiment 1 wherein the second catalytically active material is catalytic particles produced by wet-chemistry methods or plasma-created composite nanoparticles bonded to or embedded within micron-sized carrier particles, the composite nanoparticles comprising a support nanoparticle and a catalytic nanoparticle.

Embodiment 3. The coated substrate of embodiments 1 or 2 wherein the second catalytically active material is catalytic particles produced by wet-chemistry methods.

Embodiment 4. The coated substrate of embodiment 1 or wherein the second catalytically active material is plasma-created composite nanoparticles bonded to or embedded within micron-sized carrier particles, the composite nanoparticles comprising a support nanoparticle and a catalytic nanoparticle.

Embodiment 5. A coated substrate that is free of zeolites comprising: a substrate; and a washcoat layer comprising: boehmite particles; a first catalytically active material comprising platinum and palladium in a weight ratio of 10:1 platinum:palladium to 100:1 platinum:palladium, or platinum and no palladium, wherein the first catalytically active material is catalytic particles produced by wet-chemistry methods; a second catalytically active material comprising platinum and palladium in a weight ratio of 1:2 platinum: palladium to 8:1 platinum:palladium, or palladium and no platinum, wherein the second catalytically active material comprises plasma-created composite nanoparticles bonded to or embedded within micron-sized carrier particles, the composite nanoparticles comprising a support nanoparticle and a catalytic nanoparticle.

Embodiment 6. The coated substrate of any one of embodiments 1-5, wherein the the first catalytically active material comprises platinum and palladium at a platinum: palladium ratio of 15:1 to 25:1.

Embodiment 7. The coated substrate of any one of embodiments 1-5, wherein the first catalytically active material comprises platinum and no palladium.

Embodiment 8. The coated substrate of any one of embodiments 1-7, wherein the second catalytically active material comprises platinum and palladium at a platinum: palladium ratio of 1:2 to 8:1

Embodiment 9. The coated substrate of any one of embodiments 1-7, wherein the second catalytically active material comprises palladium and no platinum.

Embodiment 10. The coated substrate of any one of embodiments 1-9, wherein the washcoat layer comprises 1% to 20% boehmite particles by weight.

Embodiment 11. The coated substrate of any one of embodiments 1-10, wherein the washcoat layer comprises 1% to 10% boehmite particles by weight.

Embodiment 12. The coated substrate of any one of embodiments 1-11, wherein the washcoat layer comprises 1% to 5% boehmite particles by weight.

Embodiment 13. The coated substrate of any one of embodiments 1-12, wherein the washcoat layer comprises filler particles.

Embodiment 14. The coated substrate of embodiment 13, wherein the filler particles are alumina particles.

Embodiment 15. A catalytic converter comprising a coated substrate according to any one of embodiments 1-14.

Embodiment 16. An exhaust treatment system comprising a conduit for exhaust gas and a catalytic converter according to embodiment 15.

Embodiment 17. A heavy-duty diesel vehicle comprising the catalytic converter according to embodiment 16.

Embodiment 18. A coated substrate that is free of zeolites comprising: a substrate; a first washcoat layer comprising: boehmite particles; and a first catalytically active material comprising platinum and palladium in a weight ratio of 10:1 platinum:palladium to 100:1 platinum:palladium, or platinum and no palladium, wherein the first catalytically active material comprises plasma-created composite nanoparticles bonded to or embedded within micron-sized carrier particles, the composite nanoparticles comprising a support nanoparticle and a catalytic nanoparticle; and a second washcoat layer comprising: boehmite particles; and a second catalytically active material comprising platinum and palladium in a weight ratio of 1:2 platinum:palladium to 8:1 platinum:palladium, or palladium and no platinum, wherein the second catalytically active material comprises plasma-created composite nanoparticles bonded to or embedded within micron-sized carrier particles, the composite nanoparticles comprising a support nanoparticle and a catalytic nanoparticle.

Embodiment 19. The coated substrate of embodiment 18, wherein the first catalytically active material comprises platinum and palladium at a platinum:palladium ratio of 15:1 to 25:1.

Embodiment 20. The coated substrate of embodiment 18, wherein the first catalytically active material comprises platinum and no palladium.

Embodiment 21. The coated substrate of any one of embodiments 18-20, wherein the second catalytically active material comprises platinum and palladium at a platinum: palladium ratio of 1:2 to 8:1.

Embodiment 22. The coated substrate of any one of embodiments 18-20, wherein the second catalytically active material comprises palladium and not platinum.

Embodiment 23. The coated substrate of any one of embodiments 18-22, wherein the first washcoat layer comprises a third catalytically active material.

Embodiment 24. The coated substrate of embodiment 23, wherein the third catalytically active material is catalytic particles produced by wet-chemistry methods or plasma-created composite nanoparticles bonded to or embedded within micron-sized carrier particles, the composite nanoparticles comprising a support nanoparticle and a catalytic nanoparticle.

Embodiment 25. The coated substrate of embodiment 23 or 24, wherein the third catalytically active material is catalytic particles produced by wet-chemistry methods.

Embodiment 26. The coated substrate of embodiment 23 or 24, wherein the third catalytically active material is plasma-created composite nanoparticles bonded to or embedded within micron-sized carrier particles, the composite nanoparticles comprising a support nanoparticle and a catalytic nanoparticle.

Embodiment 27. The coated substrate of any one of embodiments 23-26, wherein the third catalytically active material comprises palladium and no platinum.

Embodiment 28. The coated substrate of any one of embodiments 23-26, wherein the third catalytically active material comprises platinum and palladium at a platinum: palladium ratio of 1:2 to 8:1.

Embodiment 29. The coated substrate of any one of embodiments 18-22, wherein the second washcoat layer comprises a third catalytically active material.

Embodiment 30. The coated substrate of embodiment 29, wherein the third catalytically active material is catalytic particles produced by wet-chemistry methods or plasma-created composite nanoparticles bonded to or embedded within micron-sized carrier particles, the composite nanoparticles comprising a support nanoparticle and a catalytic nanoparticle.

Embodiment 31. The coated substrate of embodiment 29 or 30, wherein the third catalytically active material is catalytic particles produced by wet-chemistry methods.

Embodiment 32. The coated substrate of embodiment 29 or 30, wherein the third catalytically active material is plasma-created composite nanoparticles bonded to or embedded within micron-sized carrier particles, the composite nanoparticles comprising a support nanoparticle and a catalytic nanoparticle.

Embodiment 33. The coated substrate of any one of embodiments 29-32, wherein the third catalytically active material comprises platinum and no palladium.

Embodiment 34. The coated substrate of any one of embodiments 29-32, wherein the third catalytically active material comprises platinum and palladium at a platinum: palladium ratio of 10:1 to 100:1.

Embodiment 35. The coated substrate of any one of embodiments 29-32 or 34, wherein the third catalytically active material comprises platinum and palladium at a platinum:palladium ratio of 15:1 to 25:1.

Embodiment 36. The coated substrate of any one of embodiments 18-35, wherein the washcoat layers comprise 1% to 20% boehmite particles by weight.

Embodiment 37. The coated substrate of any one of embodiments 18-36, wherein the washcoat layers comprise 1% to 10% boehmite particles by weight.

Embodiment 38. The coated substrate of any one of embodiments 18-37, wherein the washcoat layers comprise 1% to 5% boehmite particles by weight.

Embodiment 39. The coated substrate of any one of embodiments 18-38, wherein the washcoat layers or comprise filler particles.

Embodiment 40. The coated substrate of embodiment 39, wherein the filler particles are alumina particles.

Embodiment 41. The coated substrate of any one of embodiment 18-40 wherein the first washcoat layer is proximal to the substrate relative to the second washcoat layer.

Embodiment 42. The coated substrate of any one of embodiment 18-40 wherein the first washcoat layer is distal to the substrate relative to the second washcoat layer.

Embodiment 43. A catalytic converter comprising a coated substrate according to any one of embodiments 18-42.

Embodiment 44. An exhaust treatment system comprising a conduit for exhaust gas and a catalytic converter according to embodiment 43.

Embodiment 45. A heavy-duty diesel vehicle comprising the exhaust treatment system of embodiment 44.

Embodiment 46. A heavy-duty diesel vehicle comprising a coated substrate, the coated substrate comprising: a substrate; and a washcoat layer comprising: boehmite particles; a first catalytically active material comprising platinum and palladium in a weight ratio of 10:1 platinum:palladium to 100:1 platinum:palladium, or platinum and no palladium, wherein the first catalytically active material comprises plasma-created composite nanoparticles bonded to or embedded within micron-sized carrier particles, the composite nanoparticles comprising a support nanoparticle and a catalytic nanoparticle; a second catalytically active material comprising platinum and palladium in a weight ratio of 1:2 platinum:palladium to 8:1 platinum:palladium, or palladium and no platinum, wherein the coated substrate is free of zeolites.

Embodiment 47. A heavy-duty diesel vehicle comprising a coated substrate, the coated substrate comprising: a substrate; and a washcoat layer comprising: boehmite particles; a first catalytically active material comprising platinum and palladium in a weight ratio of 10:1 platinum:palladium to 100:1 platinum:palladium, or platinum and no palladium, wherein the first catalytically active material is catalytic particles produced by wet-chemistry methods; a second catalytically active material comprising platinum and palladium in a weight ratio of 1:2 platinum:palladium to 8:1 platinum:palladium or palladium and no platinum, wherein the second catalytically active material comprises plasma-created composite nanoparticles bonded to or embedded within micron-sized carrier particles, the composite nanoparticles comprising a support nanoparticle and a catalytic nanoparticle, wherein the coated substrate is free of zeolites.

Embodiment 48. A heavy-duty diesel vehicle comprising a coated substrate, the coated substrate comprising: a substrate; a first washcoat layer comprising: boehmite particles; and a first catalytically active material comprising platinum and palladium in a weight ratio of 10:1 platinum:palladium to 100:1 platinum:palladium, or platinum and no palladium, wherein the first catalytically active material comprises plasma-created composite nanoparticles bonded to or embedded within micron-sized carrier particles, the composite nanoparticles comprising a support nanoparticle and a catalytic nanoparticle; and a second washcoat layer comprising: boehmite particles; and a second catalytically active material comprising platinum and palladium in a weight ratio of 1:2 platinum:palladium to 8:1 platinum:palladium, or palladium and no platinum, wherein the second catalytically active material comprises plasma-created composite nanoparticles bonded to or embedded within micron-sized carrier particles, the composite nanoparticles comprising a support nanoparticle and a catalytic nanoparticle, wherein the coated substrate is free of zeolites.

Embodiment 49. The heavy-duty diesel vehicle of any one of embodiments 46-48, wherein the heavy-duty diesel vehicle meets the European emission standard Euro 5 for heavy-duty diesel vehicles.

Embodiment 50. The heavy-duty diesel vehicle of any one of embodiments 46-48, wherein the heavy-duty diesel vehicle meets the European emission standard Euro 6 for heavy-duty diesel vehicles.

Embodiment 51. The heavy-duty diesel vehicle of any one of embodiments 46-48, wherein the heavy-duty diesel vehicle meets the U.S. EPA standard for heavy-duty diesel vehicles.

Embodiment 52. The heavy-duty diesel vehicle of any one of embodiments 46-48 or 51, wherein the heavy-duty diesel vehicle meets the U.S. EPA Inherently Low Emissions Vehicle (ILEV) standard for heavy-duty diesel vehicles.

Embodiment 53. The heavy-duty diesel vehicle of any one of embodiments 46-48 or 51-52, wherein the heavy-duty diesel vehicle meets the U.S. EPA Ultra Low Emissions Vehicle (ULEV) standard for heavy-duty diesel vehicles.

Embodiment 54. The heavy-duty diesel vehicle of embodiment 46 wherein the second catalytically active material is catalytic particles produced by wet-chemistry methods or plasma-created composite nanoparticles bonded to or embedded within micron-sized carrier particles, the composite nanoparticles comprising a support nanoparticle and a catalytic nanoparticle.

Embodiment 55. The heavy-duty diesel vehicle of embodiment 46 or 54 wherein the second catalytically active material is catalytic particles produced by wet-chemistry methods.

Embodiment 56. The heavy-duty diesel vehicle of embodiment 46 or 54 wherein the second catalytically active material is plasma-created composite nanoparticles bonded to or embedded within micron-sized carrier particles, the composite nanoparticles comprising a support nanoparticle and a catalytic nanoparticle.

Embodiment 57. The heavy-duty diesel vehicle of any one of embodiments 46-56, wherein the first catalytically active material comprises platinum and palladium at a platinum:palladium ratio of 15:1 to 25:1.

Embodiment 58. The heavy-duty diesel vehicle of any one of embodiments 46-56, wherein the first catalytically active material comprises platinum and no palladium.

Embodiment 59. The heavy-duty diesel vehicle of any one of embodiments 46-58, wherein the second catalytically active material comprises platinum and palladium at a platinum:palladium ratio of 1:2 to 8:1

Embodiment 60. The heavy-duty diesel vehicle of any one of embodiments 46-58, wherein the second catalytically active material comprises palladium and no platinum.

Embodiment 61. The heavy-duty diesel vehicle of any embodiment 48, wherein the first washcoat layer comprises a third catalytically active material.

Embodiment 62. The heavy-duty diesel vehicle of any embodiment 61, wherein the third catalytically active material is catalytic particles produced by wet-chemistry methods or plasma-created composite nanoparticles bonded to or embedded within micron-sized carrier particles, the composite nanoparticles comprising a support nanoparticle and a catalytic nanoparticle.

Embodiment 63. The heavy-duty diesel vehicle of any embodiment 61 or 62, wherein the third catalytically active material is catalytic particles produced by wet-chemistry methods.

Embodiment 64. The heavy-duty diesel vehicle of any embodiment 61 or 62, wherein the third catalytically active material is plasma-created composite nanoparticles bonded to or embedded within micron-sized carrier particles, the composite nanoparticles comprising a support nanoparticle and a catalytic nanoparticle.

Embodiment 65. The heavy-duty diesel vehicle of any one of embodiments 61-63, wherein the third catalytically active material comprises palladium and no platinum.

Embodiment 66. The heavy-duty diesel vehicle of any one of embodiments 61-63, wherein the third catalytically active material comprises platinum and palladium at a platinum:palladium ratio of 1:2 to 8:1.

Embodiment 67. The heavy-duty diesel vehicle of embodiment 48, wherein the second washcoat layer comprises a third catalytically active material.

Embodiment 68. The heavy-duty diesel vehicle 67, wherein the third catalytically active material is catalytic particles produced by wet-chemistry methods or plasma-created composite nanoparticles bonded to or embedded within micron-sized carrier particles, the composite nanoparticles comprising a support nanoparticle and a catalytic nanoparticle.

Embodiment 69. The heavy-duty diesel vehicle 67 or 68, wherein the third catalytically active material is catalytic particles produced by wet-chemistry methods.

Embodiment 70. The heavy-duty diesel vehicle 67 or 68, wherein the third catalytically active material is plasma-created composite nanoparticles bonded to or embedded within micron-sized carrier particles, the composite nanoparticles comprising a support nanoparticle and a catalytic nanoparticle.

Embodiment 71. The heavy-duty diesel vehicle of any one of embodiments 67-70, wherein the third catalytically active material comprises platinum and no palladium.

Embodiment 72. The heavy-duty diesel vehicle of any one of embodiments 67-70, wherein the third catalytically active material comprises platinum and palladium at a platinum:palladium ratio of 10:1 to 100:1.

Embodiment 73. The heavy-duty diesel vehicle of any one of embodiments 67-70 or 72, wherein the third catalytically active material comprises platinum and palladium at a platinum:palladium ratio of 15:1 to 25:1.

Embodiment 74. The heavy-duty diesel vehicle of any one of embodiments 46-73, wherein the washcoat layer comprises about 1% to about 20% boehmite particles by weight.

Embodiment 75. The heavy-duty diesel vehicle of any one of embodiments 46-74, wherein the washcoat layer comprises about 1% to about 10% boehmite particles by weight.

Embodiment 76. The heavy-duty diesel vehicle of any one of embodiments 46-75, wherein the washcoat layer comprises about 1% to about 5% boehmite particles by weight.

Embodiment 77. The heavy-duty diesel vehicle of any one of embodiments 46-76, wherein the washcoat layer comprises filler particles.

Embodiment 78. The heavy-duty diesel vehicle of any one of embodiments 77, wherein the filler particles are alumina particles.

Embodiment 79. The heavy-duty diesel vehicle of any one of embodiments 46-78, wherein the heavy-duty diesel vehicle is a light heavy-duty diesel vehicle.

Embodiment 80. The heavy-duty diesel vehicle of any one of embodiments 46-78, wherein the heavy-duty diesel vehicle is a medium heavy-duty diesel vehicle.

Embodiment 81. The heavy-duty diesel vehicle of any one of embodiments 46-78, wherein the heavy-duty diesel vehicle is a heavy heavy-duty diesel vehicle.

Embodiment 82. A method of forming a coated substrate, the method comprising: coating a substrate with a catalytic washcoat composition comprising boehmite particles, a first catalytically active material, and a second catalytically active material; wherein the first catalytically active material comprises platinum and palladium in a weight ratio of 10:1 platinum:palladium to 100:1 platinum:palladium, or platinum and no palladium, wherein the first catalytically active material comprises plasma-created composite nanoparticles bonded to or embedded within micron-sized carrier particles, the composite nanoparticles comprising a support nanoparticle and a catalytic nanoparticle, wherein the second catalytically active material comprises platinum and palladium in a weight ratio of about 1:2 platinum:palladium to about 8:1 platinum:palladium, or palladium and no platinum, and wherein the catalytic washcoat composition is free of zeolites.

Embodiment 83. The method according to embodiment 82, wherein the second catalytically active material is catalytic particles produced by wet-chemistry methods or plasma-created composite nanoparticles bonded to or embedded within micron-sized carrier particles, the composite nanoparticles comprising a support nanoparticle and a catalytic nanoparticle.

Embodiment 84. The method according to embodiment 82 or 83, wherein the second catalytically active material is catalytic particles produced by wet-chemistry methods.

Embodiment 85. The method according to embodiment 82 or 83, wherein the second catalytically active material is plasma-created composite nanoparticles bonded to or embedded within micron-sized carrier particles, the composite nanoparticles comprising a support nanoparticle and a catalytic nanoparticle.

Embodiment 86. A method of forming a coated substrate, the method comprising: coating a substrate with a catalytic washcoat composition comprising boehmite particles, a first catalytically active material, and a second catalytically active material, wherein the first catalytically active material comprises platinum and palladium in a weight ratio of 10:1 platinum:palladium to 100:1 platinum:palladium, or platinum and no palladium, wherein the first catalytically active material is catalytic particles produced by wet-chemistry methods, wherein the second catalytically active material comprises platinum and palladium in a weight ratio of about 1:2 platinum:palladium to about 8:1 platinum:palladium, or palladium and no platinum, wherein the second catalytically active material comprises plasma-created composite nanoparticles bonded to or embedded within micron-sized carrier particles, the composite nanoparticles comprising a support nanoparticle and a catalytic nanoparticle, and wherein the catalytic washcoat composition is free of zeolites.

Embodiment 87. The method of any one of embodiments 82-86, wherein the first catalytically active material comprises platinum and palladium at a platinum:palladium ratio of 15:1 to 25:1.

Embodiment 88. The method of any one of embodiments 82-86, wherein the first catalytically active material comprises platinum and no palladium.

Embodiment 89. The method of any one of embodiments 82-88, wherein the second catalytically active material comprises platinum and palladium at a platinum:palladium ratio of 1:2 to 8:1.

Embodiment 90. The method of any one of embodiments 82-88, wherein the second catalytically active material comprises palladium and no platinum.

Embodiment 91. The method of any one of embodiments 82-90, wherein the catalytic washcoat composition comprises 1% to 20% boehmite particles by weight.

Embodiment 92. The method of any one of embodiments 82-91, wherein the catalytic washcoat composition comprises 1% to 10% boehmite particles by weight.

Embodiment 93. The method of any one of embodiments 82-92, wherein the catalytic washcoat composition comprises 1% to 5% boehmite particles by weight.

Embodiment 94. The method of any one of embodiments 82-93, wherein the catalytic washcoat composition comprises filler particles.

Embodiment 95. The method of embodiment 94, wherein the filler particles are alumina particles.

Embodiment 96. A method of forming a coated substrate, the method comprising: (a) coating a substrate with a first catalytic washcoat composition comprising boehmite particles and a first catalytically active material; wherein the first catalytically active material comprises platinum and palladium in a weight ratio of 10:1 platinum:palladium to 100:1 platinum:palladium, or platinum and no palladium; and (b) coating the substrate with a second catalytic washcoat composition comprising boehmite particles and a second catalytically active material; wherein the second catalytically active material comprises platinum and palladium in a weight ratio of about 1:2 platinum:palladium to about 8:1 platinum:palladium, or palladium and no platinum, wherein the first catalytically active material and the second catalytically active material comprise plasma-created composite nanoparticles bonded to or embedded within micron-sized carrier particles, the composite nanoparticles comprising a support nanoparticle and a catalytic nanoparticle, and wherein the catalytic washcoat compositions are free of zeolites.

Embodiment 97. The method of embodiment 96, wherein the first catalytically active material comprises platinum and palladium at a platinum:palladium ratio of 15:1 to 25:1.

Embodiment 98. The method of embodiment 96, wherein the first catalytically active material comprises platinum and no palladium.

Embodiment 99. The method of any one of embodiments 96-98, wherein the second catalytically active material comprises platinum and palladium at a platinum:palladium ratio of 1:2 to 8:1.

Embodiment 100. The method of any one of embodiments 96-98, wherein the second catalytically active material comprises palladium and not platinum.

Embodiment 101. The method of any one of embodiments 96-100, wherein the first catalytic washcoat composition comprises a third catalytically active material.

Embodiment 102. The method of embodiment 101, wherein the third catalytically active material is catalytic particles produced by wet-chemistry methods or plasma-created composite nanoparticles bonded to or embedded within micron-sized carrier particles, the composite nanoparticles comprising a support nanoparticle and a catalytic nanoparticle.

Embodiment 103. The method of embodiment 101 or 102, wherein the third catalytically active material is catalytic particles produced by wet-chemistry methods.

Embodiment 104. The method of embodiment 101 or 102, wherein the third catalytically active material is plasma-created composite nanoparticles bonded to or embedded within micron-sized carrier particles, the composite nanoparticles comprising a support nanoparticle and a catalytic nanoparticle.

Embodiment 105. The method of any one of embodiments 101-104, wherein the third catalytically active material comprises palladium and no platinum.

Embodiment 106. The method of any one of embodiments 101-104, wherein the third catalytically active material comprises platinum and palladium at a platinum:palladium ratio of 1:2 to 8:1.

Embodiment 107. The method of any one of embodiments 96-100, wherein the second washcoat layer comprises a third catalytically active material.

Embodiment 108. The method of embodiment 107, wherein the third catalytically active material is catalytic particles produced by wet-chemistry methods or plasma-created composite nanoparticles bonded to or embedded within micron-sized carrier particles, the composite nanoparticles comprising a support nanoparticle and a catalytic nanoparticle.

Embodiment 109. The method of embodiment 107 or 108, wherein the third catalytically active material is catalytic particles produced by wet-chemistry methods.

Embodiment 110. The method of embodiment 107 or 108, wherein the third catalytically active material is plasma-created composite nanoparticles bonded to or embedded within micron-sized carrier particles, the composite nanoparticles comprising a support nanoparticle and a catalytic nanoparticle.

Embodiment 111. The method of any one of embodiments 107-110, wherein the third catalytically active material comprises platinum and no palladium.

Embodiment 112. The method of any one of embodiments 107-110, wherein the third catalytically active material comprises platinum and palladium at a platinum:palladium ratio of 10:1 to 100:1.

Embodiment 113. The method of any one of embodiments 107-110 or 112, wherein the third catalytically active material comprises platinum and palladium at a platinum:palladium ratio of 15:1 to 25:1.

Embodiment 114. The method of any one of embodiments 96-113, wherein the catalytic washcoat compositions comprise 1% to 20% boehmite particles by weight.

Embodiment 115. The method of any one of embodiments 96-114, wherein the catalytic washcoat compositions comprise 1% to 10% boehmite particles by weight.

Embodiment 116. The method of any one of embodiments 96-115, wherein the catalytic washcoat compositions comprise 1% to 5% boehmite particles by weight.

Embodiment 117. The method of any one of embodiments 96-116, wherein the catalytic washcoat compositions comprise filler particles.

Embodiment 118. The method of embodiment 117, wherein the filler particles are alumina particles.

Embodiment 119. The method of any one of embodiment 96-118 wherein the first catalytic washcoat composition is applied to the substrate prior to the second catalytic washcoat composition.

Embodiment 120. The method of any one of embodiment 96-118 wherein the second catalytic washcoat composition is applied to the substrate prior to the first catalytic washcoat composition.

Embodiment 121. The method of any one of embodiments 82-120, further comprising coating the substrate with a corner-fill washcoat composition prior to coating the substrate with a catalytic washcoat composition.

Embodiment 122. The method of any one of embodiments 82-121, further comprising drying and calcining the coated substrate after the application of a washcoat composition.

Embodiment 123. A catalytic washcoat composition comprising a solids content of: 35% to 95% by weight of a first catalytically active material comprising platinum and palladium in a weight ratio of 10:1 platinum:palladium to 100:1 platinum:palladium, or platinum and no palladium, wherein the first catalytically active material comprises plasma-created composite nanoparticles bonded to or embedded within micron-sized carrier particles, the composite nanoparticles comprising a support nanoparticle and a catalytic nanoparticle; and 35% to 95% by weight of a second catalytically active material comprising platinum and palladium in a weight ratio of 1:2 platinum:palladium to 8:1 platinum:palladium, or palladium and no platinum, wherein the catalytic washcoat composition is free of zeolites.

Embodiment 124. The catalytic washcoat composition of embodiment 123, wherein the second catalytically active material is catalytic particles produced by wet-chemistry methods or plasma-created composite nanoparticles bonded to or embedded within micron-sized carrier particles, the composite nanoparticles comprising a support nanoparticle and a catalytic nanoparticle.

Embodiment 125. The catalytic washcoat composition of embodiment 123 or 124, wherein the second catalytically active material is catalytic particles produced by wet-chemistry methods.

Embodiment 126. The catalytic washcoat composition of embodiment 123 or 124, wherein the second type of catalytically active material comprises composite nanoparticles bonded to or embedded within micron-sized carrier particles, the composite nanoparticles comprising a support nanoparticle and a catalytic nanoparticle.

Embodiment 127. A catalytic washcoat composition comprising a solids content of: 35% to 95% by weight of a first catalytically active material comprising platinum and palladium in a weight ratio of 10:1 platinum:palladium to 100:1 platinum:palladium, or platinum and no palladium, wherein the first catalytically active material is catalytic particles produced by wet-chemistry methods; and 35% to 95% by weight of a second catalytically active material comprising platinum and palladium in a weight ratio of 1:2 platinum:palladium to 8:1 platinum:palladium, or palladium and no platinum, wherein the second catalytically active material comprises plasma-created composite nanoparticles bonded to or embedded within micron-sized carrier particles, the composite nanoparticles comprising a support nanoparticle and a catalytic nanoparticle, wherein the catalytic washcoat composition is free of zeolites.

Embodiment 128. The catalytic washcoat composition of any one of embodiments 123-127, wherein the first catalytically active material comprises platinum and palladium at a platinum:palladium ratio of 15:1 to 25:1.

Embodiment 129. The catalytic washcoat composition of any one of embodiments 123-127, wherein the first catalytically active material comprises platinum and no palladium.

Embodiment 130. The catalytic washcoat composition of any one of embodiments 123-129, wherein the second catalytically active material comprises platinum and palladium at a platinum:palladium ratio of 1:2 to 8:1

Embodiment 131. The catalytic washcoat composition of any one of embodiments 123-129, wherein the second catalytically active material comprises palladium and no platinum.

Embodiment 132. The catalytic washcoat composition of any one of embodiments 123-131, further comprising 1% to 20% boehmite particles by weight.

Embodiment 133. The catalytic washcoat composition of any one of embodiments 123-132, further comprising 1% to 10% boehmite particles by weight.

Embodiment 134. The catalytic washcoat composition of any one of embodiments 123-135, further comprising 1% to 5% boehmite particles by weight.

Embodiment 135. The catalytic washcoat composition of any one of embodiments 123-134, further comprising filler particles.

Embodiment 136. The catalytic washcoat composition of embodiment 135, wherein the filler particles are alumina particles.

Embodiment 137. The catalytic washcoat composition of any one of embodiments 123-136, wherein the solids are suspended in an aqueous medium at a pH between 3 and 5.

Embodiment 138. A coated substrate that is free of zeolites comprising: a substrate; and a washcoat layer comprising: boehmite particles; a first catalytically active material comprising platinum and palladium in a weight ratio of 10:1 platinum:palladium to 100:1 platinum:palladium, or comprising platinum and no palladium; and a second catalytically active material comprising platinum and palladium in a weight ratio of 1:2 platinum:palladium to 8:1 platinum:palladium, or comprising palladium and no platinum.

Embodiment 139. The coated substrate of embodiment 138, wherein the first catalytically active material comprises plasma-created composite nanoparticles bonded to pre-formed micron-sized carrier particles, wherein the composite nanoparticles comprise a support nanoparticle and a catalytic nanoparticle.

Embodiment 140. The coated substrate of embodiment 138, wherein the first catalytically active material comprises micron-sized particles comprising plasma-created composite nanoparticles and a carrier matrix formed around the nanoparticles, wherein the composite nanoparticles comprise a support nanoparticle and a catalytic nanoparticle.

Embodiment 141. The coated substrate of embodiment 138, wherein the first catalytically active material comprises hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with platinum or platinum:palladium alloy.

Embodiment 142. The coated substrate of embodiment 138, wherein the first catalytically active material comprises catalytic particles produced by only wet-chemistry methods, comprising a micron-sized particle impregnated by only wet-chemistry methods with platinum or platinum:palladium alloy.

Embodiment 143. The coated substrate of any one of embodiments 138-142, wherein the second catalytically active material comprises plasma-created composite nanoparticles bonded to pre-formed micron-sized carrier particles, wherein the composite nanoparticles comprise a support nanoparticle and a catalytic nanoparticle.

Embodiment 144. The coated substrate of any one of embodiments 138-142, wherein the second catalytically active material comprises micron-sized particles comprising plasma-created composite nanoparticles and a carrier matrix formed around the nanoparticles, wherein the composite nanoparticles comprise a support nanoparticle and a catalytic nanoparticle.

Embodiment 145. The coated substrate of any one of embodiments 138-142, wherein the second catalytically active material comprises hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with palladium or platinum:palladium alloy.

Embodiment 146. The coated substrate of any one of embodiments 138-142, wherein the second catalytically active material comprises catalytic particles produced by only wet-chemistry methods, comprising a micron-sized particle impregnated by only wet-chemistry methods with palladium or platinum:palladium alloy.

Embodiment 147. A coated substrate that is free of zeolites comprising: a substrate; a first washcoat layer comprising: boehmite particles; and a first catalytically active material comprising platinum and palladium in a weight ratio of 10:1 platinum:palladium to 100:1 platinum:palladium, or comprising platinum and no palladium; and a second washcoat layer comprising: boehmite particles; and a second catalytically active material comprising platinum and palladium in a weight ratio of 1:2 platinum:palladium to 8:1 platinum:palladium, or comprising palladium and no platinum.

Embodiment 148. The coated substrate of embodiment 147, wherein the first washcoat layer is coated on the substrate prior to the coating of the second washcoat layer.

Embodiment 149. The coated substrate of embodiment 147, wherein the second washcoat layer is coated on the substrate prior to the coating of the first washcoat layer.

Embodiment 150. The coated substrate of any one of embodiments 147-149, wherein the first catalytically active material comprises plasma-created composite nanoparticles bonded to pre-formed micron-sized carrier particles, wherein the composite nanoparticles comprise a support nanoparticle and a catalytic nanoparticle.

Embodiment 151. The coated substrate of any one of embodiments 147-149, wherein the first catalytically active material comprises micron-sized particles comprising plasma-created composite nanoparticles and a carrier matrix formed around the nanoparticles, wherein the composite nanoparticles comprise a support nanoparticle and a catalytic nanoparticle.

Embodiment 152. The coated substrate of any one of embodiments 147-149, wherein the first catalytically active material comprises hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with platinum or platinum:palladium alloy.

Embodiment 153. The coated substrate of any one of embodiments 147-149, wherein the first catalytically active material comprises catalytic particles produced by only wet-chemistry methods, comprising a micron-sized particle impregnated by only wet-chemistry methods with platinum or platinum:palladium alloy.

Embodiment 154. The coated substrate of any one of embodiments 147-153, wherein the second catalytically active material comprises plasma-created composite nanoparticles bonded to pre-formed micron-sized carrier particles, wherein the composite nanoparticles comprise a support nanoparticle and a catalytic nanoparticle.

Embodiment 155. The coated substrate of any one of embodiments 147-153, wherein the second catalytically active material comprises micron-sized particles comprising plasma-created composite nanoparticles and a carrier matrix formed around the nanoparticles, wherein the composite nanoparticles comprise a support nanoparticle and a catalytic nanoparticle.

Embodiment 156. The coated substrate of any one of embodiments 147-153, wherein the second catalytically active material comprises hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with palladium or platinum:palladium alloy.

Embodiment 157. The coated substrate of any one of embodiments 147-153, wherein the second catalytically active material comprises catalytic particles produced by only wet-chemistry methods, comprising a micron-sized particle impregnated by only wet-chemistry methods with palladium or platinum:palladium alloy.

Embodiment 158. The coated substrate of any one of embodiments 138-157, wherein the first catalytically active material comprises platinum and palladium at a platinum:palladium ratio of 15:1 to 25:1.

Embodiment 159. The coated substrate of any one of embodiments 138-157, wherein the first catalytically active material comprises platinum and no palladium.

Embodiment 160. The coated substrate of any one of embodiments 138-157, wherein the second catalytically active material comprises platinum and palladium at a platinum:palladium ratio of 1:2 to 8:1.

Embodiment 161. The coated substrate of any one of embodiments 138-157, wherein the second catalytically active material comprises palladium and no platinum.

Embodiment 162. The coated substrate of any one of embodiments 138-146, wherein the washcoat layer comprises 1% to 20% boehmite particles by weight.

Embodiment 163. The coated substrate of any one of embodiments 138-146, wherein the washcoat layer comprises 1% to 10% boehmite particles by weight.

Embodiment 164. The coated substrate of any one of embodiments 138-146, wherein the washcoat layer comprises 1% to 5% boehmite particles by weight.

Embodiment 165. The coated substrate of any one of embodiments 147-157, wherein the first washcoat layer comprises 1% to 20% boehmite particles by weight.

Embodiment 166. The coated substrate of any one of embodiments 147-157, wherein the first washcoat layer comprises 1% to 10% boehmite particles by weight.

Embodiment 167. The coated substrate of any one of embodiments 147-157, wherein the first washcoat layer comprises 1% to 5% boehmite particles by weight.

Embodiment 168. The coated substrate of any one of embodiments 147-157 or 165-167, wherein the second washcoat layer comprises 1% to 20% boehmite particles by weight.

Embodiment 169. The coated substrate of any one of embodiments 10-20 or 28-30, wherein the second washcoat layer comprises 1% to 10% boehmite particles by weight.

Embodiment 170. The coated substrate of any one of embodiments 147-157 or 165-167, wherein the second washcoat layer comprises 1% to 5% boehmite particles by weight.

Embodiment 171. The coated substrate of any one of embodiments 138-146 or 162-164, wherein the washcoat layer further comprises filler particles.

Embodiment 172. The coated substrate of any one of embodiments 147-157 or 165-170, wherein the first washcoat layer further comprises filler particles.

Embodiment 173. The coated substrate of any one of embodiments 147-157 or 165-170, wherein the second washcoat layer further comprises filler particles.

Embodiment 174. The coated substrate of any one of embodiments 171-173, wherein the filler particles comprise alumina.

Embodiment 175. The coated substrate of any one of embodiments 138-146, wherein the washcoat layer comprises a third catalytically active material selected from the group consisting of: plasma-created composite nanoparticles bonded to pre-formed micron-sized carrier particles, wherein the composite nanoparticles comprise a support nanoparticle and a catalytic nanoparticle; plasma-created composite nanoparticles and a carrier matrix formed around the nanoparticles, wherein the composite nanoparticles comprise a support nanoparticle and a catalytic nanoparticle; hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with platinum, palladium, or platinum:palladium alloy; and catalytic particles produced by only wet-chemistry methods, comprising a micron-sized particle impregnated by only wet-chemistry methods with platinum, palladium, or platinum:palladium alloy; wherein said third catalytically active material is different from the second catalytically active material.

Embodiment 176. The coated substrate of any one of embodiments 147-157 or 165-170, wherein the second washcoat layer comprises a third catalytically active material selected from the group consisting of: plasma-created composite nanoparticles bonded to pre-formed micron-sized carrier particles, wherein the composite nanoparticles comprise a support nanoparticle and a catalytic nanoparticle; plasma-created composite nanoparticles and a carrier matrix formed around the nanoparticles, wherein the composite nanoparticles comprise a support nanoparticle and a catalytic nanoparticle; hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with platinum, palladium, or platinum:palladium alloy; and catalytic particles produced by only wet-chemistry methods, comprising a micron-sized particle impregnated by only wet-chemistry methods with platinum, palladium, or platinum:palladium alloy; wherein said third catalytically active material is different from the second catalytically active material.

Embodiment 177. The coated substrate of embodiment 175 or embodiment 176, wherein the third catalytically active material comprises platinum and no palladium.

Embodiment 178. The coated substrate of embodiment 175 or embodiment 176, wherein the third catalytically active material comprises platinum and palladium at a platinum:palladium ratio of 10:1 to 100:1.

Embodiment 179. The coated substrate of embodiment 175 or embodiment 176, wherein the third catalytically active material comprises platinum and palladium at a platinum:palladium ratio of 15:1 to 25:1.

Embodiment 180. A catalytic converter comprising a coated substrate according to any one of embodiments 138-179.

Embodiment 181. An exhaust treatment system comprising a conduit for exhaust gas and a catalytic converter according to embodiment 180.

Embodiment 182. A heavy-duty diesel vehicle comprising the exhaust treatment system of embodiment 181.

Embodiment 183. The heavy-duty diesel vehicle of embodiment 182, wherein the heavy-duty diesel vehicle meets the European emission standard Euro 5 for heavy-duty diesel vehicles.

Embodiment 184. The heavy-duty diesel vehicle of embodiment 182, wherein the heavy-duty diesel vehicle meets the European emission standard Euro 6 for heavy-duty diesel vehicles.

Embodiment 185. The heavy-duty diesel vehicle of embodiment 182, wherein the heavy-duty diesel vehicle meets the United States Environmental Protection Agency standard for heavy-duty diesel vehicles.

Embodiment 186. The heavy-duty diesel vehicle of embodiment 182, wherein the heavy-duty diesel vehicle meets the United States Environmental Protection Agency Inherently Low Emissions Vehicle (ILEV) standard for heavy-duty diesel vehicles.

Embodiment 187. The heavy-duty diesel vehicle of embodiment 182, wherein the heavy-duty diesel vehicle meets the United States Environmental Protection Agency Ultra Low Emissions Vehicle (ULEV) standard for heavy-duty diesel vehicles.

Embodiment 188. A method of forming a coated substrate that is free of zeolites comprising coating a substrate with a washcoat layer comprising: boehmite particles; a first catalytically active material comprising platinum and palladium in a weight ratio of 10:1 platinum:palladium to 100:1 platinum:palladium, or comprising platinum and no palladium; and a second catalytically active material comprising platinum and palladium in a weight ratio of 1:2 platinum:palladium to 8:1 platinum:palladium, or comprising palladium and no platinum.

Embodiment 189. The method of embodiment 188, wherein the first catalytically active material comprises plasma-created composite nanoparticles bonded to pre-formed micron-sized carrier particles, wherein the composite nanoparticles comprise a support nanoparticle and a catalytic nanoparticle.

Embodiment 190. The method of embodiment 188, wherein the first catalytically active material comprises micron-sized particles comprising plasma-created composite nanoparticles and a carrier matrix formed around the nanoparticles, wherein the composite nanoparticles comprise a support nanoparticle and a catalytic nanoparticle.

Embodiment 191. The method of embodiment 188, wherein the first catalytically active material comprises hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with platinum or platinum:palladium alloy.

Embodiment 192. The method of embodiment 188, wherein the first catalytically active material comprises catalytic particles produced by only wet-chemistry methods, comprising a micron-sized particle impregnated by only wet-chemistry methods with platinum or platinum:palladium alloy.

Embodiment 193. The method of any one of embodiments 188-192, wherein the second catalytically active material comprises plasma-created composite nanoparticles bonded to pre-formed micron-sized carrier particles, wherein the composite nanoparticles comprise a support nanoparticle and a catalytic nanoparticle.

Embodiment 194. The method of any one of embodiments 188-192, wherein the second catalytically active material comprises micron-sized particles comprising plasma-created composite nanoparticles and a carrier matrix formed around the nanoparticles, wherein the composite nanoparticles comprise a support nanoparticle and a catalytic nanoparticle.

Embodiment 195. The method of any one of embodiments 188-192, wherein the second catalytically active material comprises hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with palladium or platinum:palladium alloy.

Embodiment 196. The method of any one of embodiments 188-192, wherein the second catalytically active material comprises catalytic particles produced by only wet-chemistry methods, comprising a micron-sized particle impregnated by only wet-chemistry methods with palladium or platinum:palladium alloy.

Embodiment 197. A method of forming a coated substrate that is free of zeolites comprising, in either order: coating a substrate with a first washcoat layer comprising: boehmite particles; and a first catalytically active material comprising platinum and palladium in a weight ratio of 10:1 platinum:palladium to 100:1 platinum:palladium, or comprising platinum and no palladium; and coating the substrate with a second washcoat layer comprising: boehmite particles; and a second catalytically active material comprising platinum and palladium in a weight ratio of 1:2 platinum:palladium to 8:1 platinum:palladium, or comprising palladium and no platinum.

Embodiment 198. The method of embodiment 197, wherein the first washcoat layer is coated on the substrate prior to the coating of the second washcoat layer.

Embodiment 199. The method of embodiment 197, wherein the second washcoat layer is coated on the substrate prior to the coating of the first washcoat layer.

Embodiment 200. The method of any one of embodiments 197-199, wherein the first catalytically active material comprises plasma-created composite nanoparticles bonded to pre-formed micron-sized carrier particles, wherein the composite nanoparticles comprise a support nanoparticle and a catalytic nanoparticle.

Embodiment 201. The method of any one of embodiments 197-199, wherein the first catalytically active material comprises micron-sized particles comprising plasma-created composite nanoparticles and a carrier matrix formed around the nanoparticles, wherein the composite nanoparticles comprise a support nanoparticle and a catalytic nanoparticle.

Embodiment 202. The method of any one of embodiments 197-199, wherein the first catalytically active material comprises hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with platinum or platinum:palladium alloy.

Embodiment 203. The method of any one of embodiments 197-199, wherein the first catalytically active material comprises catalytic particles produced by only wet-chemistry methods, comprising a micron-sized particle impregnated by only wet-chemistry methods with platinum or platinum:palladium alloy.

Embodiment 204. The method of any one of embodiments 197-203, wherein the second catalytically active material comprises plasma-created composite nanoparticles bonded to pre-formed micron-sized carrier particles, wherein the composite nanoparticles comprise a support nanoparticle and a catalytic nanoparticle.

Embodiment 205. The method of any one of embodiments 197-203, wherein the second catalytically active material comprises micron-sized particles comprising plasma-created composite nanoparticles and a carrier matrix formed around the nanoparticles, wherein the composite nanoparticles comprise a support nanoparticle and a catalytic nanoparticle.

Embodiment 206. The method of any one of embodiments 197-203, wherein the second catalytically active material comprises hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with palladium or platinum:palladium alloy.

Embodiment 207. The method of any one of embodiments 197-203, wherein the second catalytically active material comprises catalytic particles produced by only wet-chemistry methods, comprising a micron-sized particle impregnated by only wet-chemistry methods with palladium or platinum:palladium alloy.

Embodiment 208. The method of any one of embodiments 188-207, wherein the first catalytically active material comprises platinum and palladium at a platinum:palladium ratio of 15:1 to 25:1.

Embodiment 209. The method of any one of embodiments 188-207, wherein the first catalytically active material comprises platinum and no palladium.

Embodiment 210. The method of any one of embodiments 188-207, wherein the second catalytically active material comprises platinum and palladium at a platinum:palladium ratio of 1:2 to 8:1

Embodiment 211. The method of any one of embodiments 188-207, wherein the second catalytically active material comprises palladium and no platinum.

Embodiment 212. The method of any one of embodiments 188-196, wherein the washcoat layer comprises 1% to 20% boehmite particles by weight.

Embodiment 213. The method of any one of embodiments 188-196, wherein the washcoat layer comprises 1% to 10% boehmite particles by weight.

Embodiment 214. The method of any one of embodiments 188-196, wherein the washcoat layer comprises 1% to 5% boehmite particles by weight.

Embodiment 215. The method of any one of embodiments 197-207, wherein the first washcoat layer comprises 1% to 20% boehmite particles by weight.

Embodiment 216. The method of any one of embodiments 197-207, wherein the first washcoat layer comprises 1% to 10% boehmite particles by weight.

Embodiment 217. The method of any one of embodiments 197-207, wherein the first washcoat layer comprises 1% to 5% boehmite particles by weight.

Embodiment 218. The method of any one of embodiments 197-207 or 215-217, wherein the second washcoat layer comprises 1% to 20% boehmite particles by weight.

Embodiment 219. The method of any one of embodiments 197-207 or 215-217, wherein the second washcoat layer comprises 1% to 10% boehmite particles by weight.

Embodiment 220. The method of any one of embodiments 197-207 or 215-217, wherein the second washcoat layer comprises 1% to 5% boehmite particles by weight.

Embodiment 221. The method of any one of embodiments 188-196 or 212-214, wherein the washcoat layer further comprises filler particles.

Embodiment 222. The method of any one of embodiments 197-207 or 215-220, wherein the first washcoat layer further comprises filler particles.

Embodiment 223. The method of any one of embodiments 197-207 or 215-220, wherein the second washcoat layer further comprises filler particles.

Embodiment 224. The method of any one of embodiments 221-223, wherein the filler particles comprise alumina.

Embodiment 225. The method of any one of embodiments 188-196, wherein the washcoat layer comprises a third catalytically active material selected from the group consisting of: plasma-created composite nanoparticles bonded to pre-formed micron-sized carrier particles, wherein the composite nanoparticles comprise a support nanoparticle and a catalytic nanoparticle; plasma-created composite nanoparticles and a carrier matrix formed around the nanoparticles, wherein the composite nanoparticles comprise a support nanoparticle and a catalytic nanoparticle; hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with platinum, platinum, or platinum:palladium alloy; and catalytic particles produced by only wet-chemistry methods, comprising a micron-sized particle impregnated by only wet-chemistry methods with platinum, palladium, or platinum:palladium alloy; wherein said third catalytically active material is different from the second catalytically active material.

Embodiment 226. The method of any one of embodiments 197-207 or 215-220, wherein the second washcoat layer comprises a third catalytically active material selected from the group consisting of: plasma-created composite nanoparticles bonded to pre-formed micron-sized carrier particles, wherein the composite nanoparticles comprise a support nanoparticle and a catalytic nanoparticle; plasma-created composite nanoparticles and a carrier matrix formed around the nanoparticles, wherein the composite nanoparticles comprise a support nanoparticle and a catalytic nanoparticle; hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with platinum, platinum, or platinum:palladium alloy; and catalytic particles produced by only wet-chemistry methods, comprising a micron-sized particle impregnated by only wet-chemistry methods with platinum, palladium, or platinum:palladium alloy; wherein said third catalytically active material is different from the second catalytically active material.

Embodiment 227. The coated substrate of embodiment 225 or embodiment 226, wherein the third catalytically active material comprises platinum and no palladium.

Embodiment 228. The coated substrate of embodiment 225 or embodiment 226, wherein the third catalytically active material comprises platinum and palladium at a platinum:palladium ratio of 10:1 to 100:1.

Embodiment 229. The coated substrate of embodiment 225 or embodiment 226, wherein the third catalytically active material comprises platinum and palladium at a platinum:palladium ratio of 15:1 to 25:1.

Embodiment 230. A catalytic washcoat composition comprising a solids content of: 35% to 95% by weight of a first catalytically active material comprising platinum and palladium in a weight ratio of 10:1 platinum:palladium to 100:1 platinum:palladium, or comprising platinum and no palladium; and 35% to 95% by weight of a second catalytically active material comprising platinum and palladium in a weight ratio of 1:2 platinum:palladium to 8:1 platinum:palladium, or comprising palladium and no platinum, wherein the catalytic washcoat composition is free of zeolites.

Embodiment 231. The catalytic washcoat composition of embodiment 230, wherein the first catalytically active material comprises plasma-created composite nanoparticles bonded to pre-formed micron-sized carrier particles, wherein the composite nanoparticles comprise a support nanoparticle and a catalytic nanoparticle.

Embodiment 232. The catalytic washcoat composition of embodiment 230, wherein the first catalytically active material comprises micron-sized particles comprising plasma-created composite nanoparticles and a carrier matrix formed around the nanoparticles, wherein the composite nanoparticles comprise a support nanoparticle and a catalytic nanoparticle.

Embodiment 233. The catalytic washcoat composition of embodiment 230, wherein the first catalytically active material comprises hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with platinum or platinum:palladium alloy.

Embodiment 234. The catalytic washcoat composition of embodiment 230, wherein the first catalytically active material comprises catalytic particles produced by only wet-chemistry methods, comprising a micron-sized particle impregnated by only wet-chemistry methods with platinum or platinum:palladium alloy.

Embodiment 235. The catalytic washcoat composition of any one of embodiments 230-234, wherein the second catalytically active material comprises plasma-created composite nanoparticles bonded to pre-formed micron-sized carrier particles, wherein the composite nanoparticles comprise a support nanoparticle and a catalytic nanoparticle.

Embodiment 236. The catalytic washcoat composition of any one of embodiments 230-234, wherein the second catalytically active material comprises micron-sized particles comprising plasma-created composite nanoparticles and a carrier matrix formed around the nanoparticles, wherein the composite nanoparticles comprise a support nanoparticle and a catalytic nanoparticle.

Embodiment 237. The catalytic washcoat composition of any one of embodiments 230-234, wherein the second catalytically active material comprises hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with palladium or platinum:palladium alloy.

Embodiment 238. The catalytic washcoat composition of any one of embodiments 230-234, wherein the second catalytically active material comprises catalytic particles produced by only wet-chemistry methods, comprising a micron-sized particle impregnated by only wet-chemistry methods with palladium or platinum:palladium alloy.

Embodiment 239. The catalytic washcoat composition of any one of embodiments 230-238, wherein the first catalytically active material comprises platinum and palladium at a platinum:palladium ratio of 15:1 to 25:1.

Embodiment 240. The catalytic washcoat composition of any one of embodiments 230-238, wherein the first catalytically active material comprises platinum and no palladium.

Embodiment 241. The catalytic washcoat composition of any one of embodiments 230-240, wherein the second catalytically active material comprises platinum and palladium at a platinum:palladium ratio of 1:2 to 8:1

Embodiment 242. The catalytic washcoat composition of any one of embodiments 230-240, wherein the second catalytically active material comprises palladium and no platinum.

Embodiment 243. The catalytic washcoat composition of any one of embodiments 230-242, further comprising 1% to 20% boehmite particles by weight.

Embodiment 244. The catalytic washcoat composition of any one of embodiments 230-242, further comprising 1% to 10% boehmite particles by weight.

Embodiment 245. The catalytic washcoat composition of any one of embodiments 230-242, further comprising 1% to 5% boehmite particles by weight.

Embodiment 246. The catalytic washcoat composition of any one of embodiments 230-245, further comprising filler particles.

Embodiment 247. The catalytic washcoat composition of embodiment 246, wherein the filler particles are alumina particles.

Embodiment 248. The catalytic washcoat composition of any one of embodiments 230-247, wherein the solids are suspended in an aqueous medium at a pH between 3 and 5.

EXAMPLES

As discussed above, the washcoat compositions can be configured and applied in a variety of different ways. The configurations provide examples of preparing substrates coated with the washcoats.

General Procedure for Preparation of Washcoats

The washcoats are made by mixing the solid ingredients (about 30% by weight) with water (about 70% by weight). Acetic acid is added to adjust the pH to about 4. The washcoat slurry is then milled to arrive at an average particle size of about 4 µm to about 6 µm. The viscosity of the washcoat is adjusted by mixing with a cellulose solution or with corn starch to the desired viscosity, typically between about 300 cP to about 1200 cP. The washcoat is aged for about 24 hours to about 48 hours after cellulose or corn starch addition. The washcoat is coated onto the substrate by either dip-coating or vacuum coating. The part(s) to be coated can be optionally pre-wetted prior to coating. The washcoat amount coated onto the substrate can range from about 30 g/l to about 250 g/l, or about 50 g/l to about 250 g/l. Excess washcoat is blown off and recycled. The washcoat-coated substrate is then dried at about 25° C. to about 95° C. by flowing air over the coated part, until the weight levels off. The washcoat-coated substrate is then calcined at about 450° C. to about 650° C. for about 1 hour to about 2 hours.

Example 1

Substrate-Catalytic Layer (S-C) Configuration with Two Types of Catalytically Active Material in Catalytic Layer In one example configuration, a catalytic washcoat composition applied to a substrate comprises a substrate and a catalytic washcoat layer. The catalytic washcoat layer may comprise about 3 wt % boehmite, about 40 wt % NNm particles with a platinum:palladium weight ratio of 20:1, about 40 wt % NNm particles with platinum:palladium weight ratio of 5:1, and about 17 wt % porous alumina (such as MI-386).

The ingredients discussed above for the catalytic washcoat composition are mixed with water and acid, such as acetic acid, and the pH is adjusted to about 4. After adjusting the viscosity to the proper levels, this first washcoat is coated onto the substrate. Excess washcoat is blown off and recycled. The coated substrate is then dried and calcined.

Example 2

Substrate-First Catalytic Layer-Second Catalytic Layer (S-$C_1$-$C_2$) Configuration with Two Catalytic Layers, Each Comprising a Different Type of Catalytically Active Material In one example configuration, a catalytic washcoat composition applied to a substrate comprises a substrate, a first catalytic washcoat layer, and a second catalytic washcoat layer. The first catalytic washcoat layer may comprise about 3 wt % boehmite, about 80 wt % NNm particles with a platinum:palladium weight ratio of 20:1, and about 17 wt % porous alumina (such as MI-386). The second catalytic washcoat layer may comprise about 3 wt % boehmite, about 80 wt % NNm particles with a platinum:palladium weight ratio of 5:1, and about 17 wt % porous alumina (such as MI-386).

The ingredients discussed above for the first catalytic washcoat composition are mixed with water and acid, such as acetic acid, and the pH is adjusted to about 4. After adjusting the viscosity to the proper levels, this first washcoat is coated onto the substrate. Excess washcoat is blown off and recycled. This first catalytic washcoat layer is then dried and calcined.

Following this first coating step, a second coating step is applied, where the ingredients discussed above for the second washcoat composition are mixed with water and acid, such as acetic acid, and the pH is adjusted to about 4. After adjusting the viscosity to the proper levels, this second washcoat is coated onto the substrate. Again, excess washcoat is blown off and recycled. This second washcoat layer is then dried and calcined.

Example 3

Substrate-First Catalytic Layer-Second Catalytic Layer (S-$C_1$-$C_2$) Additional Configuration with Two Catalytic Layers In another example configuration, a catalytic washcoat composition applied to a substrate comprises a substrate, an optional corner fill layer, a first catalytic washcoat layer, and a second catalytic washcoat layer. The substrate contains about 0.8 g/L total platinum group metal loading.

The optional corner fill layer can be comprised of porous alumina (such as MI-386 particles) and about 3% boehmite, and may optionally also include zeolites. The zeolites can be included in an amount of between 20% and 90% by weight of the solids content of the corner fill layer washcoat, such as about 50%. The optional corner fill layer, when used, is applied in an amount of about 50 g/L to 60 g/L to the substrate.

The first catalytic washcoat layer may comprise boehmite (about 3 wt %), NNm particles (nano-platinum:palladium alloy on nano-alumina on micro-alumina) with a platinum:palladium weight ratio of 20:1 in an amount of about 25 g/L (corresponding to about 0.33 g/L of Pt:Pd); alumina particles impregnated with palladium via wet chemistry in an amount of about 18 g/L (corresponding to about 0.07 g/L of Pd); and about 10-15 g/L of porous alumina (such as MI-386). The total platinum group metal loading in the first catalytic washcoat layer is about 0.4 g/L, with a ratio of [20:1 Pt:Pd alloy] to [Pd] of about 5 to 1. This first catalytic washcoat layer is applied to the substrate in an amount of about 50 g/L to 60 g/L.

The second catalytic washcoat layer may comprise about 3 wt % boehmite, about 48.5 wt % NNm particles with a platinum:palladium weight ratio of 20:1, and about 48.5 wt % porous alumina (such as MI-386). The amount of NNm particles with a platinum:palladium weight ratio of 20:1 is about 25-30 g/L, corresponding to about 1.2% to 1.5% of platinum group metal in the washcoat. The amount of alumina is about 25-30 g/L. The total platinum group metal loading in the second catalytic washcoat layer is about 0.4 g/L, comprised of 20:1 Pt:Pd. This second catalytic washcoat layer is applied to the substrate in an amount of about 50 g/L to 60 g/L.

When the optional corner fill layer is used, the ingredients discussed above for the corner fill layer washcoat composition are mixed with water and acid, such as acetic acid, and the pH is adjusted to about 4. After adjusting the viscosity to the proper levels, the corner fill layer washcoat is coated onto the substrate. Excess washcoat is blown off and can be recycled. This corner fill washcoat layer is then dried and calcined.

The ingredients discussed above for the first catalytic washcoat composition are mixed with water and acid, such as acetic acid, and the pH is adjusted to about 4. After adjusting the viscosity to the proper levels, this first catalytic washcoat is coated onto the substrate. Excess catalytic washcoat is blown off and recycled. This first catalytic washcoat layer is then dried and calcined.

Following this first coating step, a second coating step is applied, where the ingredients discussed above for the second catalytic washcoat composition are mixed with water and acid, such as acetic acid, and the pH is adjusted to about 4. After adjusting the viscosity to the proper levels, this second catalytic washcoat is coated onto the substrate. Again, excess catalytic washcoat is blown off and recycled. This second catalytic washcoat layer is then dried and calcined.

Example 4

Substrate-Corner Fill Layer-First Catalytic Layer-Second Catalytic Layer (S-F-$C_1$-$C_2$)

In another exemplary configuration, a catalytic washcoat composition applied to a substrate comprises a substrate, a corner fill layer, a first catalytic washcoat layer, and a second catalytic washcoat layer. The catalyst was prepared as in Example 3, with the following washcoats.

Corner Fill Layer:
Composed of 50 g/L Al2O3 (MI-386) plus ~5% boehmite.
$1^{st}$ Catalytic Layer:
21 g/l of NNm, nano-20:1 Pt:Pd/nano-Al2O3/micro-Al2O3 (approx. 0.33 g/L of 20:1 Pt:Pd) and 8 g/l of wet-chem Pd impregnated into micro-Al2O3 (MI-386) (approx. 0.07 g/L Pd), which together provide a 3-to-1 ratio of Pt:Pd (total 0.4 g/L PGM);
30 g/l of Al2O3 (MI-386 filler); and
5% boehmite.
$2^{nd}$ Catalytic Layer:
27 g/l 20:1 of NNm, nano-20:1 Pt:Pd/nano-Al2O3/micro-Al2O3 (approx. 0.4 g/L of 20:1 Pt:Pd) and 28 g/l of Al2O3 (MI-386 filler); and
5% boehmite.

Figure 7:
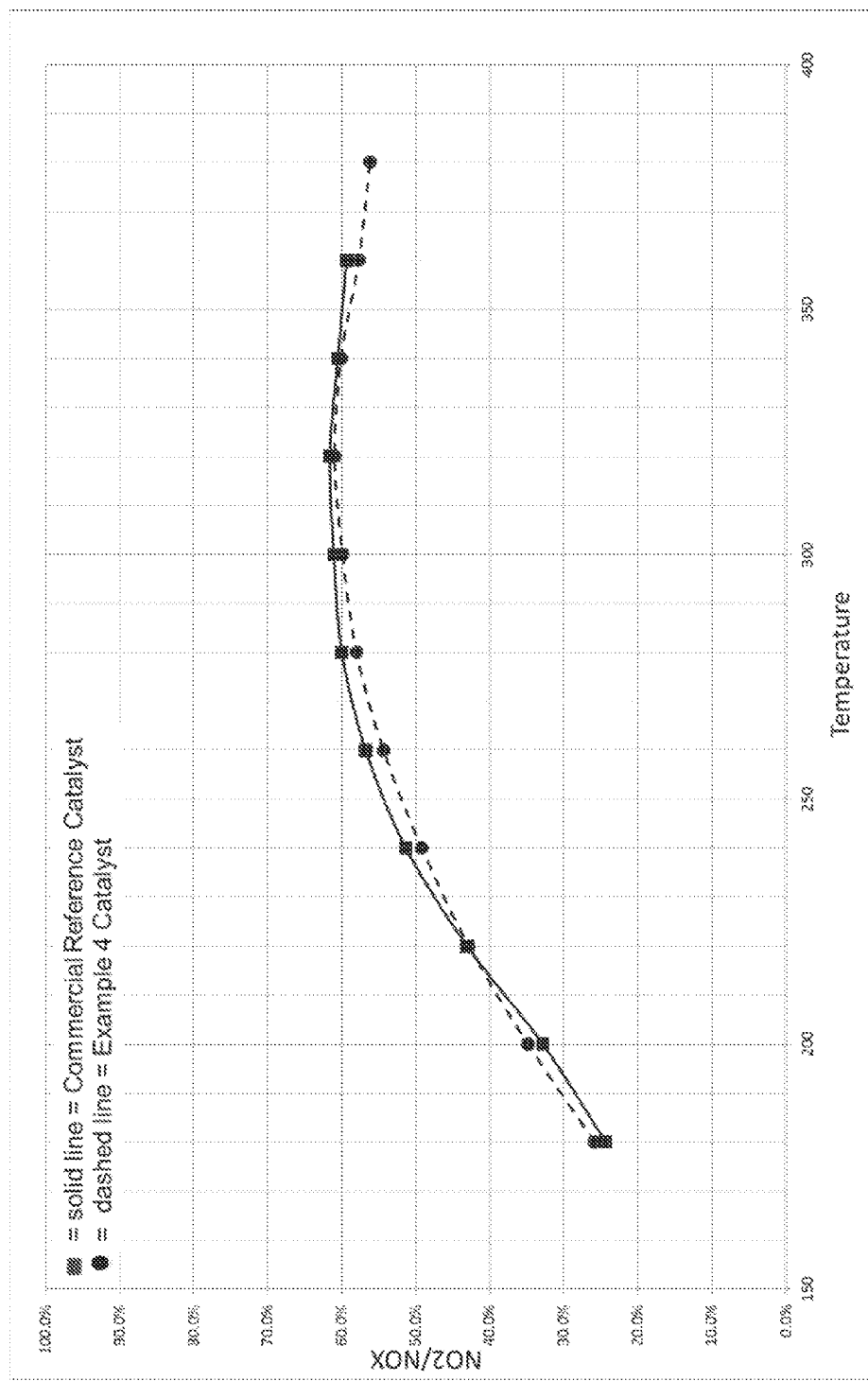
FIG. 7 illustrates performance data for a catalyst of the invention prepared as described in Example 4, as compared to the performance of a commercially available catalyst.

Performance data for this catalyst for oxidation of $NO_x$ to $NO_2$ at various temperatures (° C.) is shown in FIG. 7 and Table 1 (plotted as a dotted line, with circles at the data points; column marked EX. 4 CAT. in Table 1), and matches the performance of a commercially available catalyst which meets EPA specifications (plotted as a solid line, with squares at the data points; column marked COMM. CAT. in Table 1). The percentages given represent the percentage of $NO_2$ relative to total $NO_x$ present.

TABLE 1

| TEMPERATURE | COMM. CAT. | EX. 4 CAT. |
| --- | --- | --- |
| 180 | 24.3% | 25.8% |
| 200 | 32.8% | 34.8% |
| 220 | 43.0% | 42.8% |
| 240 | 51.3% | 49.2% |
| 260 | 56.8% | 54.4% |
| 280 | 60.0% | 58.0% |
| 300 | 61.1% | 59.9% |
| 320 | 61.6% | 61.0% |
| 340 | 60.5% | 60.1% |
| 360 | 59.3% | 57.7% |
| 380 |  | 56.2% |

The disclosures of all publications, patents, patent applications, and published patent applications referred to herein by an identifying citation are hereby incorporated herein by reference in their entirety.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications can be made in the embodiments chosen for illustration without departing from the spirit and scope of the invention. Therefore, the description and examples should not be construed as limiting the scope of the invention.

What is claimed is:
1. A coated substrate comprising:
a substrate;
a first washcoat layer comprising:
boehmite particles; and
a first catalytically active material comprising platinum and palladium in a weight ratio of 10:1 platinum:palladium to 100:1 platinum:palladium, or comprising platinum and no palladium; and a second washcoat layer comprising:
  boehmite particles; and
  a second catalytically active material comprising:
    i. platinum and palladium in a weight ratio of 1:2 platinum:palladium to 8:1 platinum:palladium;
    ii. two or more catalytically active materials which together comprise platinum and palladium in a weight ratio of 1:2 platinum:palladium to 8:1 platinum:palladium; or
    iii. palladium and no platinum.

2. The coated substrate of claim 1, wherein the catalytic washcoat layers are substantially free of zeolites.

3. The coated substrate of claim 1, wherein the first catalytically active material or the second catalytically active material comprises
  plasma-created composite nanoparticles bonded to pre-formed micron-sized carrier particles, wherein the composite nanoparticles comprise a support nanoparticle and a catalytic nanoparticle.

4. The coated substrate of claim 1, wherein the first catalytically active material or the second catalytically active material comprises micron-sized particles comprising plasma-created composite nanoparticles embedded within the micron-sized particles, wherein the composite nanoparticles comprise a support nanoparticle and a catalytic nanoparticle.

5. The coated substrate of claim 1, wherein the first catalytically active material comprises hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with platinum or platinum:palladium alloy.

6. The coated substrate of claim 1, wherein the first catalytically active material comprises catalytic particles produced by only wet-chemistry methods, comprising a micron-sized particle impregnated by only wet-chemistry methods with platinum or platinum:palladium alloy.

7. The coated substrate of claim 1, wherein the second catalytically active material comprises hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with palladium or platinum:palladium alloy.

8. The coated substrate of claim 1, wherein the second catalytically active material comprises catalytic particles produced by only wet-chemistry methods, comprising a micron-sized particle impregnated by only wet-chemistry methods with palladium or platinum:palladium alloy.

9. The coated substrate of claim 1, wherein:
  the second washcoat layer comprises two or more catalytically active materials which together comprise platinum and palladium in a weight ratio of 1:2 platinum:palladium to 8:1 platinum:palladium; and
  the two or more catalytically active materials together comprising platinum and palladium in a weight ratio of 1:2 platinum:palladium to 8:1 platinum:palladium comprise:
    i) a catalyst comprising platinum:palladium alloy in a ratio of about 15:1 Pt:Pd to about 25:1 Pt:Pd; and
    ii) a catalyst comprising palladium.

10. The coated substrate of claim 1, wherein:
  the second washcoat layer comprises two or more catalytically active materials which together comprise platinum and palladium in a weight ratio of 1:2 platinum:palladium to 8:1 platinum:palladium; and
  the two or more catalytically active materials together comprising platinum and palladium in a weight ratio of 1:2 platinum:palladium to 8:1 platinum:palladium comprise
    a) plasma-created composite nanoparticles bonded to pre-formed micron-sized carrier particles, wherein the composite nanoparticles comprise a support nanoparticle and a catalytic nanoparticle, wherein the catalytic nanoparticle comprises a platinum:palladium alloy in a ratio of about 15:1 Pt:Pd to about 25:1 Pt:Pd; and
    b) a catalyst comprising palladium.

11. The coated substrate of claim 1, wherein the two or more catalytically active materials together comprising platinum and palladium in a weight ratio of 1:2 platinum:palladium to 8:1 platinum:palladium comprise:
  a) micron-sized particles comprising plasma-created composite nanoparticles embedded within the micron-sized particles, wherein the composite nanoparticles comprise a support nanoparticle and a catalytic nanoparticle, wherein the catalytic nanoparticle comprises a platinum:palladium alloy in a ratio of about 15:1 Pt:Pd to about 25:1 Pt:Pd; and
  b) micron-sized carrier particles impregnated with palladium by wet-chemistry methods.

12. The coated substrate of claim 1, wherein the two or more catalytically active materials together comprising platinum and palladium in a weight ratio of 1:2 platinum:palladium to 8:1 platinum:palladium comprise:
  a) hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with palladium or platinum:palladium alloy, wherein the hybrid particles comprise a total content of platinum:palladium in a ratio of about 15:1 Pt:Pd to about 25:1 Pt:Pd; and
  b) micron-sized carrier particles impregnated with palladium by wet-chemistry methods.

13. The coated substrate according to claim 1, wherein the washcoat layer or washcoat layers further comprises filler particles.

14. The coated substrate of claim 13, wherein the filler particles comprise alumina.

15. The coated substrate of claim 1, wherein the washcoat layer comprising the second catalytically active material further comprises a third catalytically active material selected from the group consisting of:
  plasma-created composite nanoparticles bonded to pre-formed micron-sized carrier particles, wherein the composite nanoparticles comprise a support nanoparticle and a catalytic nanoparticle;
  micron-size particles comprising plasma-created composite nanoparticles embedded within the micron-sized particles, wherein the composite nanoparticles comprise a support nanoparticle and a catalytic nanoparticle;
  hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with platinum, palladium, or platinum:palladium alloy; and catalytic particles produced by only wet-chemistry methods, comprising a micron-sized particle impregnated by only wet-chemistry methods with platinum, palladium, or platinum:palladium alloy;

wherein said third catalytically active material is different from the second catalytically active material.

16. A coated substrate comprising:
   a substrate; and
   a washcoat layer comprising:
      boehmite particles;
      a first catalytically active material comprising platinum and palladium in a weight ratio of 10:1 platinum:palladium to 100:1 platinum:palladium, or comprising platinum and no palladium; and
      a second catalytically active material comprising platinum and palladium in a weight ratio of 1:2 platinum:palladium to 8:1 platinum:palladium, or comprising palladium and no platinum.

17. The coated substrate of claim 16, wherein the washcoat layer containing the first catalytically active material and the second catalytically active material is substantially free of zeolites.

18. The coated substrate of claim 16, wherein the first catalytically active material comprises
   a) plasma-created composite nanoparticles bonded to pre-formed micron-sized carrier particles, wherein the composite nanoparticles comprise a support nanoparticle and a catalytic nanoparticle; or
   b) micron-sized particles comprising plasma-created composite nanoparticles embedded within the micron-sized particles, wherein the composite nanoparticles comprise a support nanoparticle and a catalytic nanoparticle; or
   c) hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with platinum or platinum:palladium alloy; or
   d) catalytic particles produced by only wet-chemistry methods, comprising a micron-sized particle impregnated by only wet-chemistry methods with platinum or platinum:palladium alloy.

19. The coated substrate of claim 16, wherein the second catalytically active material comprises:
   a) plasma-created composite nanoparticles bonded to pre-formed micron-sized carrier particles, wherein the composite nanoparticles comprise a support nanoparticle and a catalytic nanoparticle; or
   b) micron-sized particles comprising plasma-created composite nanoparticles embedded within the micron-sized particles, wherein the composite nanoparticles comprise a support nanoparticle and a catalytic nanoparticle; or
   c) hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with palladium or platinum:palladium alloy; or
   d) catalytic particles produced by only wet-chemistry methods, comprising a micron-sized particle impregnated by only wet-chemistry methods with palladium or platinum:palladium alloy.

20. The coated substrate of claim 16, wherein the second catalytically active material comprises two or more catalytically active materials which together comprise platinum and palladium in a weight ratio of 1:2 platinum:palladium to 8:1 platinum:palladium.

21. The coated substrate of claim 16, wherein the washcoat layer or washcoat layers further comprises filler particles.

22. The coated substrate of claim 16, wherein the washcoat layer comprising the second catalytically active material further comprises a third catalytically active material selected from the group consisting of:
   plasma-created composite nanoparticles bonded to pre-formed micron-sized carrier particles, wherein the composite nanoparticles comprise a support nanoparticle and a catalytic nanoparticle;
   micron-size particles comprising plasma-created composite nanoparticles embedded within the micron-sized particles, wherein the composite nanoparticles comprise a support nanoparticle and a catalytic nanoparticle;
   hybrid particles comprising plasma-created composite nanoparticles bonded to pre-formed micron-sized carrier particles, wherein the composite nanoparticles comprise a support nanoparticle and a catalytic nanoparticle, and wherein the micron-sized pre-formed carrier particles are impregnated by wet-chemistry methods with platinum, palladium, or platinum:palladium alloy; and
   catalytic particles produced by only wet-chemistry methods, comprising a micron-sized particle impregnated by only wet-chemistry methods with platinum, palladium, or platinum:palladium alloy;
   wherein said third catalytically active material is different from the second catalytically active material.

23. A method of forming a coated substrate comprising coating a substrate with a washcoat layer comprising:
   boehmite particles;
   a first catalytically active material comprising platinum and palladium in a weight ratio of 10:1 platinum:palladium to 100:1 platinum:palladium, or comprising platinum and no palladium; and
   a second catalytically active material comprising platinum and palladium in a weight ratio of 1:2 platinum:palladium to 8:1 platinum:palladium, or comprising palladium and no platinum.

24. A method of forming a coated substrate comprising, in either order:
   coating a substrate with a first washcoat layer comprising:
      boehmite particles; and
      a first catalytically active material comprising platinum and palladium in a weight ratio of 10:1 platinum:palladium to 100:1 platinum:palladium, or comprising platinum and no palladium; and
   coating the substrate with a second washcoat layer comprising:
      boehmite particles; and
      a second catalytically active material comprising platinum and palladium in a weight ratio of 1:2 platinum:palladium to 8:1 platinum:palladium, or comprising palladium and no platinum.

* * * * *